United States Patent
Waldern et al.

(10) Patent No.: US 11,194,162 B2
(45) Date of Patent: Dec. 7, 2021

(54) WEARABLE HEADS UP DISPLAYS

(71) Applicant: DigiLens Inc., Sunnyvale, CA (US)

(72) Inventors: Jonathan David Waldern, Los Altos Hills, CA (US); Milan Momcilo Popovich, Leicester (GB); Alastair John Grant, San Jose, CA (US)

(73) Assignee: DigiLens Inc., Sunnyvale, CA (US)

( * ) Notice: Subject to any disclaimer, the term of this patent is extended or adjusted under 35 U.S.C. 154(b) by 0 days.

(21) Appl. No.: 17/118,316

(22) Filed: Dec. 10, 2020

(65) Prior Publication Data
US 2021/0231955 A1 Jul. 29, 2021

Related U.S. Application Data

(63) Continuation of application No. 16/773,585, filed on Jan. 27, 2020, now abandoned, which is a
(Continued)

(51) Int. Cl.
*G09G 5/00* (2006.01)
*G02B 27/01* (2006.01)
(Continued)

(52) U.S. Cl.
CPC ..... *G02B 27/0172* (2013.01); *G02B 27/0093* (2013.01); *G02B 27/0176* (2013.01);
(Continued)

(58) Field of Classification Search
CPC ...... G06F 3/0421; G06F 3/042; G06F 3/0433; G06F 3/0436; G02B 27/0172;
(Continued)

(56) References Cited

U.S. PATENT DOCUMENTS 1,043,938 A 11/1912 Huttenlocher
2,141,884 A 12/1938 Sonnefeld
(Continued)

FOREIGN PATENT DOCUMENTS

BR PI0720469 A2 1/2014
CA 2889727 A1 6/2014
(Continued)

OTHER PUBLICATIONS

Extended European Search Report for EP Application No. 13192383. 1, dated Apr. 2, 2014, 7 pgs.
(Continued)

*Primary Examiner* — Vijay Shankar
(74) *Attorney, Agent, or Firm* — KPPB LLP

(57) ABSTRACT

An optical display, including a first waveguide having a first set of surfaces, an input grating, a fold grating, and an output grating; an image input image node assembly; and a prismatic relay optics is provided. The prismatic relay optics may be configured to be optomechanically connected to the waveguide and the input image node assembly. The optical display is may also be configured to operate alone or as integrated with a headpiece to be used as a HUD. The HUD may have a first and a second configuration wherein the waveguide is decoupled or coupled.

20 Claims, 45 Drawing Sheets

Related U.S. Application Data continuation of application No. 15/863,798, filed on Jan. 5, 2018, now Pat. No. 10,545,346.

(60) Provisional application No. 62/498,715, filed on Jan. 5, 2017.

(51) Int. Cl.
  *G02B 27/00* (2006.01)
  *G06F 3/043* (2006.01)
  *G06F 3/042* (2006.01)

(52) U.S. Cl.
  CPC .......... *G06F 3/0421* (2013.01); *G06F 3/0433* (2013.01); *G06F 3/0436* (2013.01); *G02B 2027/0125* (2013.01); *G02B 2027/0169* (2013.01); *G02B 2027/0174* (2013.01); *G02B 2027/0187* (2013.01)

(58) Field of Classification Search
  CPC ............ G02B 27/0093; G02B 27/0176; G02B 2027/0169; G02B 2027/0187; G02B 2027/0174; G02B 2027/0125
  See application file for complete search history.

(56) References Cited

U.S. PATENT DOCUMENTS

| | | |
|---|---|---|
| 3,482,498 A | 12/1969 | Becker |
| 3,620,601 A | 11/1971 | Leonard et al. |
| 3,741,716 A | 6/1973 | Johne et al. |
| 3,804,496 A | 4/1974 | Crane et al. |
| 3,843,231 A | 10/1974 | Borel et al. |
| 3,851,303 A | 11/1974 | Muller |
| 3,885,095 A | 5/1975 | Wolfson et al. |
| 3,940,204 A | 2/1976 | Withrington |
| 3,965,029 A | 6/1976 | Arora |
| 3,975,711 A | 8/1976 | McMahon |
| 4,028,725 A | 6/1977 | Lewis |
| 4,035,068 A | 7/1977 | Rawson |
| 4,066,334 A | 1/1978 | Fray et al. |
| 4,082,432 A | 4/1978 | Kirschner |
| 4,099,841 A | 7/1978 | Ellis |
| 4,133,152 A | 1/1979 | Penrose |
| 4,178,074 A | 12/1979 | Heller |
| 4,218,111 A | 8/1980 | Withrington et al. |
| 4,232,943 A | 11/1980 | Rogers |
| 4,248,093 A | 2/1981 | Andersson et al. |
| 4,251,137 A | 2/1981 | Knop et al. |
| 4,309,070 A | 1/1982 | St. Leger Searle |
| 4,322,163 A | 3/1982 | Schiller |
| 4,386,361 A | 5/1983 | Simmonds |
| 4,389,612 A | 6/1983 | Simmonds et al. |
| 4,403,189 A | 9/1983 | Simmonds |
| 4,418,993 A | 12/1983 | Lipton |
| 4,472,037 A | 9/1984 | Lipton |
| 4,523,226 A | 6/1985 | Lipton et al. |
| 4,544,267 A | 10/1985 | Schiller |
| 4,562,463 A | 12/1985 | Lipton |
| 4,566,758 A | 1/1986 | Bos et al. |
| 4,583,117 A | 4/1986 | Lipton et al. |
| 4,643,515 A | 2/1987 | Upatnieks |
| 4,647,967 A | 3/1987 | Kirschner et al. |
| 4,688,900 A | 8/1987 | Doane et al. |
| 4,711,512 A | 12/1987 | Upatnieks |
| 4,714,320 A | 12/1987 | Banbury |
| 4,728,547 A | 3/1988 | Vaz et al. |
| 4,729,640 A | 3/1988 | Sakata et al. |
| 4,743,083 A | 5/1988 | Schimpe |
| 4,749,256 A | 6/1988 | Bell et al. |
| 4,765,703 A | 8/1988 | Suzuki et al. |
| 4,775,218 A | 10/1988 | Wood et al. |
| 4,791,788 A | 12/1988 | Simmonds et al. |
| 4,792,850 A | 12/1988 | Liptoh et al. |
| 4,799,765 A | 1/1989 | Ferrer |
| 4,811,414 A | 3/1989 | Fishbine et al. |
| 4,848,093 A | 7/1989 | Simmonds et al. |
| 4,852,988 A | 8/1989 | Velez et al. |
| 4,854,688 A | 8/1989 | Hayford et al. |
| 4,860,294 A | 8/1989 | Winzer et al. |
| 4,884,876 A | 12/1989 | Lipton et al. |
| 4,890,902 A | 1/1990 | Doane et al. |
| 4,928,301 A | 5/1990 | Smoot |
| 4,933,976 A | 6/1990 | Fishbine et al. |
| 4,938,568 A | 7/1990 | Margerum et al. |
| 4,946,245 A | 8/1990 | Chamberlin et al. |
| 4,960,311 A | 10/1990 | Moss et al. |
| 4,964,701 A | 10/1990 | Dorschner et al. |
| 4,967,268 A | 10/1990 | Lipton et al. |
| 4,970,129 A | 11/1990 | Ingwall et al. |
| 4,971,719 A | 11/1990 | Vaz et al. |
| 4,994,204 A | 2/1991 | Doane et al. |
| 5,004,323 A | 4/1991 | West |
| 5,007,711 A | 4/1991 | Wood et al. |
| 5,009,483 A | 4/1991 | Rockwell et al. |
| 5,011,624 A | 4/1991 | Yamagishi et al. |
| 5,016,953 A | 5/1991 | Moss et al. |
| 5,033,814 A | 7/1991 | Brown et al. |
| 5,035,734 A | 7/1991 | Honkanen et al. |
| 5,053,834 A | 10/1991 | Simmonds |
| 5,063,441 A | 11/1991 | Lipton et al. |
| 5,076,664 A | 12/1991 | Migozzi |
| 5,079,416 A | 1/1992 | Filipovich |
| 5,096,282 A | 3/1992 | Margerum et al. |
| 5,099,343 A | 3/1992 | Margerum et al. |
| 5,109,465 A | 4/1992 | Klopotek |
| 5,110,034 A | 5/1992 | Simmonds et al. |
| 5,117,285 A | 5/1992 | Nelson et al. |
| 5,117,302 A | 5/1992 | Lipton |
| 5,119,454 A | 6/1992 | McMahon et al. |
| 5,124,821 A | 6/1992 | Antier et al. |
| 5,138,687 A | 8/1992 | Horie et al. |
| 5,139,192 A | 8/1992 | Simmonds et al. |
| 5,142,357 A | 8/1992 | Lipton et al. |
| 5,142,644 A | 8/1992 | Vansteenkiste et al. |
| 5,148,302 A | 9/1992 | Nagano et al. |
| 5,150,234 A | 9/1992 | Takahashi et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,181,133 A | 1/1993 | Lipton |
| 5,183,545 A | 2/1993 | Branca et al. |
| 5,187,597 A | 2/1993 | Kato et al. |
| 5,193,000 A | 3/1993 | Lipton et al. |
| 5,198,912 A | 3/1993 | Ingwall et al. |
| 5,200,861 A | 4/1993 | Moskovich et al. |
| 5,210,624 A | 5/1993 | Matsumoto et al. |
| 5,218,360 A | 6/1993 | Goetz et al. |
| 5,218,480 A | 6/1993 | Moskovich et al. |
| 5,224,198 A | 6/1993 | Jachimowicz et al. |
| 5,239,372 A | 8/1993 | Lipton |
| 5,240,636 A | 8/1993 | Doane et al. |
| 5,241,337 A | 8/1993 | Betensky et al. |
| 5,242,476 A | 9/1993 | Bartel et al. |
| 5,243,413 A | 9/1993 | Gitlin et al. |
| 5,251,048 A | 10/1993 | Doane et al. |
| 5,264,950 A | 11/1993 | West et al. |
| 5,268,792 A | 12/1993 | Kreitzer et al. |
| 5,284,499 A | 2/1994 | Harvey et al. |
| 5,289,315 A | 2/1994 | Makita et al. |
| 5,295,208 A | 3/1994 | Caulfield et al. |
| 5,296,967 A | 3/1994 | Moskovich et al. |
| 5,299,289 A | 3/1994 | Omae et al. |
| 5,303,085 A | 4/1994 | Rallison |
| 5,306,923 A | 4/1994 | Kazmierski et al. |
| 5,309,283 A | 5/1994 | Kreitzer et al. |
| 5,313,330 A | 5/1994 | Betensky |
| 5,315,324 A | 5/1994 | Kubelik et al. |
| 5,315,419 A | 5/1994 | Saupe et al. |
| 5,315,440 A | 5/1994 | Betensky et al. |
| 5,317,405 A | 5/1994 | Kuriki et al. |
| 5,327,269 A | 7/1994 | Tilton et al. |
| 5,329,363 A | 7/1994 | Moskovich et al. |

(56) References Cited

U.S. PATENT DOCUMENTS

| | | |
|---|---|---|
| 5,341,230 A | 8/1994 | Smith |
| 5,343,147 A | 8/1994 | Sager et al. |
| 5,351,151 A | 9/1994 | Levy |
| 5,359,362 A | 10/1994 | Lewis et al. |
| 5,363,220 A | 11/1994 | Kuwayama et al. |
| 5,368,770 A | 11/1994 | Saupe et al. |
| 5,369,511 A | 11/1994 | Amos |
| 5,371,626 A | 12/1994 | Betensky |
| 5,400,069 A | 3/1995 | Braun et al. |
| 5,408,346 A | 4/1995 | Trissel et al. |
| 5,410,370 A | 4/1995 | Janssen |
| 5,410,376 A | 4/1995 | Cornsweet et al. |
| 5,416,510 A | 5/1995 | Lipton et al. |
| 5,416,514 A | 5/1995 | Janssen et al. |
| 5,418,584 A | 5/1995 | Larson |
| 5,418,871 A | 5/1995 | Revelli et al. |
| 5,428,480 A | 6/1995 | Betensky et al. |
| 5,437,811 A | 8/1995 | Doane et al. |
| 5,438,357 A | 8/1995 | McNelley |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |
| 5,463,428 A | 10/1995 | Lipton et al. |
| 5,465,311 A | 11/1995 | Caulfield et al. |
| 5,471,326 A | 11/1995 | Hall et al. |
| 5,473,222 A | 12/1995 | Thoeny et al. |
| 5,476,611 A | 12/1995 | Nolan et al. |
| 5,481,321 A | 1/1996 | Lipton |
| 5,485,313 A | 1/1996 | Betensky |
| 5,493,430 A | 2/1996 | Lu et al. |
| 5,493,448 A | 2/1996 | Betensky et al. |
| 5,496,621 A | 3/1996 | Makita et al. |
| 5,499,140 A | 3/1996 | Betensky |
| 5,500,671 A | 3/1996 | Andersson et al. |
| 5,500,769 A | 3/1996 | Betensky |
| 5,510,913 A | 4/1996 | Hashimoto et al. |
| 5,515,184 A | 5/1996 | Caulfield et al. |
| 5,516,455 A | 5/1996 | Jacobine et al. |
| 5,524,272 A | 6/1996 | Podowski et al. |
| 5,528,720 A | 6/1996 | Winston et al. |
| 5,530,566 A | 6/1996 | Kumar |
| 5,532,736 A | 7/1996 | Kuriki et al. |
| 5,532,875 A | 7/1996 | Betemsky |
| 5,537,232 A | 7/1996 | Biles |
| RE35,310 E | 8/1996 | Moskovich |
| 5,543,950 A | 8/1996 | Lavrentovich et al. |
| 5,559,637 A | 9/1996 | Moskovich et al. |
| 5,572,248 A | 11/1996 | Allen et al. |
| 5,572,250 A | 11/1996 | Lipton et al. |
| 5,576,888 A | 11/1996 | Betensky |
| 5,579,026 A | 11/1996 | Tabata |
| 5,583,795 A | 12/1996 | Smyth |
| 5,585,035 A | 12/1996 | Nerad et al. |
| 5,593,615 A | 1/1997 | Nerad et al. |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,619,586 A | 4/1997 | Sibbald et al. |
| 5,621,529 A | 4/1997 | Gordon et al. |
| 5,621,552 A | 4/1997 | Coates et al. |
| 5,625,495 A | 4/1997 | Moskovich et al. |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,614 A | 9/1997 | Chien et al. |
| 5,668,907 A | 9/1997 | Veligdan |
| 5,677,797 A | 10/1997 | Betensky et al. |
| 5,680,231 A | 10/1997 | Grinberg et al. |
| 5,680,411 A | 10/1997 | Ramdane et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,694,230 A | 12/1997 | Welch |
| 5,695,682 A | 12/1997 | Doane et al. |
| 5,701,132 A | 12/1997 | Kollin et al. |
| 5,706,108 A | 1/1998 | Ando et al. |
| 5,706,136 A | 1/1998 | Okuyama et al. |
| 5,707,925 A | 1/1998 | Akada et al. |
| 5,710,645 A | 1/1998 | Phillips et al. |
| 5,724,189 A | 3/1998 | Ferrante |
| 5,724,463 A | 3/1998 | Deacon et al. |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,760,931 A | 6/1998 | Saburi et al. |
| 5,764,414 A | 6/1998 | King et al. |
| 5,771,320 A | 6/1998 | Stone |
| 5,790,288 A | 8/1998 | Jager et al. |
| 5,790,314 A | 8/1998 | Duck et al. |
| 5,798,641 A | 8/1998 | Spagna et al. |
| 5,804,609 A | 9/1998 | Ohnishi et al. |
| 5,808,804 A | 9/1998 | Moskovich |
| 5,812,608 A | 9/1998 | Valimaki et al. |
| 5,822,089 A | 10/1998 | Phillips et al. |
| 5,822,127 A | 10/1998 | Chen et al. |
| 5,825,448 A | 10/1998 | Bos et al. |
| 5,831,700 A | 11/1998 | Li et al. |
| 5,835,661 A | 11/1998 | Tai et al. |
| 5,841,507 A | 11/1998 | Barnes |
| 5,841,587 A | 11/1998 | Moskovich et al. |
| 5,847,787 A | 12/1998 | Fredley et al. |
| 5,856,842 A | 1/1999 | Tedesco |
| 5,857,043 A | 1/1999 | Cook et al. |
| 5,867,238 A | 2/1999 | Miller et al. |
| 5,867,618 A | 2/1999 | Ito et al. |
| 5,868,951 A | 2/1999 | Schuck, III et al. |
| 5,870,228 A | 2/1999 | Kreitzer et al. |
| 5,875,012 A | 2/1999 | Crawford et al. |
| 5,877,826 A | 3/1999 | Yang et al. |
| 5,886,822 A | 3/1999 | Spitzer |
| 5,892,598 A | 4/1999 | Asakawa et al. |
| 5,892,599 A | 4/1999 | Bahuguna |
| 5,898,511 A | 4/1999 | Mizutani et al. |
| 5,900,987 A | 5/1999 | Kreitzer et al. |
| 5,900,989 A | 5/1999 | Kreitzer |
| 5,903,395 A | 5/1999 | Rallison et al. |
| 5,903,396 A | 5/1999 | Rallison |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,949,508 A | 9/1999 | Kumar et al. |
| 5,956,113 A | 9/1999 | Crawford |
| 5,962,147 A | 10/1999 | Shalhub et al. |
| 5,963,375 A | 10/1999 | Kreitzer |
| 5,966,223 A | 10/1999 | Friesem et al. |
| 5,969,874 A | 10/1999 | Moskovich |
| 5,969,876 A | 10/1999 | Kreitzer et al. |

(56) References Cited

U.S. PATENT DOCUMENTS

| | | |
|---|---|---|
| 5,973,727 A | 10/1999 | McGrew et al. |
| 5,974,162 A | 10/1999 | Metz et al. |
| 5,985,422 A | 11/1999 | Krauter |
| 5,986,746 A | 11/1999 | Metz et al. |
| 5,991,087 A | 11/1999 | Rallison |
| 5,999,089 A | 12/1999 | Carlson et al. |
| 5,999,282 A | 12/1999 | Suzuki et al. |
| 5,999,314 A | 12/1999 | Asakura et al. |
| 6,014,187 A | 1/2000 | Taketomi et al. |
| 6,023,375 A | 2/2000 | Kreitzer |
| 6,042,947 A | 3/2000 | Asakura et al. |
| 6,043,585 A | 3/2000 | Plessky et al. |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,069,728 A | 5/2000 | Huignard et al. |
| 6,075,626 A | 6/2000 | Mizutani et al. |
| 6,078,427 A | 6/2000 | Fontaine et al. |
| 6,094,311 A | 7/2000 | Moskovich |
| 6,097,551 A | 8/2000 | Kreitzer |
| 6,104,448 A | 8/2000 | Doane et al. |
| 6,107,943 A | 8/2000 | Schroeder |
| 6,115,152 A | 9/2000 | Popovich et al. |
| 6,118,908 A | 9/2000 | Bischel et al. |
| 6,121,899 A | 9/2000 | Theriault |
| 6,127,066 A | 10/2000 | Ueda et al. |
| 6,128,058 A | 10/2000 | Walton et al. |
| 6,133,971 A | 10/2000 | Silverstein et al. |
| 6,133,975 A | 10/2000 | Li et al. |
| 6,137,630 A | 10/2000 | Tsou et al. |
| 6,141,074 A | 10/2000 | Bos et al. |
| 6,141,154 A | 10/2000 | Kreitzer et al. |
| 6,151,142 A | 11/2000 | Phillips et al. |
| 6,154,190 A | 11/2000 | Yang et al. |
| 6,156,243 A | 12/2000 | Kosuga et al. |
| 6,167,169 A | 12/2000 | Brinkman et al. |
| 6,169,594 B1 | 1/2001 | Aye et al. |
| 6,169,613 B1 | 1/2001 | Amitai et al. |
| 6,169,636 B1 | 1/2001 | Kreitzer et al. |
| 6,176,837 B1 | 1/2001 | Foxlin |
| 6,185,015 B1 | 2/2001 | Reinhorn et al. |
| 6,185,016 B1 | 2/2001 | Popovich |
| 6,188,462 B1 | 2/2001 | Lavrentovich et al. |
| 6,191,887 B1 | 2/2001 | Michaloski et al. |
| 6,195,206 B1 | 2/2001 | Yona et al. |
| 6,195,209 B1 | 2/2001 | Kreitzer et al. |
| 6,204,835 B1 | 3/2001 | Yang et al. |
| 6,211,976 B1 | 4/2001 | Popovich et al. |
| 6,222,297 B1 | 4/2001 | Perdue |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,268,839 B1 | 7/2001 | Yang et al. |
| 6,269,203 B1 | 7/2001 | Davies et al. |
| 6,275,031 B1 | 8/2001 | Simmonds et al. |
| 6,278,429 B1 | 8/2001 | Ruth et al. |
| 6,285,813 B1 | 9/2001 | Schultz et al. |
| 6,297,860 B1 | 10/2001 | Moskovich et al. |
| 6,301,056 B1 | 10/2001 | Kreitzer et al. |
| 6,301,057 B1 | 10/2001 | Kreitzer et al. |
| 6,317,083 B1 | 11/2001 | Johnson et al. |
| 6,317,227 B1 | 11/2001 | Mizutani et al. |
| 6,317,228 B2 | 11/2001 | Popovich et al. |
| 6,317,528 B1 | 11/2001 | Gadkaree et al. |
| 6,320,563 B1 | 11/2001 | Yang et al. |
| 6,321,069 B1 | 11/2001 | Piirainen |
| 6,323,970 B1 | 11/2001 | Popovich |
| 6,323,989 B1 | 11/2001 | Jacobson et al. |
| 6,324,014 B1 | 11/2001 | Moskovich et al. |
| 6,327,089 B1 | 12/2001 | Hosaki et al. |
| 6,330,109 B1 | 12/2001 | Ishii et al. |
| 6,333,819 B1 | 12/2001 | Svedenkrans |
| 6,340,540 B1 | 1/2002 | Ueda et al. |
| 6,351,273 B1 | 2/2002 | Lemelson et al. |
| 6,351,333 B2 | 2/2002 | Araki et al. |
| 6,356,172 B1 | 3/2002 | Koivisto et al. |
| 6,356,674 B1 | 3/2002 | Davis et al. |
| 6,359,730 B2 | 3/2002 | Tervonen |
| 6,359,737 B1 | 3/2002 | Stringfellow |
| 6,366,281 B1 | 4/2002 | Lipton et al. |
| 6,366,369 B2 | 4/2002 | Ichikawa et al. |
| 6,366,378 B1 | 4/2002 | Tervonen et al. |
| 6,377,238 B1 | 4/2002 | McPheters |
| 6,377,321 B1 | 4/2002 | Khan et al. |
| 6,388,797 B1 | 5/2002 | Lipton et al. |
| 6,392,812 B1 | 5/2002 | Howard |
| 6,407,724 B2 | 6/2002 | Waldern et al. |
| 6,409,687 B1 | 6/2002 | Foxlin |
| 6,411,444 B1 | 6/2002 | Moskovich et al. |
| 6,414,760 B1 | 7/2002 | Lopez et al. |
| 6,417,971 B1 | 7/2002 | Moskovich et al. |
| 6,437,563 B1 | 8/2002 | Simmonds et al. |
| 6,445,512 B1 | 9/2002 | Moskovich et al. |
| 6,449,095 B1 | 9/2002 | Ohtaki et al. |
| 6,456,584 B1 | 9/2002 | Nagata et al. |
| 6,470,132 B1 | 10/2002 | Nousiainen et al. |
| 6,473,209 B1 | 10/2002 | Popovich |
| 6,476,974 B1 | 11/2002 | Kreitzer et al. |
| 6,483,303 B2 | 11/2002 | Simmonds et al. |
| 6,486,997 B1 | 11/2002 | Bruzzone et al. |
| 6,504,518 B1 | 1/2003 | Kuwayama et al. |
| 6,504,629 B1 | 1/2003 | Popovich et al. |
| 6,509,937 B1 | 1/2003 | Moskovich et al. |
| 6,518,747 B2 | 2/2003 | Sager et al. |
| 6,519,088 B1 | 2/2003 | Lipton |
| 6,522,794 B1 | 2/2003 | Bischel et al. |
| 6,522,795 B1 | 2/2003 | Jordan et al. |
| 6,524,771 B2 | 2/2003 | Maeda et al. |
| 6,529,336 B1 | 3/2003 | Kreitzer et al. |
| 6,534,977 B1 | 3/2003 | Duncan et al. |
| 6,545,778 B2 | 4/2003 | Ono et al. |
| 6,550,949 B1 | 4/2003 | Bauer et al. |
| 6,552,789 B1 | 4/2003 | Modro |
| 6,557,413 B2 | 5/2003 | Nieminen et al. |
| 6,559,813 B1 | 5/2003 | DeLuca et al. |
| 6,563,648 B2 | 5/2003 | Gleckman et al. |
| 6,563,650 B2 | 5/2003 | Moskovich et al. |
| 6,567,014 B1 | 5/2003 | Hansen et al. |
| 6,567,573 B1 | 5/2003 | Domash et al. |
| 6,577,411 B1 | 6/2003 | David et al. |
| 6,577,429 B1 | 6/2003 | Kurtz et al. |
| 6,580,529 B1 | 6/2003 | Amitai et al. |
| 6,583,838 B1 | 6/2003 | Hoke et al. |
| 6,583,873 B1 | 6/2003 | Goncharov et al. |
| 6,587,619 B1 | 7/2003 | Kinoshita |
| 6,594,090 B2 | 7/2003 | Kruschwitz et al. |
| 6,596,193 B2 | 7/2003 | Coates et al. |
| 6,597,176 B2 | 7/2003 | Simmonds et al. |
| 6,597,475 B1 | 7/2003 | Shirakura et al. |
| 6,598,987 B1 | 7/2003 | Parikka |
| 6,600,590 B2 | 7/2003 | Roddy et al. |
| 6,608,720 B1 | 8/2003 | Freeman |
| 6,611,253 B1 | 8/2003 | Cohen |
| 6,618,104 B1 | 9/2003 | Date et al. |
| 6,625,381 B2 | 9/2003 | Roddy et al. |
| 6,646,772 B1 | 11/2003 | Popovich et al. |
| 6,646,810 B2 | 11/2003 | Harter, Jr. et al. |
| 6,661,578 B2 | 12/2003 | Hedrick |
| 6,667,134 B1 | 12/2003 | Sutherland et al. |
| 6,674,578 B2 | 1/2004 | Sugiyama et al. |
| 6,677,086 B1 | 1/2004 | Sutehrland et al. |
| 6,686,815 B1 | 2/2004 | Mirshekarl-Syahkal et al. |
| 6,690,516 B2 | 2/2004 | Aritake et al. |
| 6,692,666 B2 | 2/2004 | Sutherland et al. |
| 6,699,407 B1 | 3/2004 | Sutehrland et al. |
| 6,706,086 B2 | 3/2004 | Emig et al. |
| 6,706,451 B1 | 3/2004 | Sutherland et al. |
| 6,721,096 B2 | 4/2004 | Bruzzone et al. |
| 6,730,442 B1 | 5/2004 | Sutherland et al. |
| 6,731,434 B1 | 5/2004 | Hua et al. |
| 6,738,105 B1 | 5/2004 | Hannah et al. |

(56) References Cited

U.S. PATENT DOCUMENTS

| | | |
|---|---|---|
| 6,741,189 B1 | 5/2004 | Gibbons, II et al. |
| 6,744,478 B1 | 6/2004 | Asakura et al. |
| 6,747,781 B2 | 6/2004 | Trisnadi et al. |
| 6,748,342 B1 | 6/2004 | Dickhaus |
| 6,750,941 B2 | 6/2004 | Satoh et al. |
| 6,750,995 B2 | 6/2004 | Dickson |
| 6,750,996 B2 | 6/2004 | Jagt et al. |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Natarajan et al. |
| 6,822,713 B1 | 11/2004 | Yaroshchuk et al. |
| 6,825,987 B2 | 11/2004 | Repetto et al. |
| 6,829,095 B2 | 12/2004 | Amitai |
| 6,830,789 B2 | 12/2004 | Doane et al. |
| 6,833,955 B2 | 12/2004 | Niv |
| 6,836,369 B2 | 12/2004 | Fujikawa et al. |
| 6,842,563 B2 | 1/2005 | Zhang et al. |
| 6,844,212 B2 | 1/2005 | Bond et al. |
| 6,844,980 B2 | 1/2005 | He et al. |
| 6,844,989 B1 | 1/2005 | Jo et al. |
| 6,847,274 B2 | 1/2005 | Salmela et al. |
| 6,847,488 B2 | 1/2005 | Travis |
| 6,850,210 B1 | 2/2005 | Lipton et al. |
| 6,853,491 B1 | 2/2005 | Ruble et al. |
| 6,853,493 B2 | 2/2005 | Kreitzer et al. |
| 6,861,107 B2 | 3/2005 | Klasen-Memmer et al. |
| 6,864,861 B2 | 3/2005 | Schehrer et al. |
| 6,864,927 B1 | 3/2005 | Cathey |
| 6,864,931 B1 | 3/2005 | Kumar et al. |
| 6,867,888 B2 | 3/2005 | Sutherland et al. |
| 6,873,443 B1 | 3/2005 | Joubert et al. |
| 6,878,494 B2 | 4/2005 | Sutehrland et al. |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,919,003 B2 | 7/2005 | Ikeda et al. |
| 6,922,267 B2 | 7/2005 | Endo et al. |
| 6,926,429 B2 | 8/2005 | Barlow et al. |
| 6,927,570 B2 | 8/2005 | Simmonds et al. |
| 6,927,694 B1 | 8/2005 | Smith et al. |
| 6,940,361 B1 | 9/2005 | Jokio et al. |
| 6,943,788 B2 | 9/2005 | Tomono |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,952,435 B2 | 10/2005 | Lai et al. |
| 6,958,662 B1 | 10/2005 | Salmela et al. |
| 6,958,868 B1 | 10/2005 | Pender |
| 6,963,454 B1 | 11/2005 | Martins et al. |
| 6,972,788 B1 | 12/2005 | Robertson et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,987,908 B2 | 1/2006 | Bond et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,003,075 B2 | 2/2006 | Miyake et al. |
| 7,003,187 B2 | 2/2006 | Frick et al. |
| 7,006,732 B2 | 2/2006 | Gunn, III et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,018,744 B2 | 3/2006 | Otaki et al. |
| 7,019,793 B2 | 3/2006 | Moskovich et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,046,439 B2 | 5/2006 | Kaminsky et al. |
| 7,053,735 B2 | 5/2006 | Salmela et al. |
| 7,053,991 B2 | 5/2006 | Sandusky |
| 7,054,045 B2 | 5/2006 | McPheters et al. |
| 7,058,434 B2 | 6/2006 | Wang et al. |
| 7,068,405 B2 | 6/2006 | Sutherland et al. |
| 7,068,898 B2 | 6/2006 | Buretea et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,095,562 B1 | 8/2006 | Peng et al. |
| 7,099,080 B2 | 8/2006 | Lipton et al. |
| 7,101,048 B2 | 9/2006 | Travis |
| 7,108,383 B1 | 9/2006 | Mitchell et al. |
| 7,110,184 B1 | 9/2006 | Yona et al. |
| 7,119,965 B1 | 10/2006 | Rolland et al. |
| 7,123,418 B2 | 10/2006 | Weber et al. |
| 7,123,421 B1 | 10/2006 | Moskovich et al. |
| 7,126,418 B2 | 10/2006 | Hunton et al. |
| 7,126,583 B1 | 10/2006 | Breed |
| 7,132,200 B1 | 11/2006 | Ueda et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,167,286 B2 | 1/2007 | Anderson et al. |
| 7,175,780 B1 | 2/2007 | Sutherland et al. |
| 7,181,105 B2 | 2/2007 | Teramura et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,190,849 B2 | 3/2007 | Katase |
| 7,198,737 B2 | 4/2007 | Natarajan et al. |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,212,175 B1 | 5/2007 | Magee et al. |
| 7,230,767 B2 | 6/2007 | Walck et al. |
| 7,230,770 B2 | 6/2007 | Kreitzer et al. |
| 7,242,527 B2 | 7/2007 | Spitzer et al. |
| 7,248,128 B2 | 7/2007 | Mattila et al. |
| 7,256,915 B2 | 8/2007 | Sutherland et al. |
| 7,259,906 B1 | 8/2007 | Islam |
| 7,265,882 B2 | 9/2007 | Sutherland et al. |
| 7,265,903 B2 | 9/2007 | Sutherland et al. |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| RE39,911 E | 11/2007 | Moskovich |
| 7,299,983 B2 | 11/2007 | Piikivi |
| 7,301,601 B2 | 11/2007 | Lin et al. |
| 7,312,906 B2 | 12/2007 | Sutherland et al. |
| 7,313,291 B2 | 12/2007 | Okhotnikov et al. |
| D559,250 S | 1/2008 | Pombo |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,333,685 B2 | 2/2008 | Stone et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,356,224 B2 | 4/2008 | Levner et al. |
| 7,369,911 B1 | 5/2008 | Volant et al. |
| 7,375,870 B2 | 5/2008 | Schorpp |
| 7,375,886 B2 | 5/2008 | Lipton et al. |
| 7,376,068 B1 | 5/2008 | Khoury |
| 7,376,307 B2 | 5/2008 | Singh et al. |
| 7,391,573 B2 | 6/2008 | Amitai |

(56) References Cited

U.S. PATENT DOCUMENTS

| | | |
|---|---|---|
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,413,678 B1 | 8/2008 | Natarajan et al. |
| 7,413,679 B1 | 8/2008 | Sutherland et al. |
| 7,415,173 B2 | 8/2008 | Kassamakov et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,433,116 B1 | 10/2008 | Islam |
| 7,436,568 B1 | 10/2008 | Kuykendall, Jr. |
| D581,447 S | 11/2008 | Yee |
| 7,447,967 B2 | 11/2008 | Onggosanusi et al. |
| 7,453,612 B2 | 11/2008 | Mukawa |
| 7,454,103 B2 | 11/2008 | Parriaux |
| 7,457,040 B2 | 11/2008 | Amitai |
| 7,466,994 B2 | 12/2008 | Pihlaja et al. |
| 7,477,206 B2 | 1/2009 | Cowan et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,499,217 B2 | 3/2009 | Cakmakci et al. |
| 7,500,104 B2 | 3/2009 | Goland |
| 7,511,891 B2 | 3/2009 | Messerschmidt |
| 7,513,668 B1 | 4/2009 | Peng et al. |
| 7,522,344 B1 | 4/2009 | Curatu et al. |
| 7,525,448 B1 | 4/2009 | Wilson et al. |
| 7,528,385 B2 | 5/2009 | Volodin et al. |
| 7,542,210 B2 | 6/2009 | Chirieleison |
| 7,545,429 B2 | 6/2009 | Travis |
| 7,550,234 B2 | 6/2009 | Otaki et al. |
| 7,558,446 B2 | 7/2009 | Wimberger-Friedl et al. |
| 7,567,372 B2 | 7/2009 | Schorpp |
| 7,570,322 B2 | 8/2009 | Sutherland et al. |
| 7,570,405 B1 | 8/2009 | Sutherland et al. |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,583,423 B2 | 9/2009 | Sutherland et al. |
| 7,587,110 B2 | 9/2009 | Singh et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,605,719 B1 | 10/2009 | Wenger et al. |
| 7,605,774 B1 | 10/2009 | Brandt et al. |
| 7,605,882 B1 | 10/2009 | Sutherland et al. |
| 7,616,270 B2 | 11/2009 | Hirabayashi et al. |
| 7,617,022 B1 | 11/2009 | Wood et al. |
| 7,618,750 B2 | 11/2009 | Ueda et al. |
| 7,619,739 B1 | 11/2009 | Sutherland et al. |
| 7,619,825 B1 | 11/2009 | Peng et al. |
| 7,629,086 B2 | 12/2009 | Otaki et al. |
| 7,639,208 B1 | 12/2009 | Ha et al. |
| 7,639,911 B2 | 12/2009 | Lee et al. |
| 7,643,214 B2 | 1/2010 | Amitai |
| 7,643,225 B1 | 1/2010 | Tsai |
| 7,656,585 B1 | 2/2010 | Powell et al. |
| 7,660,047 B1 | 2/2010 | Travis et al. |
| 7,672,055 B2 | 3/2010 | Amitai |
| 7,672,549 B2 | 3/2010 | Ghosh et al. |
| 7,691,248 B2 | 4/2010 | Ikeda et al. |
| 7,710,622 B2 | 5/2010 | Takabayashi et al. |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,571 B1 | 6/2010 | Li |
| 7,733,572 B1 | 6/2010 | Brown et al. |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,843,642 B2 | 11/2010 | Shaoulov et al. |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,866,869 B2 | 1/2011 | Karakawa |
| 7,872,707 B1 | 1/2011 | Sutherland et al. |
| 7,872,804 B2 | 1/2011 | Moon et al. |
| 7,884,593 B2 | 2/2011 | Simmonds et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,928,862 B1 | 4/2011 | Matthews |
| 7,936,519 B2 | 5/2011 | Mukawa et al. |
| 7,944,428 B2 | 5/2011 | Travis |
| 7,944,616 B2 | 5/2011 | Mukawa |
| 7,949,214 B2 | 5/2011 | DeJong et al. |
| D640,310 S | 6/2011 | Suzuki et al. |
| 7,961,117 B1 | 6/2011 | Zimmerman et al. |
| 7,969,644 B2 | 6/2011 | Tilleman et al. |
| 7,969,657 B2 | 6/2011 | Cakmakci et al. |
| 7,970,246 B2 | 6/2011 | Travis et al. |
| 7,976,208 B2 | 7/2011 | Travis |
| 7,984,884 B1 | 7/2011 | Iliev et al. |
| 7,999,982 B2 | 8/2011 | Endo et al. |
| 8,000,020 B2 | 8/2011 | Amitai et al. |
| 8,000,491 B2 | 8/2011 | Brodkin et al. |
| 8,004,765 B2 | 8/2011 | Amitai |
| 8,014,050 B2 | 9/2011 | McGrew |
| 8,016,475 B2 | 9/2011 | Travis |
| 8,018,579 B1 | 9/2011 | Krah |
| 8,022,942 B2 | 9/2011 | Bathiche et al. |
| 8,023,783 B2 | 9/2011 | Mukawa et al. |
| RE42,992 E | 12/2011 | David |
| 8,073,296 B2 | 12/2011 | Mukawa et al. |
| 8,077,274 B2 | 12/2011 | Sutherland et al. |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,093,451 B2 | 1/2012 | Spangenberg et al. |
| 8,098,439 B2 | 1/2012 | Amitai et al. |
| 8,107,023 B2 | 1/2012 | Simmonds et al. |
| 8,107,780 B2 | 1/2012 | Simmonds |
| 8,120,548 B1 | 2/2012 | Barber |
| 8,132,948 B2 | 3/2012 | Owen et al. |
| 8,132,976 B2 | 3/2012 | Odell et al. |
| 8,134,434 B2 | 3/2012 | Diederichs et al. |
| 8,136,690 B2 | 3/2012 | Fang et al. |
| 8,137,981 B2 | 3/2012 | Andrew et al. |
| 8,142,016 B2 | 3/2012 | Legerton et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| D659,137 S | 5/2012 | Matsumoto |
| 8,167,173 B1 | 5/2012 | Simmonds et al. |
| 8,186,874 B2 | 5/2012 | Sinbar et al. |
| 8,188,925 B2 | 5/2012 | DeJean |

(56) References Cited

U.S. PATENT DOCUMENTS

| | | |
|---|---|---|
| 8,189,263 B1 | 5/2012 | Wang et al. |
| 8,189,973 B2 | 5/2012 | Travis et al. |
| D661,334 S | 6/2012 | Cho et al. |
| D661,335 S | 6/2012 | Jeon |
| 8,194,325 B2 | 6/2012 | Levola et al. |
| 8,199,803 B2 | 6/2012 | Hauske et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,253,914 B2 | 8/2012 | Kajiya et al. |
| 8,254,031 B2 | 8/2012 | Levola |
| 8,264,498 B1 | 9/2012 | Vanderkamp et al. |
| 8,294,749 B2 | 10/2012 | Cable |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,310,327 B2 | 11/2012 | Willers et al. |
| 8,314,819 B2 | 11/2012 | Kimmel et al. |
| 8,314,993 B2 | 11/2012 | Levola et al. |
| 8,320,032 B2 | 11/2012 | Levola |
| 8,321,810 B2 | 11/2012 | Heintze |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| D673,996 S | 1/2013 | Kim et al. |
| 8,351,744 B2 | 1/2013 | Travis et al. |
| 8,354,640 B2 | 1/2013 | Hamre et al. |
| 8,354,806 B2 | 1/2013 | Travis et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,384,504 B2 | 2/2013 | Diederichs et al. |
| 8,384,694 B2 | 2/2013 | Powell et al. |
| 8,384,730 B1 | 2/2013 | Vanderkamp et al. |
| 8,396,339 B2 | 3/2013 | Mukawa et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,432,614 B2 | 4/2013 | Amitai |
| 8,441,731 B2 | 5/2013 | Sprague |
| 8,447,365 B1 | 5/2013 | Imanuel |
| 8,466,953 B2 | 6/2013 | Levola |
| 8,472,119 B1 | 6/2013 | Kelly |
| 8,472,120 B2 | 6/2013 | Border et al. |
| 8,477,261 B2 | 7/2013 | Travis et al. |
| 8,481,130 B2 | 7/2013 | Harding et al. |
| 8,482,858 B2 | 7/2013 | Sprague |
| 8,488,246 B2 | 7/2013 | Border et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,494,229 B2 | 7/2013 | Jarvenpaa et al. |
| 8,508,848 B2 | 8/2013 | Saarikko |
| 8,520,309 B2 | 8/2013 | Sprague |
| D691,192 S | 10/2013 | Stanley et al. |
| 8,547,638 B2 | 10/2013 | Levola |
| 8,548,290 B2 | 10/2013 | Travers et al. |
| 8,565,560 B2 | 10/2013 | Popovich et al. |
| D694,310 S | 11/2013 | Cho et al. |
| D694,311 S | 11/2013 | Cho et al. |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| D697,130 S | 1/2014 | Lövgren |
| 8,633,786 B2 | 1/2014 | Ermolov et al. |
| 8,634,120 B2 | 1/2014 | Popovich et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,670,029 B2 | 3/2014 | McEldowney |
| 8,693,087 B2 | 4/2014 | Nowatzyk et al. |
| 8,698,705 B2 | 4/2014 | Burke |
| 8,731,350 B1 | 5/2014 | Lin et al. |
| 8,736,802 B2 | 5/2014 | Kajiya et al. |
| 8,736,963 B2 | 5/2014 | Robbins et al. |
| 8,742,952 B1 | 6/2014 | Bold |
| 8,746,008 B1 | 6/2014 | Mauritsen et al. |
| 8,749,886 B2 | 6/2014 | Gupta |
| 8,749,890 B1 | 6/2014 | Wood et al. |
| 8,767,294 B2 | 7/2014 | Chen et al. |
| 8,786,923 B2 | 7/2014 | Chuang et al. |
| 8,810,600 B2 | 8/2014 | Bohn et al. |
| 8,810,913 B2 | 8/2014 | Simmonds et al. |
| 8,810,914 B2 | 8/2014 | Amitai |
| 8,814,691 B2 | 8/2014 | Haddick et al. |
| 8,816,578 B1 | 8/2014 | Peng et al. |
| 8,817,350 B1 | 8/2014 | Robbins et al. |
| 8,824,836 B2 | 9/2014 | Sugiyama |
| 8,830,143 B1 | 9/2014 | Pitchford et al. |
| 8,830,584 B2 | 9/2014 | Saarikko et al. |
| 8,830,588 B1 | 9/2014 | Brown et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| D718,304 S | 11/2014 | Heinrich |
| D718,366 S | 11/2014 | Mehin et al. |
| 8,885,112 B2 | 11/2014 | Popovich et al. |
| 8,885,997 B2 | 11/2014 | Nguyen et al. |
| 8,903,207 B1 | 12/2014 | Brown et al. |
| 8,906,088 B2 | 12/2014 | Pugh et al. |
| 8,913,324 B2 | 12/2014 | Schrader |
| 8,913,865 B1 | 12/2014 | Bennett |
| 8,917,453 B2 | 12/2014 | Bohn |
| 8,929,589 B2 | 1/2015 | Publicover et al. |
| 8,933,144 B2 | 1/2015 | Enomoto et al. |
| 8,934,743 B2 | 1/2015 | Nishiwaki et al. |
| 8,937,771 B2 | 1/2015 | Robbins et al. |
| 8,937,772 B1 | 1/2015 | Burns et al. |
| 8,938,141 B2 | 1/2015 | Magnusson |
| 8,950,867 B2 | 2/2015 | Macnamara |
| 8,964,298 B2 | 2/2015 | Haddick et al. |
| 8,965,152 B2 | 2/2015 | Simmonds |
| D725,102 S | 3/2015 | Lee et al. |
| 8,985,803 B2 | 3/2015 | Bohn |
| 8,989,535 B2 | 3/2015 | Robbins |
| D726,180 S | 4/2015 | Roat et al. |
| 9,019,595 B2 | 4/2015 | Jain |
| 9,025,253 B2 | 5/2015 | Hadad et al. |
| 9,035,344 B2 | 5/2015 | Jain |
| D733,709 S | 7/2015 | Kawai |
| 9,075,184 B2 | 7/2015 | Popovich et al. |
| 9,081,178 B2 | 7/2015 | Simmonds et al. |
| 9,097,890 B2 | 8/2015 | Miller et al. |
| 9,103,978 B2 | 8/2015 | Nishiwaki et al. |
| 9,128,226 B2 | 9/2015 | Fattal et al. |
| 9,129,295 B2 | 9/2015 | Border et al. |
| 9,164,290 B2 | 10/2015 | Robbins et al. |
| 9,176,324 B1 | 11/2015 | Scherer et al. |
| 9,201,270 B2 | 12/2015 | Fattal et al. |
| 9,215,293 B2 | 12/2015 | Miller |
| D746,896 S | 1/2016 | Markovitz et al. |
| 9,244,275 B1 | 1/2016 | Li |
| 9,244,280 B1 | 1/2016 | Tiana et al. |
| 9,244,281 B1 | 1/2016 | Zimmerman et al. |
| D749,074 S | 2/2016 | Cazalet et al. |
| 9,253,359 B2 | 2/2016 | Takahashi |

(56) References Cited

U.S. PATENT DOCUMENTS

| | | |
|---|---|---|
| 9,269,854 B2 | 2/2016 | Jain |
| D751,551 S | 3/2016 | Ho et al. |
| D752,129 S | 3/2016 | Lee et al. |
| 9,274,338 B2 | 3/2016 | Robbins et al. |
| 9,274,339 B1 | 3/2016 | Brown et al. |
| 9,274,349 B2 | 3/2016 | Popovich et al. |
| D754,782 S | 4/2016 | Kokinakis et al. |
| 9,310,566 B2 | 4/2016 | Valera et al. |
| 9,329,325 B2 | 5/2016 | Simmonds et al. |
| 9,335,548 B1 | 5/2016 | Cakmakci et al. |
| 9,335,604 B2 | 5/2016 | Popovich et al. |
| 9,341,846 B2 | 5/2016 | Popovich et al. |
| 9,354,366 B2 | 5/2016 | Jain |
| 9,366,862 B2 | 6/2016 | Haddick et al. |
| 9,366,864 B1 | 6/2016 | Brown et al. |
| 9,372,347 B1 | 6/2016 | Levola et al. |
| 9,377,623 B2 | 6/2016 | Robbins et al. |
| 9,377,852 B1 | 6/2016 | Shapiro et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,429,692 B1 | 8/2016 | Saarikko et al. |
| 9,431,794 B2 | 8/2016 | Jain |
| 9,456,744 B2 | 10/2016 | Popovich et al. |
| 9,459,451 B2 | 10/2016 | Saarikko et al. |
| 9,464,779 B2 | 10/2016 | Popovich et al. |
| 9,465,213 B2 | 10/2016 | Simmonds |
| 9,465,227 B2 | 10/2016 | Popovich et al. |
| 9,494,799 B2 | 11/2016 | Robbins et al. |
| 9,507,150 B1 | 11/2016 | Stratton et al. |
| 9,513,480 B2 | 12/2016 | Saarikko et al. |
| 9,516,193 B2 | 12/2016 | Aramaki |
| 9,519,089 B1 | 12/2016 | Brown et al. |
| 9,523,852 B1 | 12/2016 | Brown et al. |
| 9,535,253 B2 | 1/2017 | Levola et al. |
| 9,541,383 B2 | 1/2017 | Abovitz et al. |
| 9,541,763 B1 | 1/2017 | Heberlein et al. |
| 9,547,174 B2 | 1/2017 | Gao et al. |
| 9,551,468 B2 | 1/2017 | Jones |
| 9,551,874 B2 | 1/2017 | Amitai |
| 9,551,880 B2 | 1/2017 | Amitai |
| 9,599,813 B1 | 3/2017 | Stratton et al. |
| 9,612,403 B2 | 4/2017 | Abovitz et al. |
| 9,632,226 B2 | 4/2017 | Waldern et al. |
| 9,635,352 B1 | 4/2017 | Henry et al. |
| 9,648,313 B1 | 5/2017 | Henry et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,671,612 B2 | 6/2017 | Kress et al. |
| 9,674,413 B1 | 6/2017 | Tiana et al. |
| 9,678,345 B1 | 6/2017 | Melzer et al. |
| 9,679,367 B1 | 6/2017 | Wald |
| 9,715,067 B1 | 7/2017 | Brown et al. |
| 9,715,110 B1 | 7/2017 | Brown et al. |
| D793,468 S | 8/2017 | Yu et al. |
| D795,865 S | 8/2017 | Porter et al. |
| D795,866 S | 8/2017 | Porter et al. |
| 9,726,540 B2 | 8/2017 | Popovich et al. |
| 9,727,772 B2 | 8/2017 | Popovich et al. |
| 9,733,475 B1 | 8/2017 | Brown et al. |
| 9,746,688 B2 | 8/2017 | Popovich et al. |
| 9,754,507 B1 | 9/2017 | Wenger et al. |
| 9,762,895 B1 | 9/2017 | Henry et al. |
| 9,766,465 B1 | 9/2017 | Tiana et al. |
| 9,785,231 B1 | 10/2017 | Zimmerman |
| 9,791,694 B1 | 10/2017 | Haverkamp et al. |
| 9,791,696 B2 | 10/2017 | Woltman et al. |
| 9,804,316 B2 | 10/2017 | Drolet et al. |
| 9,804,389 B2 | 10/2017 | Popovich et al. |
| 9,823,423 B2 | 11/2017 | Waldern et al. |
| 9,857,605 B2 | 1/2018 | Popovich et al. |
| 9,874,931 B1 | 1/2018 | Koenck et al. |
| 9,933,684 B2 | 4/2018 | Brown et al. |
| 9,977,247 B1 | 5/2018 | Brown et al. |
| D827,641 S | 9/2018 | Morisawa |
| 10,088,686 B2 | 10/2018 | Robbins et al. |
| 10,089,516 B2 | 10/2018 | Popovich et al. |
| 10,156,681 B2 | 12/2018 | Waldern et al. |
| 10,185,154 B2 | 1/2019 | Popovich et al. |
| D840,454 S | 2/2019 | Han et al. |
| 10,209,517 B2 | 2/2019 | Popovich et al. |
| 10,216,061 B2 | 2/2019 | Popovich et al. |
| 10,234,696 B2 | 3/2019 | Popovich et al. |
| 10,241,330 B2 | 3/2019 | Popovich et al. |
| 10,330,777 B2 | 6/2019 | Popovich et al. |
| 10,359,736 B2 | 7/2019 | Popovich et al. |
| D855,687 S | 8/2019 | Villalpando |
| D859,510 S | 9/2019 | Harmon et al. |
| 10,409,144 B2 | 9/2019 | Popovich et al. |
| 10,423,222 B2 | 9/2019 | Popovich et al. |
| 10,423,813 B2 | 9/2019 | Popovich et al. |
| 10,437,051 B2 | 10/2019 | Popovich et al. |
| 10,437,064 B2 | 10/2019 | Popovich et al. |
| 10,459,311 B2 | 10/2019 | Popovich et al. |
| D871,494 S | 12/2019 | Yamada et al. |
| D872,170 S | 1/2020 | Evans et al. |
| D872,794 S | 1/2020 | Wilkins |
| 10,527,797 B2 | 1/2020 | Waldern et al. |
| 10,532,594 B2 | 1/2020 | Akahane et al. |
| 10,545,346 B2 | 1/2020 | Waldern et al. |
| D880,575 S | 4/2020 | Thixton |
| 10,642,058 B2 | 5/2020 | Popovich et al. |
| 10,670,876 B2 | 6/2020 | Popovich et al. |
| 10,678,053 B2 | 6/2020 | Waldern et al. |
| 10,690,916 B2 * | 6/2020 | Popovich ............. G02B 6/0076 |
| 10,705,281 B2 | 7/2020 | Fattal et al. |
| 10,725,312 B2 | 7/2020 | Popovich et al. |
| 10,732,569 B2 | 8/2020 | Waldern et al. |
| 10,859,768 B2 | 12/2020 | Popovich et al. |
| 10,890,707 B2 | 1/2021 | Waldern et al. |
| 2001/0024177 A1 | 9/2001 | Popovich |
| 2001/0043163 A1 | 11/2001 | Waldern et al. |
| 2001/0046142 A1 | 11/2001 | Van Santen et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0012064 A1 | 1/2002 | Yamaguchi |
| 2002/0021407 A1 | 2/2002 | Elliott |
| 2002/0021461 A1 | 2/2002 | Ono et al. |
| 2002/0036825 A1 | 3/2002 | Lipton et al. |
| 2002/0047837 A1 | 4/2002 | Suyama et al. |
| 2002/0075240 A1 | 6/2002 | Lieberman et al. |
| 2002/0093701 A1 | 7/2002 | Zhang et al. |
| 2002/0110077 A1 | 8/2002 | Drobot et al. |
| 2002/0126332 A1 | 9/2002 | Popovich |
| 2002/0127497 A1 | 9/2002 | Brown et al. |
| 2002/0131175 A1 | 9/2002 | Yagi et al. |
| 2002/0150032 A1 | 10/2002 | Nishiuchi et al. |
| 2002/0167462 A1 | 11/2002 | Lewis et al. |
| 2002/0196332 A1 | 12/2002 | Lipton et al. |
| 2003/0007070 A1 | 1/2003 | Lipton et al. |
| 2003/0025881 A1 | 2/2003 | Hwang |
| 2003/0030912 A1 | 2/2003 | Gleckman et al. |
| 2003/0038912 A1 | 2/2003 | Broer et al. |
| 2003/0039442 A1 | 2/2003 | Bond et al. |
| 2003/0063042 A1 | 4/2003 | Friesem et al. |
| 2003/0063884 A1 | 4/2003 | Smith et al. |
| 2003/0067685 A1 | 4/2003 | Niv |
| 2003/0086670 A1 | 5/2003 | Moridaira et al. |
| 2003/0107809 A1 | 6/2003 | Chen et al. |
| 2003/0149346 A1 | 8/2003 | Arnone et al. |
| 2003/0175004 A1 | 9/2003 | Garito et al. |
| 2003/0197154 A1 | 10/2003 | Manabe et al. |
| 2003/0197157 A1 | 10/2003 | Sutherland et al. |
| 2003/0202247 A1 | 10/2003 | Niv et al. |
| 2003/0206329 A1 | 11/2003 | Ikeda et al. |
| 2003/0228019 A1 | 12/2003 | Eichler et al. |
| 2004/0004767 A1 | 1/2004 | Song |
| 2004/0012833 A1 | 1/2004 | Newswanger et al. |
| 2004/0047938 A1 | 3/2004 | Kosuga et al. |
| 2004/0057138 A1 | 3/2004 | Tanijiri et al. |
| 2004/0075830 A1 | 4/2004 | Miyake et al. |

(56) References Cited

U.S. PATENT DOCUMENTS

| | | |
|---|---|---|
| 2004/0089842 A1 | 5/2004 | Sutehrland et al. |
| 2004/0108971 A1 | 6/2004 | Waldern et al. |
| 2004/0109234 A1 | 6/2004 | Levola |
| 2004/0112862 A1 | 6/2004 | Willson et al. |
| 2004/0130797 A1 | 7/2004 | Leigh |
| 2004/0141217 A1 | 7/2004 | Endo et al. |
| 2004/0156008 A1 | 8/2004 | Reznikov et al. |
| 2004/0174348 A1 | 9/2004 | David |
| 2004/0175627 A1 | 9/2004 | Sutherland et al. |
| 2004/0179764 A1 | 9/2004 | Melikechi et al. |
| 2004/0184156 A1 | 9/2004 | Gunn, III et al. |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2004/0225025 A1 | 11/2004 | Sullivan et al. |
| 2004/0263969 A1 | 12/2004 | Lipton et al. |
| 2004/0263971 A1 | 12/2004 | Lipton et al. |
| 2005/0018304 A1 | 1/2005 | Lipton et al. |
| 2005/0047705 A1 | 3/2005 | Domash et al. |
| 2005/0079663 A1 | 4/2005 | Masutani et al. |
| 2005/0083564 A1 | 4/2005 | Mallya et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0135747 A1 | 6/2005 | Greiner et al. |
| 2005/0136260 A1 | 6/2005 | Garcia |
| 2005/0141066 A1 | 6/2005 | Ouchi |
| 2005/0174321 A1 | 8/2005 | Ikeda et al. |
| 2005/0180687 A1 | 8/2005 | Amitai |
| 2005/0195276 A1 | 9/2005 | Lipton et al. |
| 2005/0218377 A1 | 10/2005 | Lawandy |
| 2005/0231774 A1 | 10/2005 | Hayashi et al. |
| 2005/0232530 A1 | 10/2005 | Kekas |
| 2005/0254752 A1 | 11/2005 | Domash et al. |
| 2005/0259217 A1 | 11/2005 | Lin et al. |
| 2005/0259302 A9 | 11/2005 | Metz et al. |
| 2005/0259944 A1 | 11/2005 | Anderson et al. |
| 2005/0265585 A1 | 12/2005 | Rowe |
| 2005/0269481 A1 | 12/2005 | David et al. |
| 2005/0271258 A1 | 12/2005 | Rowe |
| 2005/0286133 A1 | 12/2005 | Lipton |
| 2006/0002274 A1 | 1/2006 | Kihara et al. |
| 2006/0012878 A1 | 1/2006 | Lipton et al. |
| 2006/0013977 A1 | 1/2006 | Duke et al. |
| 2006/0043938 A1 | 3/2006 | O'Gorman et al. |
| 2006/0055993 A1 | 3/2006 | Kobayashi et al. |
| 2006/0093012 A1 | 5/2006 | Singh et al. |
| 2006/0093793 A1 | 5/2006 | Miyakawa et al. |
| 2006/0114564 A1 | 6/2006 | Sutherland et al. |
| 2006/0119837 A1 | 6/2006 | Raguin et al. |
| 2006/0119916 A1 | 6/2006 | Sutherland et al. |
| 2006/0126179 A1 | 6/2006 | Levola |
| 2006/0132914 A1 | 6/2006 | Weiss et al. |
| 2006/0142455 A1 | 6/2006 | Agarwal et al. |
| 2006/0146422 A1 | 7/2006 | Koike |
| 2006/0159864 A1 | 7/2006 | Natarajan et al. |
| 2006/0164593 A1 | 7/2006 | Peyghambarian et al. |
| 2006/0171647 A1 | 8/2006 | Ye et al. |
| 2006/0177180 A1 | 8/2006 | Tazawa et al. |
| 2006/0181683 A1 | 8/2006 | Bhowmik et al. |
| 2006/0191293 A1 | 8/2006 | Kuczma |
| 2006/0215244 A1 | 9/2006 | Yosha et al. |
| 2006/0215976 A1 | 9/2006 | Singh et al. |
| 2006/0221063 A1 | 10/2006 | Ishihara |
| 2006/0221448 A1 | 10/2006 | Nivon et al. |
| 2006/0228073 A1 | 10/2006 | Mukawa et al. |
| 2006/0268104 A1 | 11/2006 | Cowan et al. |
| 2006/0268412 A1 | 11/2006 | Downing et al. |
| 2006/0279662 A1 | 12/2006 | Kapellner et al. |
| 2006/0284974 A1 | 12/2006 | Lipton et al. |
| 2006/0285205 A1 | 12/2006 | Lipton et al. |
| 2006/0291021 A1 | 12/2006 | Mukawa |
| 2006/0291052 A1 | 12/2006 | Lipton et al. |
| 2006/0292493 A1 | 12/2006 | Shinotsuka et al. |
| 2007/0012777 A1 | 1/2007 | Tsikos et al. |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0053032 A1 | 3/2007 | Popovich |
| 2007/0070476 A1 | 3/2007 | Yamada et al. |
| 2007/0070504 A1 | 3/2007 | Akutsu et al. |
| 2007/0089625 A1 | 4/2007 | Grinberg et al. |
| 2007/0097502 A1 | 5/2007 | Lipton et al. |
| 2007/0109400 A1 | 5/2007 | Woodgate et al. |
| 2007/0109401 A1 | 5/2007 | Lipton et al. |
| 2007/0116409 A1 | 5/2007 | Bryan et al. |
| 2007/0127348 A1 | 6/2007 | Ooi et al. |
| 2007/0133089 A1 | 6/2007 | Lipton et al. |
| 2007/0133920 A1 | 6/2007 | Lee et al. |
| 2007/0133983 A1 | 6/2007 | Traff |
| 2007/0146624 A1 | 6/2007 | Duston et al. |
| 2007/0146625 A1 | 6/2007 | Ooi et al. |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0182915 A1 | 8/2007 | Osawa et al. |
| 2007/0183650 A1 | 8/2007 | Lipton et al. |
| 2007/0188602 A1 | 8/2007 | Cowan et al. |
| 2007/0188837 A1 | 8/2007 | Shimizu et al. |
| 2007/0195409 A1 | 8/2007 | Yun et al. |
| 2007/0206155 A1 | 9/2007 | Lipton |
| 2007/0211164 A1 | 9/2007 | Olsen et al. |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0001909 A1 | 1/2008 | Lim |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0089073 A1 | 4/2008 | Hikmet |
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |
| 2008/0136916 A1 | 6/2008 | Wolff |
| 2008/0136923 A1 | 6/2008 | Inbar et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0151379 A1 | 6/2008 | Amitai |
| 2008/0186573 A1 | 8/2008 | Lipton |
| 2008/0186574 A1 | 8/2008 | Robinson et al. |
| 2008/0186604 A1 | 8/2008 | Amitai |
| 2008/0193085 A1 | 8/2008 | Singh et al. |
| 2008/0198471 A1 | 8/2008 | Amitai |
| 2008/0225187 A1 | 9/2008 | Yamanaka |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0278812 A1 | 11/2008 | Amitai |
| 2008/0285137 A1 | 11/2008 | Simmonds et al. |
| 2008/0285140 A1 | 11/2008 | Amitai |
| 2008/0297731 A1 | 12/2008 | Powell et al. |
| 2008/0297807 A1 | 12/2008 | Feldman et al. |
| 2008/0298649 A1 | 12/2008 | Ennis et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0309586 A1 | 12/2008 | Vitale |
| 2008/0316303 A1 | 12/2008 | Chiu et al. |
| 2008/0316375 A1 | 12/2008 | Lipton et al. |
| 2009/0017424 A1 | 1/2009 | Yoeli et al. |
| 2009/0019222 A1 | 1/2009 | Verma et al. |
| 2009/0052017 A1 | 2/2009 | Sasaki |
| 2009/0052046 A1 | 2/2009 | Amitai |
| 2009/0052047 A1 | 2/2009 | Amitai |

(56) References Cited

U.S. PATENT DOCUMENTS

| | | |
|---|---|---|
| 2009/0067774 A1 | 3/2009 | Magnusson |
| 2009/0074356 A1 | 3/2009 | Sanchez et al. |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128495 A1 | 5/2009 | Kong et al. |
| 2009/0128902 A1 | 5/2009 | Niv et al. |
| 2009/0128911 A1 | 5/2009 | Itzkovitch et al. |
| 2009/0136246 A1 | 5/2009 | Murakami |
| 2009/0141324 A1 | 6/2009 | Mukawa |
| 2009/0153437 A1 | 6/2009 | Aharoni |
| 2009/0169152 A1 | 7/2009 | Oestergard |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0242021 A1 | 10/2009 | Petkie et al. |
| 2009/0296218 A1 | 12/2009 | Ryytty |
| 2009/0303599 A1 | 12/2009 | Levola |
| 2009/0316246 A1 | 12/2009 | Asai et al. |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0060551 A1 | 3/2010 | Sugiyama et al. |
| 2010/0060990 A1 | 3/2010 | Wertheim et al. |
| 2010/0065726 A1 | 3/2010 | Zhong et al. |
| 2010/0079865 A1 | 4/2010 | Saarikko et al. |
| 2010/0086256 A1 | 4/2010 | Ben Bakir et al. |
| 2010/0092124 A1 | 4/2010 | Magnusson et al. |
| 2010/0096562 A1 | 4/2010 | Klunder et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0135615 A1 | 6/2010 | Ho et al. |
| 2010/0136319 A1 | 6/2010 | Imai et al. |
| 2010/0141555 A1 | 6/2010 | Rorberg et al. |
| 2010/0141905 A1 | 6/2010 | Burke |
| 2010/0149073 A1 | 6/2010 | Chaum et al. |
| 2010/0165465 A1 | 7/2010 | Levola |
| 2010/0165660 A1 | 7/2010 | Weber et al. |
| 2010/0171680 A1 | 7/2010 | Lapidot et al. |
| 2010/0177388 A1 | 7/2010 | Cohen et al. |
| 2010/0202725 A1 | 8/2010 | Popovich et al. |
| 2010/0214659 A1 | 8/2010 | Levola |
| 2010/0220293 A1 | 9/2010 | Mizushima et al. |
| 2010/0225834 A1 | 9/2010 | Li |
| 2010/0225876 A1 | 9/2010 | Escuti et al. |
| 2010/0231532 A1 | 9/2010 | Nho et al. |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0245756 A1 | 9/2010 | Sugihara et al. |
| 2010/0245757 A1 | 9/2010 | Sugihara et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0284180 A1 | 11/2010 | Popovich et al. |
| 2010/0296163 A1 | 11/2010 | Saarikko |
| 2010/0299814 A1 | 12/2010 | Celona et al. |
| 2010/0315719 A1 | 12/2010 | Saarikko et al. |
| 2010/0321781 A1 | 12/2010 | Levola et al. |
| 2010/0322555 A1 | 12/2010 | Vermeulen et al. |
| 2011/0001895 A1 | 1/2011 | Dahl |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0038024 A1 | 2/2011 | Wang et al. |
| 2011/0050548 A1 | 3/2011 | Blumenfeld et al. |
| 2011/0063604 A1 | 3/2011 | Hamre et al. |
| 2011/0096401 A1 | 4/2011 | Levola |
| 2011/0102711 A1 | 5/2011 | Sutherland et al. |
| 2011/0109880 A1 | 5/2011 | Nummela |
| 2011/0157707 A1 | 6/2011 | Tilleman et al. |
| 2011/0164221 A1 | 7/2011 | Tilleman et al. |
| 2011/0187293 A1 | 8/2011 | Travis et al. |
| 2011/0211239 A1 | 9/2011 | Mukawa et al. |
| 2011/0221656 A1 | 9/2011 | Haddick et al. |
| 2011/0235179 A1 | 9/2011 | Simmonds |
| 2011/0235365 A1 | 9/2011 | McCollum et al. |
| 2011/0236803 A1 | 9/2011 | Weiser et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0027347 A1 | 2/2012 | Mathal et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0099203 A1 | 4/2012 | Boubis et al. |
| 2012/0105634 A1 | 5/2012 | Meidan et al. |
| 2012/0105740 A1 | 5/2012 | Jannard et al. |
| 2012/0120493 A1 | 5/2012 | Simmonds et al. |
| 2012/0127577 A1 | 5/2012 | Desserouer |
| 2012/0162549 A1 | 6/2012 | Gao et al. |
| 2012/0162764 A1 | 6/2012 | Shimizu |
| 2012/0176665 A1 | 7/2012 | Song et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0218481 A1 | 8/2012 | Popovich et al. |
| 2012/0224062 A1 | 9/2012 | Lacoste et al. |
| 2012/0235884 A1 | 9/2012 | Miller et al. |
| 2012/0235886 A1 | 9/2012 | Border et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0281943 A1 | 11/2012 | Popovich et al. |
| 2012/0290973 A1 | 11/2012 | Robertson et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2012/0326950 A1 | 12/2012 | Park et al. |
| 2013/0016324 A1 | 1/2013 | Travis |
| 2013/0016362 A1 | 1/2013 | Gong et al. |
| 2013/0021392 A1 | 1/2013 | Travis |
| 2013/0021586 A1 | 1/2013 | Lippey |
| 2013/0027006 A1 | 1/2013 | Holloway et al. |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0088637 A1 | 4/2013 | Duparre |
| 2013/0093893 A1 | 4/2013 | Schofield et al. |
| 2013/0101253 A1 | 4/2013 | Popovich et al. |

(56) References Cited

U.S. PATENT DOCUMENTS

| | | |
|---|---|---|
| 2013/0107186 A1 | 5/2013 | Ando et al. |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0138275 A1 | 5/2013 | Nauman et al. |
| 2013/0141937 A1 | 6/2013 | Katsuta et al. |
| 2013/0143336 A1 | 6/2013 | Jain |
| 2013/0163089 A1 | 6/2013 | Bohn |
| 2013/0170031 A1 | 7/2013 | Bohn et al. |
| 2013/0176704 A1 | 7/2013 | Lanman et al. |
| 2013/0184904 A1 | 7/2013 | Gadzinski |
| 2013/0200710 A1 | 8/2013 | Robbins |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0249895 A1 | 9/2013 | Westerinen et al. |
| 2013/0250207 A1 | 9/2013 | Bohn |
| 2013/0250380 A1 | 9/2013 | Fujikawa et al. |
| 2013/0250430 A1 | 9/2013 | Robbins et al. |
| 2013/0250431 A1 | 9/2013 | Robbins et al. |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0286053 A1 | 10/2013 | Fleck et al. |
| 2013/0301014 A1 | 11/2013 | DeJong et al. |
| 2013/0305437 A1 | 11/2013 | Weller et al. |
| 2013/0312811 A1 | 11/2013 | Aspnes et al. |
| 2013/0314789 A1 | 11/2013 | Saarikko et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2013/0342525 A1 | 12/2013 | Benko et al. |
| 2014/0003762 A1 | 1/2014 | Macnamara |
| 2014/0009809 A1 | 1/2014 | Pyun et al. |
| 2014/0022616 A1 | 1/2014 | Popovich et al. |
| 2014/0024159 A1 | 1/2014 | Jain |
| 2014/0027006 A1 | 1/2014 | Foley et al. |
| 2014/0037242 A1 | 2/2014 | Popovich et al. |
| 2014/0043672 A1 | 2/2014 | Clarke et al. |
| 2014/0043689 A1 | 2/2014 | Mason |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0104685 A1 | 4/2014 | Bohn et al. |
| 2014/0118647 A1 | 5/2014 | Momonoi et al. |
| 2014/0126029 A1 | 5/2014 | Fuetterer |
| 2014/0130132 A1 | 5/2014 | Cahill et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0154614 A1 | 6/2014 | Xie et al. |
| 2014/0160576 A1 | 6/2014 | Robbins et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0168783 A1 | 6/2014 | Luebke et al. |
| 2014/0172296 A1 | 6/2014 | Shtukater |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0198896 A1 | 7/2014 | Hemmendorff et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason |
| 2014/0240842 A1 | 8/2014 | Nguyen et al. |
| 2014/0255662 A1 | 9/2014 | Enomoto et al. |
| 2014/0267420 A1 | 9/2014 | Schowengerdt et al. |
| 2014/0268017 A1 | 9/2014 | Sweis et al. |
| 2014/0268353 A1 | 9/2014 | Fujimura et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0086907 A1 | 3/2015 | Mizuta et al. |
| 2015/0107671 A1 | 4/2015 | Bodan et al. |
| 2015/0109763 A1 | 4/2015 | Shinkai et al. |
| 2015/0125109 A1 | 5/2015 | Robbins et al. |
| 2015/0148728 A1 | 5/2015 | Sallum et al. |
| 2015/0160529 A1 | 6/2015 | Popovich et al. |
| 2015/0167868 A1 | 6/2015 | Boncha |
| 2015/0177443 A1 | 6/2015 | Faecke et al. |
| 2015/0177686 A1 | 6/2015 | Lee et al. |
| 2015/0177688 A1 | 6/2015 | Popovich et al. |
| 2015/0185475 A1 | 7/2015 | Saarikko et al. |
| 2015/0219834 A1 | 8/2015 | Nichol et al. |
| 2015/0235447 A1 | 8/2015 | Abovitz et al. |
| 2015/0235448 A1 | 8/2015 | Schowengerdt et al. |
| 2015/0243068 A1 | 8/2015 | Solomon |
| 2015/0247975 A1 | 9/2015 | Abovitz et al. |
| 2015/0260994 A1 | 9/2015 | Akutsu et al. |
| 2015/0262424 A1 | 9/2015 | Tabaka et al. |
| 2015/0268399 A1 | 9/2015 | Futterer |
| 2015/0268415 A1 | 9/2015 | Schowengerdt et al. |
| 2015/0277375 A1 | 10/2015 | Large et al. |
| 2015/0285682 A1 | 10/2015 | Popovich et al. |
| 2015/0288129 A1 | 10/2015 | Jain |
| 2015/0289762 A1 | 10/2015 | Popovich et al. |
| 2015/0309264 A1 | 10/2015 | Abovitz et al. |
| 2015/0316768 A1 | 11/2015 | Simmonds |
| 2015/0338689 A1 | 11/2015 | Min et al. |
| 2015/0346490 A1 | 12/2015 | Tekolste et al. |
| 2015/0346495 A1 | 12/2015 | Welch et al. |
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0018673 A1 | 1/2016 | Wang |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0055822 A1 | 2/2016 | Bell |
| 2016/0077338 A1 | 3/2016 | Robbins et al. |
| 2016/0085300 A1 | 3/2016 | Robbins et al. |
| 2016/0097959 A1 | 4/2016 | Bruizeman et al. |
| 2016/0116739 A1 | 4/2016 | TeKolste et al. |
| 2016/0124223 A1 | 5/2016 | Shinbo et al. |
| 2016/0124241 A1 | 5/2016 | Popovich et al. |
| 2016/0132025 A1 | 5/2016 | Taff et al. |
| 2016/0170226 A1 | 6/2016 | Popovich et al. |
| 2016/0178901 A1 | 6/2016 | Ishikawa |
| 2016/0195664 A1 | 7/2016 | Fattal et al. |
| 2016/0209648 A1 | 7/2016 | Haddick et al. |
| 2016/0209657 A1 | 7/2016 | Popovich et al. |
| 2016/0231568 A1 | 8/2016 | Saarikko et al. |
| 2016/0231570 A1 | 8/2016 | Levola et al. |
| 2016/0238772 A1 | 8/2016 | Waldern et al. |
| 2016/0266398 A1 | 9/2016 | Poon et al. |

(56) References Cited

U.S. PATENT DOCUMENTS

| | | |
|---|---|---|
| 2016/0274362 A1 | 9/2016 | Tinch et al. |
| 2016/0283773 A1 | 9/2016 | Popovich et al. |
| 2016/0291328 A1 | 10/2016 | Popovich et al. |
| 2016/0299344 A1 | 10/2016 | Dobschal et al. |
| 2016/0320536 A1 | 11/2016 | Simmonds et al. |
| 2016/0327705 A1 | 11/2016 | Simmonds et al. |
| 2016/0336033 A1 | 11/2016 | Tanaka |
| 2016/0341964 A1 | 11/2016 | Amitai |
| 2016/0377879 A1 | 12/2016 | Popovich et al. |
| 2017/0003505 A1 | 1/2017 | Vallius et al. |
| 2017/0010466 A1 | 1/2017 | Klug et al. |
| 2017/0010488 A1 | 1/2017 | Klug et al. |
| 2017/0030550 A1 | 2/2017 | Popovich et al. |
| 2017/0031160 A1 | 2/2017 | Popovich et al. |
| 2017/0031171 A1 | 2/2017 | Vallius et al. |
| 2017/0032166 A1 | 2/2017 | Raguin et al. |
| 2017/0034435 A1 | 2/2017 | Vallius |
| 2017/0038579 A1 | 2/2017 | Yeoh et al. |
| 2017/0052374 A1 | 2/2017 | Waldern et al. |
| 2017/0052376 A1 | 2/2017 | Amitai et al. |
| 2017/0059759 A1 | 3/2017 | Ayres et al. |
| 2017/0059775 A1 | 3/2017 | Coles et al. |
| 2017/0102543 A1 | 4/2017 | Vallius |
| 2017/0115487 A1 | 4/2017 | Travis et al. |
| 2017/0123208 A1 | 5/2017 | Vallius |
| 2017/0131460 A1 | 5/2017 | Lin et al. |
| 2017/0131545 A1 | 5/2017 | Wall et al. |
| 2017/0131546 A1 | 5/2017 | Woltman et al. |
| 2017/0131551 A1 | 5/2017 | Robbins et al. |
| 2017/0160546 A1 | 6/2017 | Bull et al. |
| 2017/0180404 A1 | 6/2017 | Bersch et al. |
| 2017/0180408 A1 | 6/2017 | Yu et al. |
| 2017/0192246 A9 | 7/2017 | Popovich et al. |
| 2017/0199333 A1 | 7/2017 | Waldern et al. |
| 2017/0212295 A1 | 7/2017 | Vasylyev |
| 2017/0219841 A1 | 8/2017 | Popovich et al. |
| 2017/0255257 A1 | 9/2017 | Tiana et al. |
| 2017/0276940 A1 | 9/2017 | Popovich et al. |
| 2017/0299860 A1 | 10/2017 | Wall et al. |
| 2017/0356801 A1 | 12/2017 | Popovich et al. |
| 2017/0357841 A1 | 12/2017 | Popovich et al. |
| 2018/0011324 A1 | 1/2018 | Popovich et al. |
| 2018/0052277 A1 | 2/2018 | Schowengerdt et al. |
| 2018/0059305 A1 | 3/2018 | Popovich et al. |
| 2018/0074265 A1 | 3/2018 | Waldern et al. |
| 2018/0074352 A1 | 3/2018 | Popovich et al. |
| 2018/0081190 A1 | 3/2018 | Lee et al. |
| 2018/0107011 A1 | 4/2018 | Lu et al. |
| 2018/0113303 A1 | 4/2018 | Popovich et al. |
| 2018/0120669 A1 | 5/2018 | Popovich et al. |
| 2018/0143449 A1 | 5/2018 | Popovich et al. |
| 2018/0188542 A1 | 7/2018 | Waldern et al. |
| 2018/0210198 A1 | 7/2018 | Brown et al. |
| 2018/0210396 A1 | 7/2018 | Popovich et al. |
| 2018/0232048 A1 | 8/2018 | Popovich et al. |
| 2018/0246354 A1 | 8/2018 | Popovich et al. |
| 2018/0252869 A1 | 9/2018 | Ayres et al. |
| 2018/0275350 A1 | 9/2018 | Oh et al. |
| 2018/0275402 A1 | 9/2018 | Popovich et al. |
| 2018/0275410 A1 | 9/2018 | Yeoh et al. |
| 2018/0284440 A1 | 10/2018 | Popovich et al. |
| 2018/0348524 A1 | 12/2018 | Blum et al. |
| 2018/0373115 A1 | 12/2018 | Brown et al. |
| 2019/0041634 A1 | 2/2019 | Popovich et al. |
| 2019/0042827 A1 | 2/2019 | Popovich et al. |
| 2019/0064735 A1 | 2/2019 | Waldern et al. |
| 2019/0072723 A1 | 3/2019 | Waldern et al. |
| 2019/0094548 A1 | 3/2019 | Nicholson et al. |
| 2019/0113751 A9 | 4/2019 | Waldern et al. |
| 2019/0113829 A1 | 4/2019 | Waldern et al. |
| 2019/0121027 A1 | 4/2019 | Popovich et al. |
| 2019/0129085 A1 | 5/2019 | Waldern et al. |
| 2019/0171031 A1 | 6/2019 | Popovich et al. |
| 2019/0179153 A1 | 6/2019 | Popovich et al. |
| 2019/0187538 A1 | 6/2019 | Popovich et al. |
| 2019/0188471 A1 | 6/2019 | Osterhout et al. |
| 2019/0212195 A9 | 7/2019 | Popovich et al. |
| 2019/0212573 A1 | 7/2019 | Popovich et al. |
| 2019/0212588 A1 | 7/2019 | Waldern et al. |
| 2019/0212589 A1 | 7/2019 | Waldern et al. |
| 2019/0212596 A1 | 7/2019 | Waldern et al. |
| 2019/0212597 A1 | 7/2019 | Waldern et al. |
| 2019/0212698 A1 | 7/2019 | Waldern et al. |
| 2019/0212699 A1 | 7/2019 | Waldern et al. |
| 2019/0219822 A1 | 7/2019 | Popovich et al. |
| 2019/0265486 A1 | 8/2019 | Hansotte et al. |
| 2019/0278224 A1 | 9/2019 | Schlottau et al. |
| 2019/0319426 A1 | 10/2019 | Lu et al. |
| 2019/0339558 A1 | 11/2019 | Waldern et al. |
| 2020/0026074 A1 | 1/2020 | Waldern et al. |
| 2020/0033190 A1 | 1/2020 | Popovich et al. |
| 2020/0033801 A1 | 1/2020 | Waldern et al. |
| 2020/0033802 A1 | 1/2020 | Popovich et al. |
| 2020/0057353 A1 | 2/2020 | Popovich et al. |
| 2020/0064637 A1 | 2/2020 | Popovich et al. |
| 2020/0081317 A1 | 3/2020 | Popovich et al. |
| 2020/0103661 A1 | 4/2020 | Kamakura |
| 2020/0142131 A1 | 5/2020 | Waldern et al. |
| 2020/0159026 A1 | 5/2020 | Waldern et al. |
| 2020/0183163 A1 | 6/2020 | Waldern et al. |
| 2020/0201042 A1 | 6/2020 | Wang et al. |
| 2020/0201051 A1* | 6/2020 | Popovich ............. G02B 5/1866 |
| 2020/0225471 A1 | 7/2020 | Waldern et al. |
| 2020/0249484 A1 | 8/2020 | Waldern et al. |
| 2020/0249491 A1 | 8/2020 | Popovich et al. |
| 2020/0264378 A1 | 8/2020 | Grant et al. |
| 2020/0271973 A1 | 8/2020 | Waldern et al. |
| 2020/0292745 A1 | 9/2020 | Waldern et al. |
| 2020/0341194 A1 | 10/2020 | Waldern et al. |
| 2020/0348519 A1 | 11/2020 | Waldern et al. |
| 2020/0363771 A1 | 11/2020 | Waldern et al. |
| 2021/0055551 A1 | 2/2021 | Chi et al. |
| 2021/0216040 A1 | 7/2021 | Waldern et al. |

FOREIGN PATENT DOCUMENTS

| | | |
|---|---|---|
| CN | 1320217 A | 10/2001 |
| CN | 1886680 A | 12/2006 |
| CN | 200944140 Y | 9/2007 |
| CN | 101103297 A | 1/2008 |
| CN | 101151562 A | 3/2008 |
| CN | 101263412 A | 9/2008 |
| CN | 100492099 C | 5/2009 |
| CN | 101589326 A | 11/2009 |
| CN | 101688977 A | 3/2010 |
| CN | 101793555 A | 8/2010 |
| CN | 101881936 A | 11/2010 |
| CN | 101945612 A | 1/2011 |
| CN | 102314092 A | 1/2012 |
| CN | 102498425 A | 6/2012 |
| CN | 102782563 A | 11/2012 |
| CN | 102928981 A | 2/2013 |
| CN | 103000188 A | 3/2013 |
| CN | 103562802 A | 2/2014 |
| CN | 103777282 A | 5/2014 |
| CN | 103823267 A | 5/2014 |
| CN | 103959133 A | 7/2014 |
| CN | 10440410 A | 9/2014 |
| CN | 1040400308 A | 9/2014 |
| CN | 104204901 A | 12/2014 |
| CN | 303019849 | 12/2014 |
| CN | 303217936 | 5/2015 |
| CN | 104956252 A | 9/2015 |
| CN | 105074537 A | 11/2015 |
| CN | 105074539 A | 11/2015 |
| CN | 105190407 A | 12/2015 |
| CN | 105229514 A | 1/2016 |
| CN | 105393159 A | 3/2016 |
| CN | 105408801 A | 3/2016 |
| CN | 105408802 A | 3/2016 |
| CN | 105408803 A | 3/2016 |
| CN | 105531716 A | 4/2016 |
| CN | 105705981 A | 6/2016 |
| CN | 10612538 A | 11/2016 |

(56) References Cited

FOREIGN PATENT DOCUMENTS

| | | |
|---|---|---|
| CN | 106950744 A | 7/2017 |
| CN | 107466372 A | 12/2017 |
| CN | 107873086 A | 4/2018 |
| CN | 108474945 A | 8/2018 |
| CN | 108780224 A | 11/2018 |
| CN | 109154717 A | 1/2019 |
| CN | 103823267 B | 5/2019 |
| CN | 110383117 A | 10/2019 |
| CN | 107873086 B | 3/2020 |
| CN | 111323867 A | 6/2020 |
| CN | 111386495 A | 7/2020 |
| CN | 107466372 B | 1/2021 |
| DE | 19751190 A1 | 5/1999 |
| DE | 10221837 A1 | 12/2003 |
| DE | 102006003785 A1 | 7/2007 |
| DE | 102012108424 A1 | 3/2014 |
| DE | 102013209436 A1 | 11/2014 |
| EM | 001747551-0002 | 8/2012 |
| EP | 0795775 A2 | 9/1997 |
| EP | 0822441 A2 | 2/1998 |
| EP | 1347641 A1 | 9/2003 |
| EP | 1413972 A1 | 4/2004 |
| EP | 1526709 A2 | 4/2005 |
| EP | 1748305 A1 | 1/2007 |
| EP | 1938152 A1 | 7/2008 |
| EP | 1413972 B1 | 10/2008 |
| EP | 2110701 A1 | 10/2009 |
| EP | 2225592 A1 | 9/2010 |
| EP | 2244114 A1 | 10/2010 |
| EP | 2326983 A1 | 6/2011 |
| EP | 2381290 A1 | 10/2011 |
| EP | 1828832 B1 | 5/2013 |
| EP | 2733517 A1 | 5/2014 |
| EP | 1573369 B1 | 7/2014 |
| EP | 2748670 A1 | 7/2014 |
| EP | 2929378 A1 | 10/2015 |
| EP | 2748670 B1 | 11/2015 |
| EP | 2995986 A1 | 3/2016 |
| EP | 2995986 B1 | 4/2017 |
| EP | 3198192 A1 | 8/2017 |
| EP | 3256888 A1 | 12/2017 |
| EP | 3359999 A1 | 8/2018 |
| EP | 3433658 A1 | 1/2019 |
| EP | 3433659 A1 | 1/2019 |
| EP | 3245551 B1 | 9/2019 |
| EP | 3548939 A2 | 10/2019 |
| EP | 3245444 A1 | 11/2019 |
| EP | 3245551 A2 | 11/2019 |
| EP | 3698214 | 8/2020 |
| EP | 3710876 A1 | 9/2020 |
| EP | 3710887 A1 | 9/2020 |
| EP | 3710893 A1 | 9/2020 |
| EP | 3710894 A1 | 9/2020 |
| FI | 20176157 A1 | 6/2019 |
| FI | 20176161 A1 | 6/2019 |
| FR | 2677463 A1 | 12/1992 |
| GB | 2115178 A | 9/1983 |
| GB | 2140935 A | 12/1984 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | 57089722 A | 6/1982 |
| JP | 02186319 A | 7/1990 |
| JP | 03239384 A | 10/1991 |
| JP | 06294952 A | 10/1994 |
| JP | 07098439 A | 4/1995 |
| JP | 0990312 A | 4/1997 |
| JP | 10096903 A | 4/1998 |
| JP | 11109320 A | 4/1999 |
| JP | 11142806 A | 5/1999 |
| JP | 2953444 B2 | 9/1999 |
| JP | 2000056259 A | 2/2000 |
| JP | 2000511306 A | 8/2000 |
| JP | 2000261706 A | 9/2000 |
| JP | 2000267042 A | 9/2000 |
| JP | 2001027739 A | 1/2001 |
| JP | 2001296503 A | 10/2001 |
| JP | 2002090858 A | 3/2002 |
| JP | 2002122906 A | 4/2002 |
| JP | 2002162598 A | 6/2002 |
| JP | 2002523802 A | 7/2002 |
| JP | 2002529790 A | 9/2002 |
| JP | 2002311379 A | 10/2002 |
| JP | 2003066428 A | 3/2003 |
| JP | 2003270419 A | 9/2003 |
| JP | 2004157245 A | 6/2004 |
| JP | 2006350129 A | 12/2006 |
| JP | 2007011057 A | 1/2007 |
| JP | 2007094175 A | 4/2007 |
| JP | 2007219106 A | 8/2007 |
| JP | 2008112187 A | 5/2008 |
| JP | 2009036955 A | 2/2009 |
| JP | 2009132221 A | 6/2009 |
| JP | 2009133999 A | 6/2009 |
| JP | 2009211091 A | 9/2009 |
| JP | 4367775 B2 | 11/2009 |
| JP | 2012137616 A | 7/2012 |
| JP | 2012533089 A | 12/2012 |
| JP | 5303928 B2 | 10/2013 |
| JP | 2013235256 A | 11/2013 |
| JP | 2014132328 A | 7/2014 |
| JP | 2015053163 A | 3/2015 |
| JP | 2015523586 A | 8/2015 |
| JP | 2015172713 A | 10/2015 |
| JP | 2016030503 A | 3/2016 |
| JP | 2018508037 A | 3/2018 |
| JP | 2018533069 A | 11/2018 |
| JP | 2019512745 A | 5/2019 |
| JP | 2019520595 A | 7/2019 |
| JP | 6598269 B2 | 10/2019 |
| JP | 6680793 B2 | 3/2020 |
| JP | 6734933 B2 | 7/2020 |
| JP | 6895451 B2 | 6/2021 |
| KR | 20060132474 A | 12/2006 |
| KR | 20100092059 A | 8/2010 |
| KR | 20140140063 A | 12/2014 |
| KR | 20140142337 A | 12/2014 |
| KR | 2020-0106170 A | 9/2020 |
| TW | 200535633 A | 11/2005 |
| TW | 200801583 A | 1/2008 |
| TW | 201314263 A | 4/2013 |
| TW | 201600943 A | 1/2016 |
| TW | 201604601 A | 2/2016 |
| WO | 1997001133 A1 | 1/1997 |
| WO | 1997027519 A1 | 7/1997 |
| WO | 1998004650 A1 | 2/1998 |
| WO | 1999009440 A1 | 2/1999 |
| WO | 99311658 A1 | 6/1999 |
| WO | 1999052002 A1 | 10/1999 |
| WO | 2000016136 A1 | 3/2000 |
| WO | 0023832 A1 | 4/2000 |
| WO | 2000023830 | 4/2000 |
| WO | 2000023832 A1 | 4/2000 |
| WO | 2000023847 | 4/2000 |
| WO | 2000028369 A2 | 5/2000 |
| WO | 2000028369 A3 | 10/2000 |
| WO | 2001050200 A2 | 7/2001 |
| WO | 2001090822 A1 | 11/2001 |
| WO | 2002082168 A1 | 10/2002 |
| WO | 2003081320 A1 | 10/2003 |
| WO | 204053531 A3 | 11/2004 |
| WO | 2004102226 A1 | 11/2004 |
| WO | 2004109349 A2 | 12/2004 |
| WO | 2005001753 A1 | 1/2005 |
| WO | 2005006065 A8 | 1/2005 |
| WO | 2005006065 A3 | 2/2005 |
| WO | 2005073798 A1 | 8/2005 |
| WO | 2006002870 A1 | 1/2006 |
| WO | 2006064301 A1 | 6/2006 |

(56) References Cited

FOREIGN PATENT DOCUMENTS

| | | |
|---|---|---|
| WO | 2006064325 A1 | 6/2006 |
| WO | 2006064334 A1 | 6/2006 |
| WO | 2006102073 A2 | 9/2006 |
| WO | 2006132614 A1 | 12/2006 |
| WO | 2006102073 A3 | 1/2007 |
| WO | 2007015141 A2 | 2/2007 |
| WO | 2007029032 A1 | 3/2007 |
| WO | 2007085682 A1 | 8/2007 |
| WO | 2007130130 A2 | 11/2007 |
| WO | 2007141587 A1 | 12/2007 |
| WO | 2007141589 A1 | 12/2007 |
| WO | 2008011066 A2 | 1/2008 |
| WO | 2008011066 A9 | 5/2008 |
| WO | 2008081070 A1 | 7/2008 |
| WO | 2008100545 A2 | 8/2008 |
| WO | 2008011066 A3 | 12/2008 |
| WO | 2009013597 A2 | 1/2009 |
| WO | 2009013597 A3 | 1/2009 |
| WO | 2009077802 A1 | 6/2009 |
| WO | 2009077803 A1 | 6/2009 |
| WO | 2009101238 A1 | 8/2009 |
| WO | 2007130130 A3 | 9/2009 |
| WO | 2009155437 A1 | 12/2009 |
| WO | 2009155437 A8 | 3/2010 |
| WO | 2010023444 A1 | 3/2010 |
| WO | 2010057219 A1 | 5/2010 |
| WO | 2010067114 A1 | 6/2010 |
| WO | 2010067117 A1 | 6/2010 |
| WO | 2010078856 A1 | 7/2010 |
| WO | 2010104692 A2 | 9/2010 |
| WO | 2010122330 A1 | 10/2010 |
| WO | 2010125337 A2 | 11/2010 |
| WO | 2010125337 A3 | 11/2010 |
| WO | 2011012825 A1 | 2/2011 |
| WO | 2011032005 A2 | 3/2011 |
| WO | 2011042711 A2 | 4/2011 |
| WO | 2011051660 A1 | 5/2011 |
| WO | 2011055109 A2 | 5/2011 |
| WO | 2011042711 A3 | 6/2011 |
| WO | 2011073673 A1 | 6/2011 |
| WO | 2011107831 A1 | 9/2011 |
| WO | 2011110821 A1 | 9/2011 |
| WO | 2011131978 A1 | 10/2011 |
| WO | 2012052352 A1 | 4/2012 |
| WO | 2012062658 A1 | 5/2012 |
| WO | 2012136970 A1 | 10/2012 |
| WO | 2012158950 A1 | 11/2012 |
| WO | 2012172295 A1 | 12/2012 |
| WO | 2013027004 A1 | 2/2013 |
| WO | 2013027006 A1 | 2/2013 |
| WO | 2013033274 A1 | 3/2013 |
| WO | 2013034879 A1 | 3/2013 |
| WO | 2013049012 A1 | 4/2013 |
| WO | 2013054972 A1 | 4/2013 |
| WO | 2013102759 A2 | 7/2013 |
| WO | 2013163347 A1 | 10/2013 |
| WO | 2013167864 A1 | 11/2013 |
| WO | 2013190257 A1 | 12/2013 |
| WO | 2014064427 A1 | 5/2014 |
| WO | 2014080155 A1 | 5/2014 |
| WO | 2014085734 A1 | 6/2014 |
| WO | 2014090379 A1 | 6/2014 |
| WO | 2014091200 A1 | 6/2014 |
| WO | 2014093601 A1 | 6/2014 |
| WO | 2014100182 A1 | 6/2014 |
| WO | 2014113506 A1 | 7/2014 |
| WO | 2014116615 A1 | 7/2014 |
| WO | 2014130383 A1 | 8/2014 |
| WO | 2014144526 A2 | 9/2014 |
| WO | 2014159621 A1 | 10/2014 |
| WO | 2014164901 A1 | 10/2014 |
| WO | 2014176695 A1 | 11/2014 |
| WO | 2014179632 A1 | 11/2014 |
| WO | 2014188149 A1 | 11/2014 |
| WO | 2014209733 A1 | 12/2014 |
| WO | 2014209819 A1 | 12/2014 |
| WO | 2014209820 A1 | 12/2014 |
| WO | 2014209821 A1 | 12/2014 |
| WO | 2014210349 A1 | 12/2014 |
| WO | 2015006784 A2 | 1/2015 |
| WO | 2015015138 A1 | 2/2015 |
| WO | 2015017291 A1 | 2/2015 |
| WO | 2015069553 A1 | 5/2015 |
| WO | 2015081313 A2 | 6/2015 |
| WO | 2015117039 A1 | 8/2015 |
| WO | 2015145119 A1 | 10/2015 |
| WO | 2016010289 A1 | 1/2016 |
| WO | 2016020630 A2 | 2/2016 |
| WO | 2016020643 A1 | 2/2016 |
| WO | 2016025350 A1 | 2/2016 |
| WO | 2016020630 A3 | 3/2016 |
| WO | 2016042283 A1 | 3/2016 |
| WO | 2016044193 A1 | 3/2016 |
| WO | 2016046514 A1 | 3/2016 |
| WO | 2016069606 A1 | 5/2016 |
| WO | 2016103263 A1 | 6/2016 |
| WO | 2016111706 A1 | 7/2016 |
| WO | 2016111707 A1 | 7/2016 |
| WO | 2016111708 A1 | 7/2016 |
| WO | 2016111709 A1 | 7/2016 |
| WO | 2016113533 A2 | 7/2016 |
| WO | 2016113534 A1 | 7/2016 |
| WO | 2016116733 A1 | 7/2016 |
| WO | 2016118107 A1 | 7/2016 |
| WO | 2016122679 A1 | 8/2016 |
| WO | 2016130509 A1 | 8/2016 |
| WO | 2016135434 A1 | 9/2016 |
| WO | 2016113533 A3 | 10/2016 |
| WO | 2016156776 A1 | 10/2016 |
| WO | 2016181108 A1 | 11/2016 |
| WO | 2016046514 A8 | 4/2017 |
| WO | 2017060665 A1 | 4/2017 |
| WO | 2017094129 A1 | 6/2017 |
| WO | 2017120320 A1 | 7/2017 |
| WO | 2017134412 A1 | 8/2017 |
| WO | 2017162999 A1 | 9/2017 |
| WO | 2017162999 A8 | 9/2017 |
| WO | 2017178781 A1 | 10/2017 |
| WO | 2017180403 A1 | 10/2017 |
| WO | 2017182771 A1 | 10/2017 |
| WO | 2017203200 A1 | 11/2017 |
| WO | 2017203201 A1 | 11/2017 |
| WO | 2017207987 A1 | 12/2017 |
| WO | 2018102834 A2 | 6/2018 |
| WO | 2018102834 A3 | 6/2018 |
| WO | 2018096359 A3 | 7/2018 |
| WO | 2018129398 A1 | 7/2018 |
| WO | 2018150163 A1 | 8/2018 |
| WO | 2018206487 A1 | 11/2018 |
| WO | 2019046649 A1 | 3/2019 |
| WO | 2019077307 A1 | 4/2019 |
| WO | 2019079350 A2 | 4/2019 |
| WO | 2019079350 A3 | 4/2019 |
| WO | 2019046649 A8 | 5/2019 |
| WO | 2019122806 A1 | 6/2019 |
| WO | 2019135784 A1 | 7/2019 |
| WO | 2019135796 A1 | 7/2019 |
| WO | 2019135837 A1 | 7/2019 |
| WO | 2019136470 A1 | 7/2019 |
| WO | 2019136471 A1 | 7/2019 |
| WO | 2019136473 A1 | 7/2019 |
| WO | 2019171038 A1 | 9/2019 |
| WO | 2019185973 A1 | 10/2019 |
| WO | 2019185975 A1 | 10/2019 |
| WO | 2019185976 A1 | 10/2019 |
| WO | 2019185977 A1 | 10/2019 |
| WO | 2019217453 A1 | 11/2019 |
| WO | 2020023779 A1 | 1/2020 |
| WO | 2020123506 A1 | 6/2020 |
| WO | 2020149956 A1 | 7/2020 |
| WO | 2020168348 A1 | 8/2020 |
| WO | 2020172681 A1 | 8/2020 |
| WO | 2020186113 A1 | 9/2020 |
| WO | 2020212682 A1 | 10/2020 |

(56) References Cited

FOREIGN PATENT DOCUMENTS

| WO | 2020227236 A1 | 11/2020 |
|---|---|---|
| WO | 2021032982 A1 | 2/2021 |
| WO | 2021032983 A1 | 2/2021 |
| WO | 2021044121 A1 | 3/2021 |
| WO | 2021138607 A1 | 7/2021 |

OTHER PUBLICATIONS

Extended European Search Report for European Application No. 13765610.4 dated Feb. 16, 2016, 6 pgs.
Extended European Search Report for European Application No. 15187491.4, search completed Jan. 15, 2016, dated Jan. 28, 2016, 5 pgs.
International Preliminary Report on Patentability for International Application No. PCT/GB2010/000835, dated Nov. 1, 2011, dated Nov. 10, 2011, 9 pgs.
International Preliminary Report on Patentability for International Application No. PCT/GB2010/001920, dated Apr. 11, 2012, dated Apr. 19, 2012, 10 pgs.
International Preliminary Report on Patentability for International Application No. PCT/GB2010/001982, report dated May 1, 2012, dated May 10, 2012, 7 pgs.
International Preliminary Report on Patentability for International Application No. PCT/GB2015/000203, dated Mar. 21, 2017, dated Mar. 30, 2017, 8 pgs.
International Preliminary Report on Patentability for International Application No. PCT/GB2016/000036, dated Aug. 29, 2017, dated Sep. 8, 2017, 8 pgs.
International Preliminary Report on Patentability for International Application No. PCT/GB2016/000065, dated Oct. 3, 2017, dated Oct. 12, 2017, 8 pgs.
International Preliminary Report on Patentability for International Application No. PCT/US2018/012227, Report dated Jul. 30, 2019, dated Aug. 8, 2019, 7 pgs.
International Preliminary Report on Patentability for International Application PCT /US2018/015553, Report dated Jun. 4, 2019, dated Jun. 13, 2019, 6 pgs.
International Preliminary Report on Patentability for International Application PCT/GB2009/051676, dated Jun. 14, 2011, dated Jun. 23, 2011, 6 pgs.
International Preliminary Report on Patentability for International Application PCT/GB2011/000349, dated Sep. 18, 2012, dated Sep. 27, 2012, 10 pgs.
International Preliminary Report on Patentability for International Application PCT/GB2012/000331, dated Oct. 8, 2013, dated Oct. 17, 2013, 8 pgs.
International Preliminary Report on Patentability for International Application PCT/GB2012/000677, dated Feb. 25, 2014, dated Mar. 6, 2014, 5 pgs.
International Preliminary Report on Patentability for International Application PCT/GB2013/000005, dated Jul. 8, 2014, dated Jul. 17, 2014, 12 pgs.
International Preliminary Report on Patentability for International Application PCT/GB2014/000295, dated Feb. 2, 2016, dated Feb. 11, 2016, 4 pgs.
International Preliminary Report on Patentability for International Application PCT/GB2015/000225, dated Feb. 14, 2017, dated Feb. 23, 2017, 8 pgs.
International Preliminary Report on Patentability for International Application PCT/GB2015/000274, dated Mar. 28, 2017, dated Apr. 6, 2017, 8 pgs.
International Preliminary Report on Patentability for International Application PCT/GB2016/000014, dated Jul. 25, 2017, dated Aug. 3, 2017, 7 pgs.
International Preliminary Report on Patentability for International Application PCT/GB2017/000055, dated Oct. 16, 2018, dated Oct. 25, 2018, 9 pgs.
International Preliminary Report on Patentability for International Application PCT/US2014/011736, dated Jul. 21, 2015, dated Jul. 30, 2015, 9 pgs.
International Preliminary Report on Patentability for International Application PCT/US2016/017091, dated Aug. 15, 2017, dated Aug. 24, 2017, 5 pgs.
International Preliminary Report on Patentability for International Application PCT/US2018/012691, dated Jul. 9, 2019, dated Jul. 18, 2019, 10 pgs.
International Preliminary Report on Patentability for International Application PCT/GB2017/000040, Report dated Sep. 25, 2018, dated Oct. 4, 2018, 7 pgs.
International Preliminary Reporton Patentability for PCT Application No. PCT/US2013/038070, dated Oct. 28, 2014, 6 pgs.
International Search Report and Written Opinion for International Application No. PCT/GB2010/000835, completed Oct. 26, 2010, dated Nov. 8, 2010, 12 pgs.
International Search Report and Written Opinion for International Application No. PCT/GB2010/001920, completed Mar. 29, 2011, dated Apr. 6, 2011, 15 pgs.
International Search Report and Written Opinion for International Application No. PCT/GB2015/000228, Search completed May 4, 2011, dated Jul. 15, 2011, 15 pgs.
International Search Report and Written Opinion for International Application No. PCT/GB2016/000036, completed Jul. 4, 2016, dated Jul. 13, 2016, 10 pgs.
International Search Report and Written Opinion for International Application No. PCT/GB2016/000065, completed Jul. 14, 2016, dated Jul. 27, 2016, 10 pgs.
International Search Report and Written Opinion for International Application No. PCT/GB2017/000055, Search completed Jul. 19, 2017, dated Jul. 26, 2017, 12 pgs.
International Search Report and Written Opinion for International Application No. PCT/US2013/038070, completed Aug. 12, 2013, dated Aug. 14, 2013, 12 pgs.
International Search Report and Written Opinion for International Application No. PCT/US2014/011736, completed Apr. 18, 2014, dated May 8, 2014, 10 pgs.
International Search Report and Written Opinion for International Application No. PCT/US2018/012227, Search completed Feb. 28, 2018, dated Mar. 14, 2018, 8 pgs.
International Search Report and Written Opinion for International Application No. PCT/US2018/012691, completed Mar. 10, 2018, dated Mar. 28, 2018, 16 pgs.
International Search Report and Written Opinion for International Application No. PCT/US2018/015553, completed Aug. 6, 2018, dated Sep. 19, 2018, 12 pgs.
International Search Report and Written Opinion for International Application No. PCT/US2019/012758, completed Mar. 12, 2019, dated Mar. 27, 2019, 9 pgs.
International Search Report and Written Opinion for International Application No. PCT/US2019/012764, completed Mar. 1, 2019, dated Mar. 18, 2019, 9 pgs.
International Search Report and Written Opinion for International Application No. PCT/US2018/048960, Search completed Dec. 14, 2018, dated Jan. 8, 2019, pgs.
International Search Report and Written Opinion for International Application PCT/GB2009/051676, completed May 10, 2010, dated May 18, 2010, 7 pgs.
International Search Report and Written Opinion for International Application PCT/GB2016/000181, completed Dec. 21, 2016, dated Feb. 27, 2017, 21 pgs.
International Search Report and Written Opinion for International Application PCT/US2016/017091, completed by the European Patent Office dated Apr. 20, 2016, 7 pgs.
International Search Report and Written Opinion for International Application PCT/US2019/012759, completed Mar. 14, 2019, dated Apr. 15, 2019, 12 pgs.
International Search Report for International Application No. PCT/GB2014/000295, completed Nov. 18, 2014, dated Jan. 5, 2015, 4 pgs.

(56) References Cited

OTHER PUBLICATIONS

International Search Report for International Application PCT/GB2017/000040, dated Jul. 18, 2017, completed Jul. 10, 2017, 3 pgs.
International Search Report for PCT/GB2010/001982, completed by the European Patent Office dated Feb. 24, 2011, 4 pgs.
International Search Report for PCT/GB2011/000349, completed by the European Patent Office dated Aug. 17, 2011, 4 pgs.
International Search Report for PCT/GB2012/000331, completed by the European Patent Office dated Aug. 29, 2012, 4 pgs.
International Search Report for PCT/GB2012/000677, completed by the European Patent Office dated Dec. 10, 2012, 4 pgs.
International Search Report for PCT/GB2013/000005, completed by the European Patent Office dated Jul. 16, 2013, 3 pgs.
International Search Report for PCT/GB2015/000203, completed by the European Patent Office dated Oct. 9, 2015, 4 pgs.
International Search Report for PCT/GB2015/000225, completed by the European Patent Office dated Nov. 10, 2015, dated Dec. 2, 2016, 5 pgs.
International Search Report for PCT/GB2015/000274, completed by the European Patent Office dated Jan. 7, 2016, 4 pgs.
International Search Report for PCT/GB2016/000014, completed by the European Patent Office dated Jun. 27, 2016, 4 pgs.
Written Opinion for International Application No. PCT/GB2010/001982, search completed Feb. 24, 2011, dated Mar. 8, 2011, 6 pgs.
Written Opinion for International Application No. PCT/GB2011/000349, completed Aug. 17, 2011, dated Aug. 25, 2011, 9 pgs.
Written Opinion for International Application No. PCT/GB2012/000331, completed Aug. 29, 2012, dated Sep. 6, 2012, 7 pgs.
Written Opinion for International Application No. PCT/GB2012/000677, completed Dec. 10, 2012, dated Dec. 17, 2012, 4 pgs.
Written Opinion for International Application No. PCT/GB2013/000005, search completed Jul. 16, 2013, dated Jul. 24, 2013, 11 pgs.
Written Opinion for International Application No. PCT/GB2014/000295, search completed Nov. 18, 2014, dated Jan. 5, 2015, 3 pgs.
Written Opinion for International Application No. PCT/GB2015/000203, completed Oct. 29, 2015, dated Nov. 16, 2015, 7 pgs.
Written Opinion for International Application No. PCT/GB2015/000225, search completed Nov. 10, 2015, dated Feb. 4, 2016, 7 pgs.
Written Opinion for International Application No. PCT/GB2015/000274, search completed Jan. 7, 2016, dated Jan. 19, 2016, 7 pgs.
Written Opinion for International Application No. PCT/GB2016/000014, search completed Jun. 27, 2016, dated Jul. 7, 2016, 6 pgs.
Written Opinion for International Application No. PCT/GB2017/000040, search completed Jul. 10, 2017, dated Jul. 18, 2017, 6 pgs.
Written Opinion for International Application PCT/GB2016/000003, completed May 31, 2016, dated Aug. 12, 2016, 10 pgs.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.
"BragGrate—Deflector: Transmitting Volume Bragg Grating for angular selection and magnification", 2015, www.OptiGrate.com.
"Cree XLamp XP-E LEDs", Cree, Inc., Retrieved from www.cree.com/Xlamp, CLD-DS18 Rev 17, 2013, 17 pgs.
"Desmodur N 3900", Bayer Materialscience AG, Mar. 18, 2013, www.bayercoatings.com, 4 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261 , Oct. 28, 2008.
"FHS Lenses Series", Fraen Corporation, www.fraen.com, Jun. 16, 2003, 10 pgs.
"FLP Lens Series for LUXEONTM Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7-Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.
"Liquid Crystal Phases", Phases of Liquid Crystals, http://plc.cwru.edu/tutorial/enhanced/files/lc/phase, Retrieved on Sep. 21, 2004, 6 pgs.
"LiteHUD Head-up display", BAE Systems, 2016, 2 pgs.
"LiteHUD Head-up display infographic", BAE Systems, 2017, 2 pgs.
"Luxeon C: Power Light Source", Philips Lumileds, www.philipslumileds.com, 2012, 18 pgs.
"Luxeon Rebel ES: Leading efficacy and light output, maximum design flexibility", LUXEON Rebel ES Datasheet DS61 20130221, www.philipslumileds.com, 2013, 33 pgs.
"Mobile Display Report", Insight Media, LLC, Apr. 2012, vol. 7, No. 4, 72 pgs.
"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.
"Navy awards SGB Labs a contract for HMDs for simulation and training", Press releases, DigiLens, Oct. 2012, pp. 1-2.
"Optical measurements of retinal flow", Industrial Research Limited, Feb. 2012, 18 pgs.
"Osterhout Design Group Develops Next-Generation, Fully-integrated Smart Glasses Using Qualcomm Technologies", ODG, www.osterhoutgroup.com, Sep. 18, 2014, 2 pgs.
"Plastic has replaced glass in photochromic lens", www.plastemart.com, 2003, 1 page.
"Range Finding Using Pulse Lasers", OSRAM, Opto Semiconductors, Sep. 10, 2004, 7 pgs.
"Response time in Liquid-Crystal Variable Retarders", Meadowlark Optics, Inc., 2005, 4 pgs.
"Secondary Optics Design Considerations for SuperFlux LEDs", Lumileds, application brief AB20-5, Sep. 2002, 23 pgs.
"Solid-State Optical Mouse Sensor with Quadrature Outputs", IC Datasheet, UniqueICs, Jul. 15, 2004, 11 pgs.
"SVGA TransparentVLSITM Microdisplay Evaluation Kit", Radiant Images, Inc., Product Data Sheet, 2003, 3 pgs.
"Technical Data Sheet LPR1", Luminus Devices, Inc., Luminus Projection Chipset, Release 1, Preliminary, Revision B, Sep. 21, 2004, 9 pgs.
"The Next Generation of TV", SID Information Display, Nov./Dec. 2014, vol. 30, No. 6, 56 pgs.
"Thermal Management Considerations for SuperFlux LEDs", Lumileds, application brief AB20-4, Sep. 2002, 14 pgs.
"USAF Awards SGB Labs an SBIR Contract for Wide Field of View HUD", Press Release ,SBG Labs DigiLens, Apr. 2014, 2 pgs.
"UVTOP240", Roithner LaserTechnik GmbH, v 2.0, Jun. 24, 2013, 6 pgs.
"UVTOP310", Roithner LaserTechnik GmbH, v 2.0, Jun. 24, 2013, 6 pgs.
"Velodyne's HDL-64E: A High Definition Lidar Sensor for 3-D Applications", High Definition Lidar, white paper, Oct. 2007, 7 pgs.
"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.
"Webster's Third New International Dictionary 433", (1986), 3 pages.

(56) References Cited

OTHER PUBLICATIONS

"X-Cubes—Revisited for LCOS", BASID, RAF Electronics Corp. Rawson Optics, Inc., Oct. 24, 2002, 16 pgs.

Aachen, "Design of plastic optics for LED applications", Optics Colloquium 2009, Mar. 19, 2009, 30 pgs.

Abbate et al., "Characterization of LC-polymer composites for opto-electronic application", Proceedings of OPTOEL'03, Leganes-Madrid, Spain, Jul. 14-16, 2003, 4 pgs.

Al-Kalbani et al., "Ocular Microtremor laser speckle metrology", Proc. of SPIE, 2009, vol. 7176 717606-1, 12 pgs.

Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.

Amitai et al., "Visor-display design based on planar holographic optics", Applied Optics, vol. 34, No. 8, Mar. 10, 1995, pp. 1352-1356.

Amundson et al., "Morphology and electro-optic properties of polymer-dispersed liquid-crystal films", Physical Review E, Feb. 1997, vol. 55. No. 2, pp. 1646-1654.

An et al., "Speckle suppression in laser display using several partially coherent beams", Optics Express, Jan. 5, 2009, vol. 17, No. 1, pp. 92-103.

Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.

Arnold et al., "52.3: An Improved Polarizing Beamsplitter LCOS Projection Display Based on Wire-Grid Polarizers", Society for Information Display, Jun. 2001, pp. 1282-1285.

Ayras et al., "Exit pupil expander with a large field of view based on diffractive optics", Journal of the SID, May 18, 2009, 17/8, pp. 659-664.

Baets et al., "Resonant-Cavity Light-Emitting Diodes: a review", Proceedings of SPIE, 2003, vol. 4996, pp. 74-86.

Bayer et al., "Introduction to Helmet-Mounted Displays", 2016, pp. 47-108.

Beckel et al., "Electro-optic properties of thiol-ene polymer stabilized ferroelectric liquid crystals", Liquid Crystals, vol. 30, No. 11, Nov. 2003, pp. 1343-1350.

Bergkvist, "Biospeckle-based Study of the Line Profile of Light Scattered in Strawberries", Master Thesis, Lund Reports on Atomic Physics, LRAP-220, Lund 1997, pp. 1-62.

Bernards et al., "Nanoscale porosity in polymer films: fabrication and therapeutic applications", Soft Matter, Jan. 1, 2010, vol. 6, No. 8, pp. 1621-1631.

Bleha et al., "Binocular Holographic Waveguide Visor Display", SID Symposium Digest of Technical Papers, Holoeye Systems Inc., Jun. 2014, San Diego, CA, 4 pgs.

Bleha et al., "D-ILA Technology For High Resolution Projection Displays", Sep. 10, 2003, Proceedings, vol. 5080, doi:10.1117/12.497532, 11 pgs.

Bone, "Design Obstacles for LCOS Displays in Projection Applications "Optics architectures for LCOS are still evolving"", Aurora Systems Inc., Bay Area SID Seminar, Mar. 27, 2001, 22 pgs.

Born et al., "Optics of Crystals", Principles of Optics 5th Edition 1975, pp. 705-707.

Bourzac, "Magic Leap Needs to Engineer a Miracle", Intelligent Machines, Jun. 11, 2015, 7 pgs.

Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.

Bowley et al., "Variable-wavelength switchable Bragg gratings formed in polymer-dispersed liquid crystals", Applied Physics Letters, Jul. 2, 2001, vol. 79, No. 1, pp. 9-11.

Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738.

Brown, "Waveguide Displays", Rockwell Collins, 2015, 11 pgs.

Bruzzone et al., "Compact, high-brightness LED illumination for projection systems", Journal of the SID 17/12, Dec. 2009, pp. 1043-1049.

Buckley, "Colour holographic laser projection technology for heads-up and instrument cluster displays", Conference: Proc. SID Conference 14th Annual Symposium on Vehicle Displays, Jan. 2007, 5 pgs.

Buckley, "Pixtronix DMS technology for head-up displays", Pixtronix, Inc., Jan. 2011, 4 pgs.

Buckley et al., "Full colour holographic laser projector HUD", Light Blue Optics Ltd., Aug. 10, 2015, 5 pgs.

Buckley et al., "Rear-view virtual image displays", in Proc. SID Conference 16th Annual Symposium on Vehicle Displays, Jan. 2009, 5 pgs.

Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.

Bunning et al., "Electro-optical photonic crystals formed in H-PDLCs by thiol-ene photopolymerization", American Physical Society, Annual APS, Mar. 3-7, 2003, abstract #R1.135.

Bunning et al., "Holographic Polymer-Dispersed Liquid Crystals (H-PDLCs)1", Annu. Rev. Mater. Sci., 2000, vol. 30, pp. 83-115.

Bunning et al., "Morphology of Anisotropic Polymer Dispersed Liquid Crystals and the Effect of Monomer Functionality", Polymer Science: Part B: Polymer Physics, Jul. 30, 1997, vol. 35, pp. 2825-2833.

Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662.

Butler et al., "Diffractive Properties of Highly Birefringent Volume Gratings: Investigation", Journal of Optical Society of America, Feb. 2002, vol. 19, No. 2, pp. 183-189.

Cai et al., "Recent advances in anti reflective surfaces based on nanostructure arrays", Mater. Horiz., 2015, vol. 2, pp. 37-53.

Cameron, "Optical Waveguide Technology & Its Application In Head Mounted Displays", Proc. of SPIE, May 22, 2012, vol. 8383, pp. 83830E-1-83830E-11.

Cameron, "The Application of Holographic Optical Waveguide Technology to Q-Sight™ Family of Helmet Mounted Displays", Proc. of SPIE, 2009, 11 pages, vol. 7326.

Caputo et al., "POLICRYPS Composite Materials: Features and Applications", Advances in Composite Materials—Analysis of Natural and Man-Made Materials, www.intechopen.com, Sep. 2011, pp. 93-118.

Caputo et al., "POLICRYPS Switchable Holographic Grating: A Promising Grating Electro-Optical Pixel for High Resolution Display Application", Journal of Display Technology, Mar. 2006, vol. 2, No. 1, pp. 38-51.

Carclo Optics, "Guide to choosing secondary optics", Carclo Optics, Dec. 15, 2014, www.carclo-optics.com, 48 pgs.

Chen et al., "Polarization rotators fabricated by thermally-switched liquid crystal alignments based on rubbed poly(N-vinyl carbazole) films", Optics Express, Apr. 11, 2011, vol. 19, No. 8, pp. 7553-7558.

Cheng et al., "Design of an ultra-thin near-eye display with geometrical waveguide and freeform optics", Optics Express, Aug. 2014, 16 pgs.

Chi et al., "Ultralow-refractive-index optical thin films through nanoscale etching of ordered mesoporous silica films", Optic Letters, May 1, 2012, vol. 37, No. 9, pp. 1406-1408.

Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.

Cho et al., "Electro-optic Properties of CO2 Fixed Polymer/Nematic LC Composite Films", Journal of Applied Polymer Science, Nov. 5, 2000, vol. 81, Issue 11, pp. 2744-2753.

Cho et al., "Optimization of Holographic Polymer Dispersed Liquid Crystals for Ternary Monomers", Polymer International, Nov. 1999, vol. 48, pp. 1085-1090.

Colegrove et al., "P-59: Technology of Stacking HPDLC for Higher Reflectance", SID 00 DIGEST, May 2000, pp. 770-773.

Crawford, "Electrically Switchable Bragg Gratings", Optics & Photonics News, Apr. 2003, pp. 54-59.

(56) References Cited

OTHER PUBLICATIONS

Cruz-Arreola et al., "Diffraction of beams by infinite or finite amplitude-phase gratings", Investigacio' N Revista Mexicana De Fi'sica, Feb. 2011, vol. 57, No. 1, pp. 6-16.

Dabrowski, "High Birefringence Liquid Crystals", Crystals, Sep. 3, 2013, vol. 3, No. 3, pp. 443-482.

Dainty, "Some statistical properties of random speckle patterns in coherent and partially coherent illumination", Optica Acta, Mar. 12, 1970, vol. 17, No. 10, pp. 761-772.

Date, "Alignment Control in Holographic Polymer Dispersed Liquid Crystal", Journal of Photopolymer Science and Technology, Nov. 2, 2000, vol. 13, pp. 289-284.

Date et al., "52.3: Direct-viewing Display Using Alignment-controlled PDLC and Holographic PDLC", Society for Information Display Digest, May 2000, pp. 1184-1187, DOI: 10.1889/1.1832877.

Date et al., "Full-color reflective display device using holographically fabricated polymer-dispersed liquid crystal (HPDLC)", Journal of the SID, 1999, vol. 7, No. 1, pp. 17-22.

De Bitetto, "White light viewing of surface holograms by simple dispersion compensation", Applied Physics Letters, Dec. 15, 1966, vol. 9, No. 12, pp. 417-418.

Developer World, "Create customized augmented reality solutions", printed Oct. 19, 2017, LMX-001 holographic waveguide display, Sony Developer World, 3 pgs.

Dhar et al., "Recording media that exhibit high dynamic range for digital holographic data storage", Optics Letters, Apr. 1, 1999, vol. 24, No. 7, pp. 487-489.

Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.

Drake et al., "Waveguide Hologram Fingerprint Entry Device", Optical Engineering, Sep. 1996, vol. 35, No. 9, pp. 2499-2505.

Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537].

Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212.

Ducharme, "Microlens diffusers for efficient laser speckle generation", Optics Express, Oct. 29, 2007, vol. 15, No. 22, pp. 14573-14579.

Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.

Fattal et al., "A multi directional backlight for a wide-angle glasses-free three-dimensional display", Nature, Mar. 21, 2012, vol. 495, pp. 348-351.

Fontecchio et al., "Spatially Pixelated Reflective Arrays from Holographic Polymer Dispersed Liquid Crystals", SID 00 Digest, May 2000, pp. 774-776.

Forman et al., "Materials development for PhotoINhibited Super-Resolution (PINSR) lithography", Proc. of SPIE, 2012, vol. 8249, 824904, doi 10.1117/12.908512, pp. 824904-1-824904-9.

Forman et al., "Radical diffusion limits to photoinhibited super-resolution Tithography", Phys.Chem. Chem. Phys., May 31, 2013, vol. 15, pp. 14862-14867.

Friedrich-Schiller, "Spatial Noise and Speckle", Version 1.12.2011, Dec. 2011, Abbe School of Photonics, Jena, Germany, 27 pgs.

Fujii et al., "Nanoparticle-polymer-composite volume gratings incorporating chain-transfer agents for holography and slow-neutron optics", Optics Letters, Apr. 25, 2014, vol. 39, Issue 12, 5 pgs.

Funayama et al., "Proposal of a new type thin film light-waveguide display device using", The International Conference on Electrical Engineering, 2008, No. P-044, 5 pgs.

Gabor, "Laser Speckle and its Elimination", BM Research and Development, Eliminating Speckle Noise, Sep. 1970, vol. 14, No. 5, pp. 509-514.

Gardiner et al., "Bistable liquid-crystals reduce power consumption for high-efficiency smart glazing", SPIE, 2009, 10.1117/2.1200904. 1596, 2 pgs.

Giancola, "Holographic Diffuser, Makes Light Work of Screen Tests", Photonics Spectra, 1996, vol. 30, No. 8, pp. 121-122.

Goodman, "Some fundamental properties of speckle", J. Opt. Soc. Am., Nov. 1976, vol. 66, No. 11, pp. 1145-1150.

Goodman, "Statistical Properties of Laser Speckle Patterns", Applied Physics, 1975, vol. 9, Chapter 2, Laser Speckle and Related Phenomena, pp. 9-75.

Goodman et al., "Speckle Reduction by a Moving Diffuser in Laser Projection Displays", The Optical Society of America, 2000, 15 pgs.

Guldin et al., "Self-Cleaning Antireflective Optical Coatings", Nano Letters, Oct. 14, 2013, vol. 13, pp. 5329-5335.

Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.

Han et al., "Study of Holographic Waveguide Display System", Advanced Photonics for Communications, 2014, 4 pgs.

Harbers et al., "I-15.3: LED Backlighting for LCD-HDTV", Journal of the Society for Information Display, 2002, vol. 10, No. 4, pp. 347-350.

Harbers et al., "Performance of High Power LED Illuminators in Color Sequential Projection Displays", Lumileds Lighting, 2007, 4 pgs.

Harbers et al., "Performance of High Power LED Illuminators in Color Sequential Projection Displays", Lumileds, Aug. 7, 2001, 11 pgs.

Harbers et al., "Performance of High-Power LED illuminators in Projection Displays", Proc. Int. Disp. Workshops, Japan. vol. 10, pp. 1585-1588, 2003.

Harding et al., "Reactive Liquid Crystal Materials for Optically Anisotropic Patterned Retarders", Merck, Iicrivue, 2008, ME-GR-RH-08-010, 20 pgs.

Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.

Hariharan, "Optical Holography: Principles, techniques and applications", Cambridge University Press, 1996, pp. 231-233.

Harris, "Photonic Devices", EE 216 Principals and Models of Semiconductor Devices, Autumn 2002, 20 pgs.

Harrold et al., "3D Display Systems Hardware Research at Sharp Laboratories of Europe: an update", Sharp Laboratories of Europe, Ltd., received May 21, 1999, 7 pgs.

Harthong et al., "Speckle phase averaging in high-resolution color holography", J. Opt. Soc. Am. A, Feb. 1997, vol. 14, No. 2, pp. 405-409.

Hasan et al., "Tunable-focus lens for adaptive eyeglasses", Optics Express, Jan. 23, 2017, vol. 25, No. 2, 1221, 13 pgs.

Hasman et al., "Diffractive Optics: Design, Realization, and Applications", Fiber and Integrated Optics, vol. 16, pp. 1-25, 1997.

Hata et al., "Holographic nanoparticle-polymer composites based on step-growth thiol-ene photopolymerization", Optical Materials Express, Jun. 1, 2011, vol. 1, No. 2, pp. 207-222.

He et al., "Dynamics of peristrophic multiplexing in holographic polymer-dispersed liquid crystal", Liquid Crystals, Mar. 26, 2014, vol. 41, No. 5, pp. 673-684.

He et al., "Holographic 3D display based on polymer-dispersed liquid-crystal thin films", Proceedings of China Display/Asia Display 2011, pp. 158-160.

He et al., "Properties of Volume Holograms Recording in Photopolymer Films with Various Pulse Exposures Repetition Frequencies", Proceedings of SPIE vol. 5636, Bellingham, WA, 2005, doi: 10.1117/12.580978, pp. 842-848.

Herman et al., "Production and Uses of Diffractionless Beams", J. Opt. Soc. Am. A., Jun. 1991, vol. 8, No. 6, pp. 932-942.

(56) References Cited

OTHER PUBLICATIONS

Hisano, "Alignment layer-free molecular ordering induced by masked photopolymerization with nonpolarized light", Appl. Phys. Express 9, Jun. 6, 2016, pp. 072601-1-072601-4.
Hoepfner et al., "LED Front Projection Goes Mainstream", Luminus Devices, Inc., Projection Summit, 2008, 18 pgs.
Holmes et al., "Controlling The Anisotropy of Holographic Polymer-Dispersed Liquid-Crystal Gratings", Physical Review E, Jun. 11, 2002, vol. 65, 066603-1-066603-4.
Hoyle et al., "Advances in the Polymerization of Thiol-Ene Formulations", Heraeus Noblelight Fusion UV Inc., 2003 Conference, 6 pgs.
Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.
Huang et al., "Diffraction properties of substrate guided-wave holograms", Optical Engineering, Oct. 1995, vol. 34, No. 10, pp. 2891-2899.
Huang et al., "Theory and characteristics of holographic polymer dispersed liquid crystal transmission grating with scaffolding morphology", Applied Optics, Jun. 20, 2012, vol. 51, No. 18, pp. 4013-4020.
Iannacchione et al., "Deuterium NMR and morphology study of copolymer-dispersed liquid-crystal Bragg gratings", Europhysics Letters, 1996, vol. 36, No. 6, pp. 425-430.
Irie, "Photochromic diarylethenes for photonic devices", Pure and Applied Chemistry, 1996, pp. 1367-1371, vol. 68, No. 7, IUPAC.
Jeng et al., "Aligning liquid crystal molecules", SPIE, 2012, 10.1117/2.1201203.004148, 2 pgs.
Jo et al., "Control of Liquid Crystal Pretilt Angle using Polymerization of Reactive Mesogen", IMID 2009 Digest, P1-25, 2009, pp. 604-606.
Juhl, "Interference Lithography for Optical Devices and Coatings", Dissertation, University of Illinois at Urbana-Champaign, 2010.
Juhl et al., "Holographically Directed Assembly of Polymer Nanocomposites", ACS Nano, Oct. 7, 2010, vol. 4, No. 10, pp. 5953-5961.
Jurbergs et al., "New recording materials for the holographic industry", Proc. of SPIE, 2009 vol. 7233, p. 72330K-1-72330L-10, doi 10.1117/12.809579.
Kahn et al., "Private Line Report on Large Area Display", Kahn International, Jan. 7, 2003, vol. 8, No. 10, 9 pgs.
Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.
Karp et al., "Planar micro-optic solar concentration using multiple imaging lenses into a common slab waveguide", Proc. of SPIE vol. 7407, 2009 SPIE, CCC code: 0277-786X/09, doi: 10.1117/12.826531, pp. 74070D-1-74070D-11.
Karp et al., "Planar micro-optic solar concentrator", Optics Express, Jan. 18, 2010, vol. 18, No. 2, pp. 1122-1133.
Kato et al., "Alignment-Controlled Holographic Polymer Dispersed Liquid Crystal (HPDLC) for Reflective Display Devices", SPIE, 1998, vol. 3297, pp. 52-57.
Kessler, "Optics of Near to Eye Displays (NEDs)", Oasis 2013, Tel Aviv, Feb. 19, 2013, 37 pgs.
Keuper et al., "26.1: RGB LED Illuminator for Pocket-Sized Projectors", SID 04 DIGEST, 2004, ISSN/0004-0966X/04/3502, pp. 943-945.
Keuper et al., "P-126: Ultra-Compact LED based Image Projector for Portable Applications", SID 03 DIGEST, 2003, ISSN/0003-0966X/03/3401-0713, pp. 713-715.
Kim et al., "Effect of Polymer Structure on the Morphology and Electro optic Properties of UV Curable PNLCs", Polymer, Feb. 2000, vol. 41, pp. 1325-1335.
Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.
Kim et al., "Fabrication of Reflective Holographic PDLC for Blue", Molecular Crystals and Liquid Crystals Science, 2001, vol. 368, pp. 3845-3853.
Kim et al., "Optimization of Holographic PDLC for Green", Mol. Cryst. Liq. Cryst., vol. 368, pp. 3855-3864, 2001.
Klein, "Optical Efficiency for Different Liquid Crystal Colour Displays", Digital Media Department, HPL-2000-83, Jun. 29, 2000, 18 pgs.
Kogelnik, "Coupled Wave Theory for Thick Hologram Gratings", The Bell System Technical Journal, vol. 48, No. 9, pp. 2909-2945, Nov. 1969.
Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.
Kress et al., "Diffractive and Holographic Optics as Optical Combiners in Head Mounted Displays", UbiComp '13, Sep. 9-12, 2013, Session Wearable Systems for Industrial Augmented Reality Applications, pp. 1479-1482.
Lauret et al., "Solving the Optics Equation for Effective LED Applications", Gaggione North America, LLFY System Design Workshop 2010, Oct. 28, 2010, 26 pgs.
Lee, "Patents Shows Widespread Augmented Reality Innovation", PatentVue, May 26, 2015, 5 pgs.
Levola, "Diffractive optics for virtual reality displays", Journal of the SID, 2006, 14/5, pp. 467-475.
Levola et al., "Near-to-eye display with diffractive exit pupil expander having chevron design", Journal of the SID, 2008, 16/8, pp. 857-862.
Levola et al., "Replicated slanted gratings with a high refractive index material for in and outcoupling of light", Optics Express, vol. 15, Issue 5, pp. 2067-2074 (2007).
Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.
Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.
Li et al., "Light Pipe Based Optical Train and its Applications", Proceedings vol. 5524, Novel Optical Systems Design and Optimization VII, Oct. 24, 2004, doi: 10.1117/12.559833, 10 pgs.
Li et al., "Novel Projection Engine with Dual Paraboloid Reflector and Polarization Recovery Systems", Wavien Inc., SPIE EI 5289-38, Jan. 21, 2004, 49 pgs.
Li et al., "Polymer crystallization/melting induced thermal switching in a series of holographically patterned Bragg reflectors", Soft Matter, Jul. 11, 2005, vol. 1, pp. 238-242.
Lin et al., "Ionic Liquids in Photopolymerizable Holographic Materials", in book: Holograms—Recording Materials and Applications, Nov. 9, 2011, 21 pgs.
Liu et al., "Holographic Polymer Dispersed Liquid Crystals Materials, Formation and Applications", Advances in OptoElectronics, Nov. 30, 2008, vol. 2008, Article ID 684349, 52 pgs.
Lorek, "Experts Say Mass Adoption of augmented and Virtual Reality is Many Years Away", Siliconhills, Sep. 9, 2017, 4 pgs.
Lowenthal et al., "Speckle Removal by a Slowly Moving Diffuser Associated with a Motionless Diffuser", Journal of the Optical Society of America, Jul. 1971, vol. 61, No. 7, pp. 847-851.
Lu et al., "Polarization switch using thick holographic polymer-dispersed liquid crystal grating", Journal of Applied Physics, Feb. 1, 2004, vol. 95, No. 3, pp. 810-815.
Lu et al., "The Mechanism of electric-field-induced segregation of additives in a liquid-crystal host", Phys Rev E Stat Nonlin Soft Matter Phys., Nov. 27, 2012, 14 pgs.
Ma et al., "Holographic Reversed-Mode Polymer-Stabilized Liquid Crystal Grating", Chinese Phys. Lett., 2005, vol. 22, No. 1, pp. 103-106.
Mach et al., "Switchable Bragg diffraction from liquid crystal in colloid-templated structures", Europhysics Letters, Jun. 1, 2002, vol. 58, No. 5, pp. 679-685.

(56) References Cited

OTHER PUBLICATIONS

Magarinos et al., "Wide Angle Color Holographic infinity optics display", Air Force Systems Command, Brooks Air Force Base, Texas, AFHRL-TR-80-53, Mar. 1981, 100 pgs.

Marino et al., "Dynamical Behaviour of Policryps Gratings", Electronic-Liquid Crystal Communications, Feb. 5, 2004, 10 pgs.

Massenot et al., "Multiplexed holographic transmission gratings recorded in holographic polymer-dispersed liquid crystals: static and dynamic studies", Applied Optics, 2005, vol. 44, Issue 25, pp. 5273-5280.

Matay et al., "Planarization of Microelectronic Structures by Using Polyimides", Journal of Electrical Engineering, 2002, vol. 53, No. 3-4, pp. 86-90.

Mathews, "The LED FAQ Pages", Jan. 31, 2002, 23 pgs.

Matic, "Blazed phase liquid crystal beam steering", Proc. of the SPIE, 1994, vol. 2120, pp. 194-205.

McLeod, "Axicons and Their Uses", Journal of the Optical Society of America, Feb. 1960, vol. 50, No. 2, pp. 166-169.

McManamon et al., "A Review of Phased Array Steering for Narrow-Band Electrooptical Systems", Proceedings of the IEEE, Jun. 2009, vol. 97, No. 6, pp. 1078-1096.

McManamon et al., "Optical Phased Array Technology", Proceedings of the IEEE, Feb. 1996, vol. 84, Issue 2, pp. 268-298.

Miller, "Coupled Wave Theory and Waveguide Applications", The Bell System Technical Journal, Short Hills, NJ, Feb. 2, 1954, 166 pgs.

Moffitt, "Head-Mounted Display Image Configurations", retrieved from the internet on Dec. 19, 2014, dated May 2008, 25 pgs.

Nair et al., "Enhanced Two-Stage Reactive Polymer Network Forming Systems", Polymer (Guildf). May 25, 2012, vol. 53, No. 12, pp. 2429-2434, doi:10.1016/j.polymer.2012.04.007.

Nair et al., "Two-Stage Reactive Polymer Network Forming Systems", Advanced Functional Materials, 2012, pp. 1-9, DOI: 10.1002/adfm.201102742.

Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.

Natarajan et al., "Electro Optical Switching Characteristics of Volume Holograms in Polymer Dispersed Liquid Crystals", Journal of Nonlinear Optical Physics and Materials, 1997, vol. 5, No. 1, pp. 666-668.

Natarajan et al., "Electro-Optical Switching Characteristics of Volume Holograms in Polymer Dispersed Liquid Crystals", J. of Nonlinear Optical Physics Materials, Jan. 1996, vol. 5, No. 1, pp. 89-98.

Natarajan et al., "Holographic polymer dispersed liquid crystal reflection gratings formed by visible light initiated thiol-ene photopolymerization", Polymer, vol. 47, May 8, 2006, pp. 4411-4420.

Naydenova et al., "Low-scattering Volume Holographic Material", DIT PhD Project, http://www.dit.ie/ieo/, Oct. 2017, 2 pgs.

Neipp et al., "Non-local polymerization driven diffusion based model: general dependence of the polymerization rate to the exposure intensity", Optics Express, Aug. 11, 2003, vol. 11, No. 16, pp. 1876-1886.

Nishikawa et al., "Mechanically and Light Induced Anchoring of Liquid Crystal on Polyimide Film", Mol. Cryst. Liq. Cryst., Aug. 1999, vol. 329, 8 pgs.

Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.

Nordin et al., "Diffraction Properties of Stratified Volume Holographic Optical Elements", Journal of the Optical Society of America A., vol. 9, No. 12, Dec. 1992, pp. 2206-2217.

Oh et al., "Achromatic diffraction from polarization gratings with high efficiency", Optic Letters, Oct. 15, 2008, vol. 33, No. 20, pp. 2287-2289.

Olson et al., "Templating Nanoporous Polymers with Ordered Block Copolymers", Chemistry of Materials, Web publication Nov. 27, 2007, vol. 20, pp. 869-890.

Ondax, Inc., "Volume Holographic Gratings (VHG)", 2005, 7 pgs.

Orcutt, "Coming Soon: Smart Glasses That Look Like Regular Spectacles", Intelligent Machines, Jan. 9, 2014, 4 pgs.

Osredkar, "A study of the limits of spin-on-glass planarization process", Informacije MIDEM, 2001, vol. 31, 2, ISSN0352-9045, pp. 102-105.

Osredkar et al., "Planarization methods in IC fabrication technologies", Informacije MIDEM, 2002, vol. 32, 3, ISSN0352-9045, 5 pgs.

Ou et al., "A Simple LCOS Optical System (Late News)", Industrial Technology Research Institute/OES Lab. Q100/0200, SID 2002, Boston, USA, 2 pgs.

Paolini et al., "High-Power LED Illuminators in Projection Displays", Lumileds, Aug. 7, 2001, 19 pgs.

Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.

Park et al., "Fabrication of Reflective Holographic Gratings with Polyurethane Acrylates (PUA)", Current Applied Physics, Jun. 2002, vol. 2, pp. 249-252.

Plawsky et al., "Engineered nanoporous and nanostructured films", MaterialsToday, Jun. 2009, vol. 12, No. 6, pp. 36-45.

Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.

Presnyakov et al., "Electrically tunable polymer stabilized liquid-crystal lens", Journal of Applied Physics, Apr. 29, 2005, vol. 97, pp. 103101-1-103101-6.

Qi et al., "P-111: Reflective Display Based on Total Internal Reflection and Grating-Grating Coupling", Society for Information Display Digest, May 2003, pp. 648-651, DOI: 10.1889/1.1832359.

Ramón, "Formation of 3D micro- and nanostructures using liquid crystals as a template", Technische Universiteit Eindhoven, Apr. 17, 2008, Thesis, DOI:http://dx.doi.org/10.6100/IR634422, 117 pgs.

Ramsey, "Holographic Patterning of Polymer Dispersed Liquid Crystal Materials for Diffractive Optical Elements", Thesis, The University of Texas at Arlington, Dec. 2006, 166 pgs.

Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.

Reid, "Thin film silica nanocomposites for anti-reflection coatings", Oxford Advance Surfaces, www.oxfordsurfaces.com, Oct. 18, 2012, 23 pgs.

Riechert, "Speckle Reduction in Projection Systems", Dissertation, University Karlsruhe, 2009, 178 pgs.

Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.

Sagan et al., "Electrically Switchable Bragg Grating Technology for Projection Displays", Proc. SPIE. vol 4294, Jan. 24, 2001, pp. 75-83.

Saleh et al., "Fourier Optics : 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.

Saraswat, "Deposition & Planarization", EE 311 Notes, Aug. 29, 2017, 28 pgs.

Schechter et al., "Compact beam expander with linear gratings", Applied Optics, vol. 41, No. 7, Mar. 1, 2002, pp. 1236-1240.

Schreiber et al., "Laser display with single-mirror MEMS scanner", Journal of the SID 17/7, 2009, pp. 591-595.

Seiberle et al., "Photo-aligned anisotropic optical thin films", Journal of the SID 12/1,2004, 6 pgs.

Serebriakov et al., "Correction of the phase retardation caused by intrinsic birefringence in deep UV lithography", Proc. of SPIE, May 21, 2010, vol. 5754, pp. 1780-1791.

(56) References Cited

OTHER PUBLICATIONS

Shi et al., "Design considerations for high efficiency liquid crystal decentered microlens arrays for steering light", Applied Optics, vol. 49, No. 3, Jan. 20, 2010, pp. 409-421.
Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.
Simonite, "How Magic Leap's Augmented Reality Works", Intelligent Machines, Oct. 23, 2014, 7 pgs.
Smith et al., "RM-PLUS—Overview", Licrivue, Nov. 5, 2013, 16 pgs.
Sony Global, "Sony Releases the Transparent Lens Eyewear 'SmartEyeglass Developer Edition'", printed Oct. 19, 2017, Sony Global—News Releases, 5 pgs.
Steranka et al., "High-Power LEDs—Technology Status and Market Applications", Lumileds, Jul. 2002, 23 pgs.
Stumpe et al., "Active and Passive LC Based Polarization Elements", Mol. Cryst. Liq. Cryst., 2014, vol. 594: pp. 140-149.
Stumpe et al., "New type of polymer-LC electrically switchable diffractive devices—POLIPHEM", May 19, 2015, p. 97.
Subbarayappa et al., "Bistable Nematic Liquid Crystal Device", Jul. 30, 2009, 14 pgs.
Sun et al., "Effects of multiwalled carbon nanotube on holographic polymer dispersed liquid crystal", Polymers Advanced Technologies, Feb. 19, 2010, DOI: 10.1002/pat.1708, 8 pgs.
Sun et al., "Low-birefringence lens design for polarization sensitive optical systems", Proceedings of SPIE, 2006, vol. 6289, doi: 10.1117/12.679416, pp. 6289DH-1-6289DH-10.
Sun et al., "Transflective multiplexing of holographic polymer dispersed liquid crystal using Si additives", eXPRESS Polymer Letters, 2011, vol. 5, No. 1, pp. 73-81.
Sutherland et al., "Bragg Gratings in an Acrylate Polymer Consisting of Periodic Polymer—Dispersed Liquid-Crystal Planes", Chem. Mater., 1993, vol. 5, pp. 1533-1538.
Sutherland et al., "Electrically switchable volume gratings in polymer-dispersed liquid crystals", Applied Physics Letters, Feb. 28, 1994, vol. 64, No. 9, pp. 1074-1076.
Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.
Sutherland et al., "The physics of photopolymer liquid crystal composite holographic gratings", presented at SPIE: Diffractive and Holographic Optics Technology San Jose, CA, 1996, SPIE, vol. 2689, pp. 158-169.
Sweatt, "Achromatic triplet using holographic optical elements", Applied Optics, May 1977, vol. 16, No. 5, pp. 1390-1391.
Talukdar, "Technology Forecast: Augmented reality", Changing the economics of Smartglasses, Issue 2, 2016, 5 pgs.
Tao et al., "TiO2 nanocomposites with high refractive index and transparency", J. Mater. Chem., Oct. 4, 2011, vol. 21, pp. 18623-18629.
Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.
Tiziani, "Physical Properties of Speckles", Speckle Metrology, Chapter 2, Academic Press, Inc., 1978, pp. 5-9.
Tominaga et al., "Fabrication of holographic polymer dispersed liquid crystals doped with gold nanoparticles", 2010 Japanese Liquid Crystal Society Annual Meeting, 2 pgs.
Tomita, "Holographic assembly of nanoparticles in photopolymers for photonic applications", The International Society for Optical Engineering, SPIE Newsroom, 2006, 10.1117/2.1200612.0475, 3 pgs.
Trisnadi, "Hadamard Speckle Contrast Reduction", Optics Letters, Jan. 1, 2004, vol. 29, No. 1, pp. 11-13.
Trisnadi, "Speckle contrast reduction in laser projection displays", Proc. SPIE 4657, 2002, 7 pgs.
Tzeng et al., "Axially symmetric polarization converters based on photo-aligned liquid crystal films", Optics Express, Mar. 17, 2008, vol. 16, No. 6, pp. 3768-3775.
Upatnieks et al., "Color Holograms for white light reconstruction", Applied Physics Letters, Jun. 1, 1996, vol. 8, No. 11, pp. 286-287.
Urey, "Diffractive exit pupil expander for display applications", Applied Optics, vol. 40, Issue 32, pp. 5840-5851 (2001).
Ushenko, "The Vector Structure of Laser Biospeckle Fields and Polarization Diagnostics of Collagen Skin Structures", Laser Physics, 2000, vol. 10, No. 5, pp. 1143-1149.
Valoriani, "Mixed Reality: Dalle demo a un prodotto", Disruptive Technologies Conference, Sep. 23, 2016, 67 pgs.
Van Gerwen et al., "Nanoscaled interdigitated electrode arrays for biochemical sensors", Sensors and Actuators, Mar. 3, 1998, vol. B 49, pp. 73-80.
Vecchi, "Studi ESR Di Sistemi Complessi Basati Su Cristalli Liquidi", Thesis, University of Bologna, Department of Physical and Inorganic Chemistry, 2004-2006, 110 pgs.
Veltri et al., "Model for the photoinduced formation of diffraction gratings in liquid-crystalline composite materials", Applied Physics Letters, May 3, 2004, vol. 84, No. 18, pp. 3492-3494.
Vita, "Switchable Bragg Gratings", Thesis, Universita degli Studi di Napoli Federico II, Nov. 2005, 103 pgs.
Vuzix, "M3000 Smart Glasses, Advanced Waveguide Optics", brochure, Jan. 1, 2017, 2 pgs.
Wang et al., "Liquid-crystal blazed-grating beam deflector", Applied Optics, Dec. 10, 2000, vol. 39, No. 35, pp. 6545-6555.
Wang et al., "Optical Design of Waveguide Holographic Binocular Display for Machine Vision", Applied Mechanics and Materials, Sep. 27, 2013, vols. 427-429, pp. 763-769.
Wang et al., "Speckle reduction in laser projection systems by diffractive optical elements", Applied Optics, Apr. 1, 1998, vol. 37, No. 10, pp. 1770-1775.
Weber et al., "Giant Birefringent Optics in Multilayer Polymer Mirrors", Science, Mar. 31, 2000, vol. 287, pp. 2451-2456.
Wei An, "Industrial Applications of Speckle Techniques", Doctoral Thesis, Royal Institute of Technology, Department of Production Engineering, Chair of Industrial Metrology & Optics, Stockholm, Sweden 2002, 76 pgs.
Welde et al., "Investigation of methods for speckle contrast reduction", Master of Science in Electronics, Jul. 2010, Norwegian University of Science and Technology, Department of Electronics and Telecommunications, 127 pgs.
White, "Influence of thiol-ene polymer evolution on the formation and performance of holographic polymer dispersed liquid crystals", The 232nd ACS National Meeting, San Francisco, CA, Sep. 10-14, 2006, 1 pg.
Wight et al., "Nanoporous Films with Low Refractive Index for Large-Surface Broad-Band Anti-Reflection Coatings", Macromol. Mater. Eng., 2010, 295, DOI 10.1002/mame.201000045, 9 pgs.
Wilderbeek et al., "Photoinitiated Bulk Polymerization of Liquid Crystalline Thiolene Monomers", Macromolecules, 2002, vol. 35, pp. 8962-8969.
Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, pp. 12874-12883.
Wisely, "Head up and head mounted display performance improvements through advanced techniques in the manipulation of light", Proc. of SPIE, 2009, 10 pages, vol. 7327.
Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.
Yaqoob et al., "High-speed two-dimensional laser scanner based on Bragg grating stored in photothermorefractive glass", Applied Optics, Sep. 10, 2003, vol. 42, No. 26, pp. 5251-5262.

(56) References Cited

OTHER PUBLICATIONS

Yaroshchuk et al., "Stabilization of liquid crystal photoaligning layers by reactive mesogens", Applied Physics Letters, Jul. 14, 2009, vol. 95, pp. 021902-1-021902-3.
Ye, "Three-dimensional Gradient Index Optics Fabricated in Diffusive Photopolymers", Thesis, Department of Electrical, Computer and Energy Engineering, University of Colorado, 2012, 224 pgs.
Yemtsova et al., "Determination of liquid crystal orientation in holographic polymer dispersed liquid crystals by linear and non-linear optics", Journal of Applied Physics, Oct. 13, 2008, vol. 104, pp. 073115-1-073115-4.
Yeralan et al., "Switchable Bragg grating devices for telecommunications applications", Opt. Eng., Aug. 2012, vol. 41, No. 8, pp. 1774-1779.
Yoshida et al., "Nanoparticle-Dispersed Liquid Crystals Fabricated by Sputter Doping", Adv. Mater., 2010, vol. 22, pp. 622-626.
Zhang et al., "Dynamic Holographic Gratings Recorded by Photopolymerization of Liquid Crystalline Monomers", J. Am. Chem. Soc., 1994, vol. 116, pp. 7055-7063.
Zhang et al., "Switchable Liquid Crystalline Photopolymer Media for Holography", J. Am. Chem. Soc., 1992, vol. 114, pp. 1506-1507.
Zhao et al., "Designing Nanostructures by Glancing Angle Deposition", Proc. of SPIE, Oct. 27, 2003, vol. 5219, pp. 59-73.
Zlębacz, "Dynamics of nano and micro objects in complex liquids", Ph.D. dissertation, Institute of Physical Chemistry of the Polish Academy of Sciences, Warsaw 2011, 133 pgs.
Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526.
Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.
International Search Report and Written Opinion for International Application No. PCT/US2020/022482, Search completed May 12, 2020, dated Jun. 9, 2020, 11 Pgs.
International Search Report and Written Opinion for International Application No. PCT/US2020/031363, completed May 28, 2020, dated Jun. 10, 2020, 8 Pgs.
International Search Report and Written Opinion for International Application No. PCT/US2019/065478, Search completed Jan. 29, 2020, dated Feb. 11. 2020, 14 pgs.
International Search Report and Written Opinion for International Application PCT/US2015/047097, completed Nov. 22, 2015, dated Dec. 16, 2019, 10 pgs.
International Search Report for PCT/GB2013/000210, completed by the European Patent Office dated Aug. 12, 2013, 3 pgs.
International Search Report for PCT/GB2013/000273, completed by the European Patent Office dated Aug. 30, 2013, 4 pgs.
International Search Report for PCT/GB2014/000197, Completed by the European Patent Office dated Jul. 31, 2014, 3 Pages.
International Search Report for PCT/GB2016/000003, Completed by the European Patent Office dated May 31, 2016, 6 pgs.
International Search Report for PCT/GB2016/000005, completed by the European Patent Office dated May 27, 2016, 4 pgs.
International Search Report for PCT/GB2016/000051, dated Aug. 11, 2016, 3 Pgs.
Supplementary Partial European Search Report for European Application No. 18727645.6, Search completed Jul. 2, 2020, dated Jul. 13, 2020, 13 Pgs.
Written Opinion for International Application No. PCT/GB2013/000273, completed Aug. 30, 2013, dated Sep. 9, 2013, 7 pgs.
Written Opinion for International Application No. PCT/GB2014/000197, Search completed Jul. 31, 2014, dated Aug. 7, 2014, 6 Pgs.
Written Opinion for International Application No. PCT/GB2016/000051, Search completed Aug. 11, 2016, dated Aug. 22, 2016, 6 Pgs.
Written Opinion for International Application PCT/GB2013/000210, completed Aug. 12, 2013, dated Aug. 20, 2013, 5 pgs.
Written Opinion for International Application PCT/GB2016/000005, search completed May 27, 2016, dated Jun. 6, 2016, 6 pgs.
Google search: "digilens waveguide" [site visited Sep. 14, 2020], https://www.google.com/search?q=digilens+waveguide&sxsrf=ALeKk02RFwZAZOvrlxVHOM_2fiXFkhW1 FA: 1604777621684&source=lnms&tbm=isch&sa=X&ved=2ah U KEwjjyNXAIvHsAh U Rh HI EHTufCvsQ_AUoAnoECBwQBA&biw=1200&bih= 1777,.
Google search: "eyewear display devices" [site visited Sep. 14, 2020], https://www.google.com/search?q=eyewear+display+devices&sxsrf=ALeKk0 1 WWfnOAgsQR_bhydJaYK3e37r J Lg: 1604779001617 &source=lnms&tbm=isch&sa=X&ved=2ah U KEwi99txSm_HsAhVaoH I EHawtD8QQ_AUoAnoECC8QBA &biw= 1200&bih= 1777.
Google search: "smart glasses" [site visited Sep. 14, 2020], https://www.google.com/search?q=smart+glasses&sxsrf=ALeKk01 KN 1wj23-NqP -KCnrcsUpCgxyKA: 1604779046920&source=lnms&tbm=isch&sa=X&ved=2ah U KEwipkq Pom_HsAhVKhXI EHQGFBp8Q_ AUoBHoECCgQBg&biw= 1200&bih= 1777.
Carothers, "Polymers and polyfunctionality", Transactions of the Faraday Society, 1936, vol. 32, pp. 39-49.
De Sarkar et al., "Effect of Monomer Functionality on the Morphology and Performance of Holographic Transmission Gratings Recorded on Polymer Dispersed Liquid Crystals", Macromolecules, 2003, vol. 36, No. 3, pp. 630-638.
Doolittle, "Studies in Newtonian Flow. II. The Dependence of the Viscosity of Liquids on Free-Space", Journal of Applied Physics, 1951, vol. 22, Issue 12, pp. 1471-1475, published online Apr. 29, 2004, https://doi.0rg/10.1063/1.1699894.
Flory, "Molecular size distribution in three-dimensional polymers. I. Gelation", J. Am. Chem. Soc., Nov. 1941, vol. 63, pp. 3083-3090.
Fuh et al., "Thermally and Electrically Switchable Gratings Based Upon the Polymer-Balls Type Polymer-Dispersed Liquid Crystal Films", Appl. Phys. Vol. 41, No. 22, Aug. 1, 2002, pp. 4585-4589.
Gerritsen et al., "Application of Kogelnik's two-wave theory to deep, slanted, highly efficient, relief transmission gratings", Applied Optics, Mar. 1, 1991, vol. 30; No. 7, pp. 807-814.
Golub et al., "Bragg properties of efficient surface relief gratings in the resonance domain", Optics Communications, Feb. 24, 2004, vol. 235, pp. 261-267, doi: 10.1016/j.optcom.2004.02.069.
Guo et al., "Analysis of the effects of viscosity, vol. and temperature in photopolymer material for holographic applications", Proc. SPIE, May 2013, vol. 8776, p. 87760J-1-87760-J15, DOI:10.1117/12.2018330.
Jang et al., "Low Driving Voltage Holographic Polymer Dispersed Liquid Crystals with Chemically Incorporated Graphene Oxide", Journal of Materials Chemistry, 2011, vol. 21, p. 19226-19232, doi.10.1039/1jm13827h.
Jeong et al., "Memory Effect of Polymer Dispersed Liquid Crystal by Hybridization with Nanoclay", express Polymer Letters, vol. 4, No. 1, 2010, pp. 39-46.
Kakiuchida et al., "Multiple Bragg Diffractions with Different Wavelengths and Polarizations Composed of Liquid Crystal/Polymer Periodic Phases", ACS Omega, Sep. 22, 2017, pp. 6081-6090, doi 10.1021/acsomega.7b01149.
Levin et al., "A Closed Form Solution to Natural Image Matting", Illumination & Displays 3D Visualization and Imaging Systems Laboratory (3DVIS) College of Optical Sciences University of Arizona Tucson, 2014, 8 pgs.
Liu et al., "Effect of Surfactant on the Electro-Optical Properties of Holographic Polymer Dispersed Liquid Crystal Bragg Gratings", Optical Materials, 2005, vol. 27, pp. 1451-1455, available online Dec. 25, 2004, doi: 10.1016/j.optmat.2004.10.010.
Lougnot et al., "Polymers for holographic recording: VI. Some basic ideas for modelling the kinetics of the recording process", Pure and Applied Optics: Journal of the European Optical Society Part A, 1997, vol. 6, No. 2, pp. 225-245, https://doi.org/10.1088/0963-9659/6/2/007.
Moharam et al., "Diffraction characteristics of photoresist surface-relief gratings", Applied Optics, Sep. 15, 1984, vol. 23, pp. 3214-3220.
Ogiwara et al., "Temperature Dependence of Anisotropic Diffraction in Holographic Polymer-Dispersed Liquid Crystal Memory", Applied Optics, Sep. 10, 2013, vol. 52, No. 26, pp. 6529-6536.

(56) References Cited

OTHER PUBLICATIONS

Ogiwara et al., "Thermo-Driven Light Controller by Using Thermal Modulation of Diffraction Wavelength in Holographic Polymer Dispersed Liquid Crystal Grating", Proc SPIE, Feb. 19, 2014, 9004, Article 90040Q, 8 pgs., doi: 10.1117/12.2039104.
Peng et al., "Low Voltage Driven and Highly Diffractive Holographic Polymer Dispersed Liquid Crystals with Spherical Morphology", RSC Advances, 2017, vol. 7, pp. 51847-51857, doi: 10.1039/c7ra08949.
Roussel et al., "Photopolymerization Kinetics and Phase Behavior of Acrylate Based Polymers Dispersed Liquid Crystals", Liquid Crystals, 1998, vol. 24, Issue 4, pp. 555-561.
Sabel et al., "Simultaneous formation of holographic surface relief gratings and vol. phase gratings in photosensitive polymer", Materials Research Letters, May 30, 2019, vol. 7, No. 10, pp. 405-411, doi: 10.1080/21663831.2019.1621956.
Sakhno et al., "Deep surface relief grating in azobenzene-containing materials using a low-intensity 532 nm laser", Optical Materials: X, Jan. 23, 2019, 100006, pp. 3-7, doi: 10.1016/j.omx.2019.100006.
Tahata et al., "Effects of Polymer Matrix on Electro-Optic Properties of Liquid Crystal Mixed with Polymer", Proc SPIE, Mar. 11, 1996, vol. 2651, pp. 101-106, doi: 10.1117/12.235342.
Tondiglia et al., "Holographic Formation of Electro-Optical Polymer-Liquid Crystal Photonic Crystals", Advanced Materials, 2002, Published Online Nov. 8, 2001, vol. 14, No. 3, pp. 187-191.
Yang et al., "Robust and Accurate Surface Measurement Using Structured Light", IEEE, Apr. 30, 2008, vol. 57, Issue 6, pp. 1275-1280, DOI:10.1109/TIM.2007.915103.
Yokomori, "Dielectric surface-re lief gratings with high diffraction efficiency", Applied Optics, Jul. 15, 1984, vol. 23; No. 14, pp. 2303-2310.
Youcef et al., "Phase Behavior Of Poly(N-Butyl Acrylate) And Poly(2-Ethylhexyl Acrylate) in Nematic Liquid Crystal E7", Macromol. Symp. 2011, vol. 303, pp. 10-16, doi: 10.1002/masy.201150502.
Zhao et al., "Diffusion Model of Hologram Formation in Dry Photopolymer Materials", Journal of Modern Optics, 1994. Vol. 41, No. 10, pp. 1929-1939, https://doi.org/10.1080/09500349414551831.
Zhao et al., "Extension of a diffusion model for holographic photopolymers", Journal of Modern Optics, 1995, vol. 42, No. 12, pp. 2571-2573, https://doi.org/10.1080/713824349.
Zheng et al., "Holographic Polymer-Dispersed Liquid Crystal Grating with Low Scattering Losses", Liquid Crystals, Mar. 2012, vol. 39, Issue 3, pp. 387-391.
Digi Lens: Waveguides, announced unknown, [online], [site visited Nov. 6, 2020], Available from Internet, <URL: https://www.digilens.com/technology/waveguides/> (Year: 2020).
Extended European Search Report for European Application No. 18727645.6, Search completed Oct. 14, 2020, dated Oct. 23, 2020, 13 Pgs.
International Preliminary Report on Patentability for International Application No. PCT/GB2015/000203, issued Mar. 21, 2017, dated Mar. 30, 2017, 8 pgs.
International Preliminary Report on Patentability for International Application No. PCT/GB2016/000005, Report issued Jul. 18, 2017, dated Jul. 27, 2017, 7 pgs.
International Preliminary Report on Patentability for International Application No. PCT/GB2016/000051, Report issued Sep. 19, 2017, dated Sep. 28, 2017, 7 Pgs.
International Preliminary Report on Patentability for International Application No. PCT/IB2008/001909, Report issued Jan. 26, 2010, dated Jan. 26, 2010, 5 Pgs.
International Preliminary Report on Patentability for International Application No. PCT/US2018/037410, Report issued Jul. 14, 2020, dated Jul. 23, 2020, 7 Pgs.
International Preliminary Report on Patentability for International Application No. PCT/US2018/048636, Report issued Jul. 14, 2020, dated Jul. 23, 2020, 9 Pgs.
International Preliminary Report on Patentability for International Application No. PCT/US2018/062835, Report issued Jul. 14, 2020, dated Jul. 23, 2020, 7 Pgs.
International Preliminary Report on Patentability for International Application No. PCT/US2019/012758, Report issued Jul. 14, 2020, dated Jul. 23, 2020, 4 Pgs.
International Preliminary Report on Patentability for International Application No. PCT/US2019/012759, Report issued Jul. 14, 2020, dated Jul. 23, 2020, 6 Pgs.
International Preliminary Report on Patentability for International Application PCT/GB2013/000210, issued Nov. 11, 2014, dated Nov. 20, 2014, 6 pgs.
International Preliminary Report on Patentability for International Application PCT/GB2014/000197, issued Nov. 24, 2015, dated Dec. 3, 2015, 7 pgs.
International Preliminary Report on Patentability for International Application PCT/GB2015/000228, issued Feb. 14, 2017, dated Feb. 23, 2017, 11 pgs.
International Preliminary Report on Patentability for International Application PCT/GB2016/000003, issued Jul. 18, 2017, dated Jul. 27, 2017, 11 Pgs.
International Preliminary Report on Patentability for International Application PCT/GB2017/000015, Report Completed Aug. 7, 2018, dated Aug. 16, 2018, 7 Pgs.
International Preliminary Report on Patentability for International Application PCT/US2018/048960, Report issued on Mar. 3, 2020, dated Mar. 12, 2020, 7 Pgs.
International Preliminary Report on Patentability for International Application PCT/US2018/056150, Report Issued on Apr. 21, 2020, dated Apr. 30, 2020, 6 Pgs.
International Preliminary Report on Patentability for International Application PCT/US2019/012764, Report issued Jul. 14, 2020, dated Jul. 23, 2020, 5 Pgs.
International Preliminary Report on Patentability for International Application PCT/US2019/031163, Report issued Nov. 10, 2020, dated Nov. 19, 2020, 6 Pgs.
International Search Report and Written Opinion for International Application No. PCT/US2019/031163, Search completed Jul. 9, 2019, dated Jul. 29, 2019, 11 Pgs.
International Search Report and Written Opinion for International Application No. PCT/GB2017/000015, Search completed Apr. 25, 2017, dated May 8, 2017, 10 Pgs.
International Search Report and Written Opinion for International Application No. PCT/IB2008/001909, Search completed Feb. 4, 2009, dated Feb. 17, 2009, 6 Pgs.
International Search Report and Written Opinion for International Application No. PCT/US2018/037410, Search completed Aug. 16, 2018, dated Aug. 30, 2018, 11 Pgs.
International Search Report and Written Opinion for International Application No. PCT/US2018/048636, Search completed Nov. 1, 2018, dated Nov. 15, 2018, 16 Pgs.
International Search Report and Written Opinion for International Application No. PCT/US2018/056150, Search completed Dec. 4, 2018, dated Dec. 26, 2018, 10 Pgs.
International Search Report and Written Opinion for International Application No. PCT/US2018/062835, Search completed Jan. 14, 2019, dated Jan. 31, 2019, 14 Pgs.
International Search Report and Written Opinion for International Application No. PCT/US2019/043496, Search completed Sep. 28, 2019, dated Nov. 14, 2019, 12 Pgs.
International Search Report and Written Opinion for International Application No. PCT/US2019/064765, Search completed Feb. 3, 2020, dated Mar. 18, 2020, 11 Pgs.
International Search Report and Written Opinion for International Application No. PCT/US2020/018686, Search completed Apr. 25, 2020, dated May 22, 2020, 11 Pgs.
International Search Report and Written Opinion for International Application No. PCT/US2020/019549, Search completed Apr. 14, 2020, dated May 22, 2020, 12 Pgs.

* cited by examiner

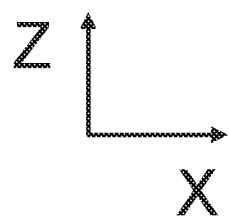
FIG.10
FIG.11
FIG.12
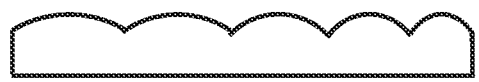
FIG.13

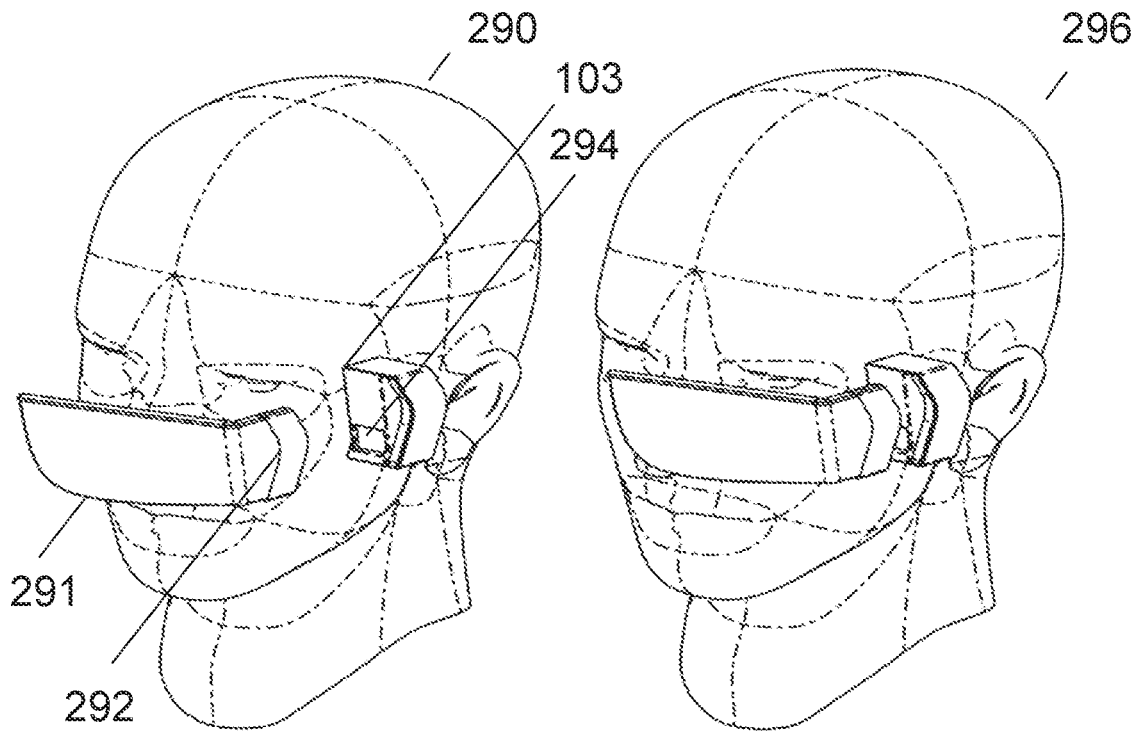
FIG.19A  FIG.19B
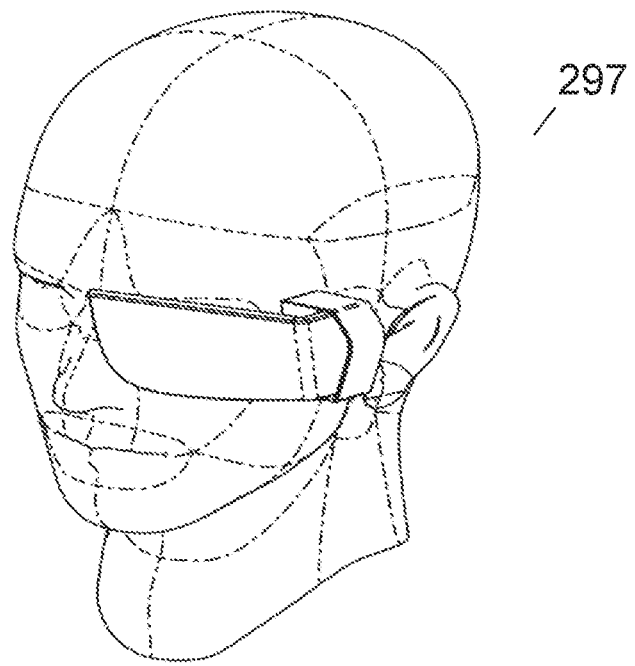
FIG.19C

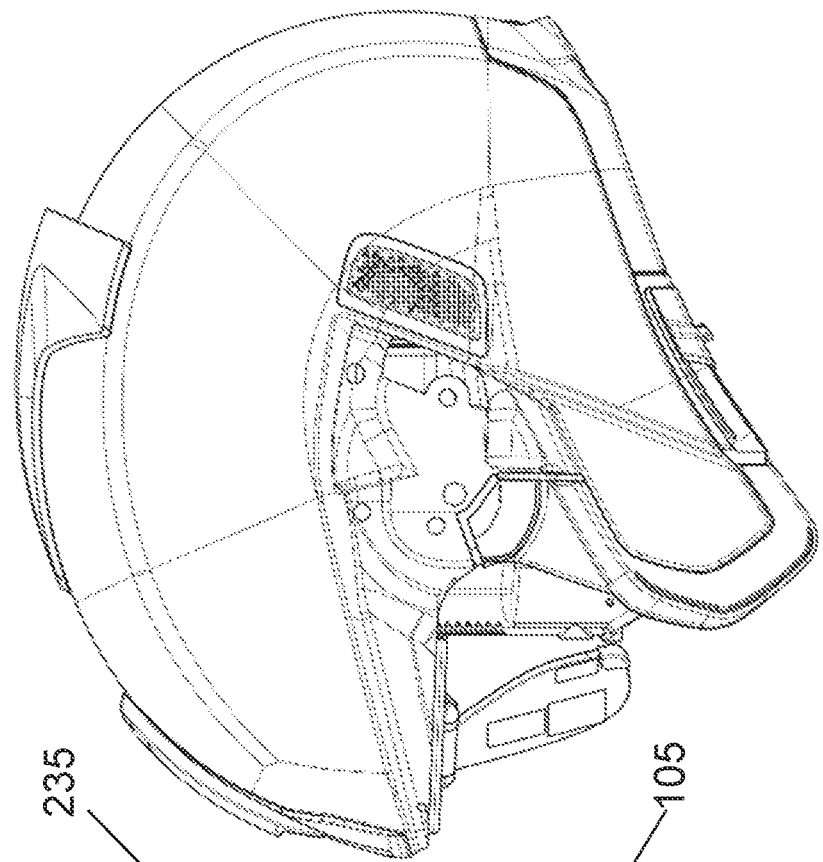
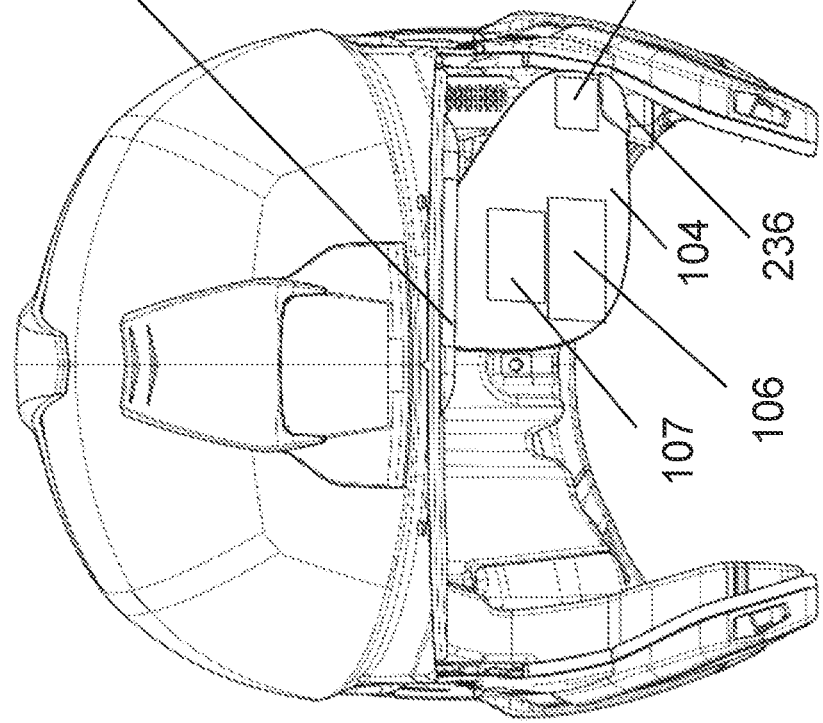
FIG. 21A
FIG. 21B

| SPECIFICATION | |
|---|---|
| Field of View | 40° Diagonal (Portrait Format) |
| Focal Distance | 7.5m - Infinity |
| Eye Box Size | 18 mm Vertical x 12 mm Horizontal. |
| Image Resolution | WVGA (854 x 480). |
| Eye Relief | 25 mm. |
| Inter-pupillary Distance | Nominally 64 mm. |
| Colour | Full Color RGB |
| Brightness (at Eye Box) | 12000 nits (maximum); 3 nits (minimum) |
| Sequential Contrast | >200:1 |
| HUD Substrate Thickness | 3 mm. |

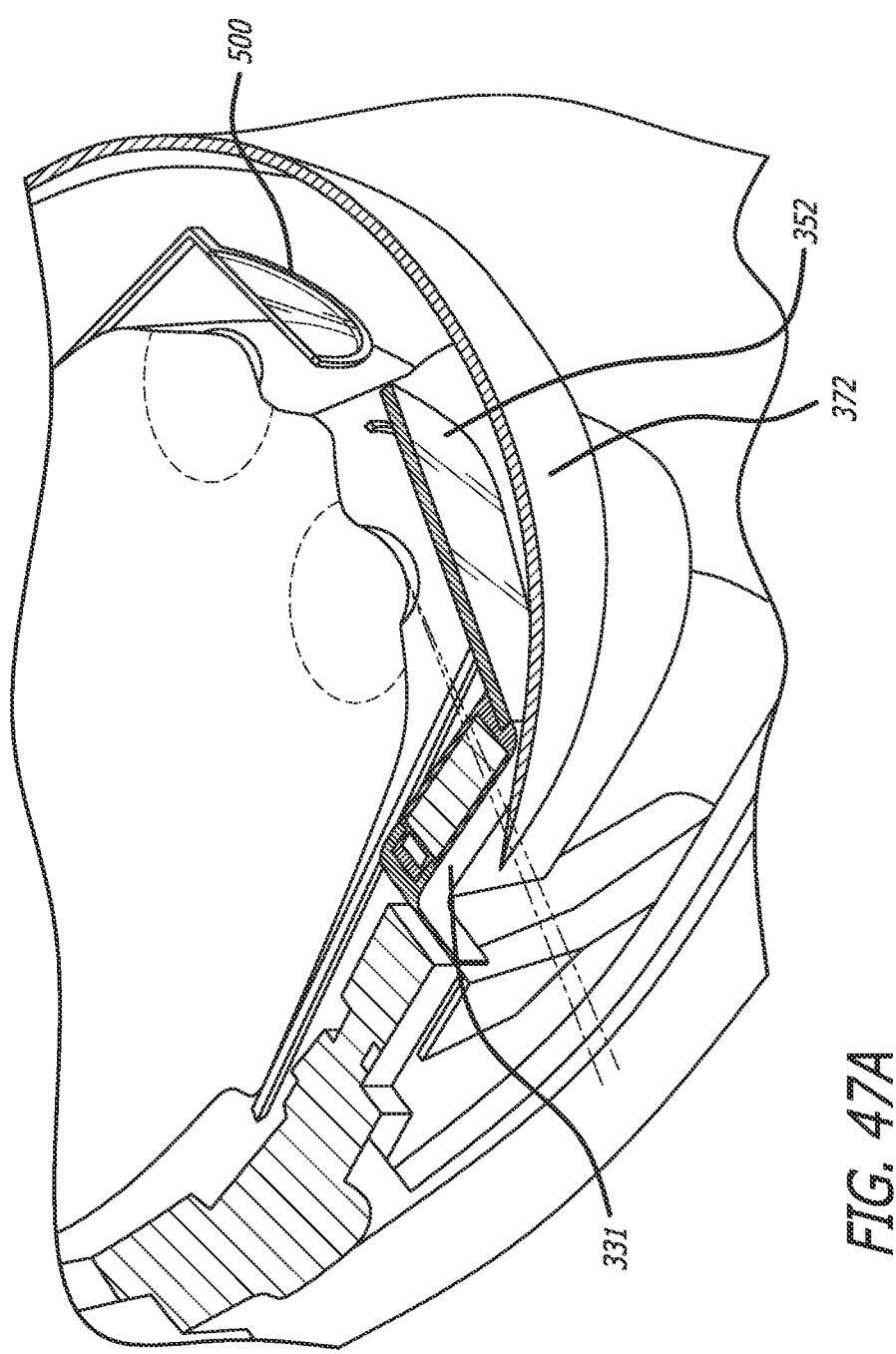

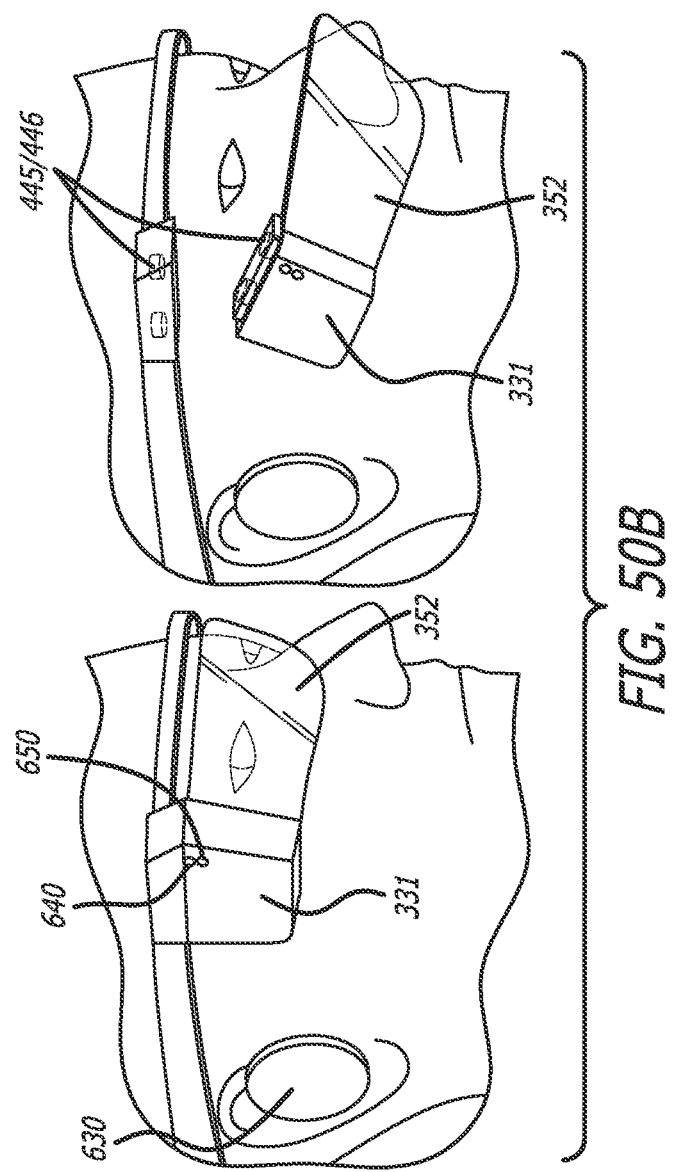

WEARABLE HEADS UP DISPLAYS

CROSS-REFERENCE TO RELATED APPLICATIONS

The present application is a continuation of U.S. patent application Ser. No. 16/773,585, entitled "Wearable Heads Up Displays" to Waldern et al., filed Jan. 27, 2020, which application is a continuation of U.S. patent application Ser. No. 15/863,798, entitled "Wearable Heads Up Displays" to Waldern et al., filed Jan. 5, 2018, which application claims priority to U.S. Provisional Patent Application No. 62/498,715, entitled "Waveguide Displays" to Waldern et al., filed Jan. 5, 2017, the disclosures of which are incorporated herein by reference in their entireties.

FIELD OF THE INVENTION

The present invention relates generally to displays including but not limited to near eye displays and more specifically holographic waveguide displays. Additionally, the present invention deals directly with the application of such displays in protective helmets.

BACKGROUND

Waveguide optics is currently being considered for a range of display and sensor applications for which the ability of waveguides to integrate multiple optical functions into a thin, transparent, lightweight substrate is of key importance. This new approach is stimulating new product developments including near-eye displays for Augmented Reality (AR) and Virtual Reality (VR), compact Heads Up Display (HUDs) for aviation and road transport and sensors for biometric and laser radar (LIDAR) applications. Waveguide displays have been proposed which use diffraction gratings to preserve eye box size while reducing lens size. U.S. Pat. No. 4,309,070 issued to St. Leger Searle and U.S. Pat. No. 4,711,512 issued to Upatnieks disclose substrate waveguide head up displays where the pupil of a collimating optical system is effectively expanded by the waveguide structure. U.S. patent application Ser. No. 13/869,866 discloses holographic wide angle displays and U.S. patent application Ser. No. 13/844,456 discloses waveguide displays having an upper and lower field of view.

A common requirement in waveguide optics is to provide beam expansion in two orthogonal directions. In display applications this translates to a large eyebox. While the principles of beam expansion in holographic waveguides are well established dual axis expansion requires separate grating layers to provide separate vertical and horizontal expansion. One of the gratings, usually the one giving the second axis expansion, also provides the near eye component of the display where the high transparency and thin, lightweight form factor of a diffractive optics can be used to maximum effect. In practical display applications, which demand full color and large fields of view the number of layers required to implement dual axis expansion becomes unacceptably large resulting in increased thickness weight and haze. Solutions for reducing the number of layers based on multiplexing two or more gratings in a single layer or fold gratings which can perform dual axis expansion (for a given angular range and wavelength) in a single layer are currently in development. Dual axis expansion is also an issue in waveguides for sensor applications such as eye trackers and LIDAR. There is a requirement for a low cost, efficient, compact dual axis expansion waveguide.

The use of HUD's in the motor industry is increasing in popularity especially in the motorcycle and recreational sport vehicle industry. Such industry applications enable the user to maintain focus on the road or surrounding environment while also receiving information about the users speed, engine conditions, phone calls, and possibly other extrinsic information that would otherwise divert the user's attention through the use of other external devices. The application of such displays is becoming essential for increased safety of the user and as a whole.

SUMMARY OF THE INVENTION

An optical display HUD is disclosed. In one embodiment an optical display, comprises a first waveguide having a first set of surfaces comprising a first open space disposed therebetween; at least one input grating disposed between the first set of surfaces and configured to receive an image from an Input Image Node assembly; at least one fold grating optically connected to the at least one input grating and disposed between the first set of surfaces; at least one output grating optically connected to the at least one fold grating and disposed between the first set of surfaces; a prismatic relay optics opto-mechanically disposed between the input image node assembly and the first waveguide; an opto-mechanical coupler disposed between the prismatic relay optics and the input image node assembly, wherein the first opto-mechanical coupler is configured to support the prismatic relay optics and receive a collimated first wavelength image modulated light and to cause the light to travel within the prismatic relay optics via total internal reflections to the first waveguide; and an optical interface coupler disposed between the prismatic relay optics and the first waveguide wherein the optical interface coupler is configured to receive the wavelength image modulated light as reflected within the prismatic relay optics and optically communicate said image to the first waveguide wherein the image will be reflected within the first waveguide via total internal reflection between said first set of surfaces from the at least one input grating to the fold grating; wherein said fold grating is configured to provide pupil expansion in a first direction and to direct said light to the output grating via total internal reflection between the first set of surfaces; and wherein said output grating is configured to provide pupil expansion in a second direction different than said first direction and to cause said light to exit said first waveguide from said first set of surfaces.

In other embodiments the input image node assembly further comprises an outer body having a thickness and an internal cavity wherein disposed within the cavity is at least one light source and at least one microdisplay panel for displaying image pixels and collimation optics, and wherein the input image node assembly is configured to project an image displayed on said microdisplay panel within the prismatic relay optics at a critical angle unique thereby ensuring the image is transmitted to the waveguide at the critical angle thus preserving the total internal reflection of the image.

In still other embodiments gratings of the optical display are switchable between a diffracting and non-diffracting state.

In yet other embodiments the optical display further comprises a second waveguide comprising a second set of surfaces having a second open space there between and, an input grating, a fold grating, and an output grating, wherein the input coupler is configured to receive a second wavelength light from the input image node assembly.

In yet still other embodiments the gratings comprised of a liquid crystal-based grating.

In even still other embodiments the optical display further comprises an eye tracker.

In other embodiments the optical display further comprises a dynamic focus lens disposed within the Input image node assembly.

In still other embodiments the optical display further comprises a dynamic focus lens disposed in proximity to the first set of surfaces of the first waveguide.

In yet still other embodiments the opto-mechanical coupler and the optical interface coupler are configured to be coupled or decoupled via at least one mechanical interface wherein the at least one mechanical interface of the opto-mechanical coupler is disposed between the opto-mechanical coupler and the input image node assembly and the at least one mechanical interface of the optical interface coupler is disposed between the optical interface coupler and the prismatic relay optics.

In yet still other embodiments the at least one mechanical interface of each of the opto-mechanical coupler and optical interface coupler is selected from a group consisting of hinged and magnetic.

In even still other embodiments the first waveguide is disposable.

In other embodiments the first set of surfaces are a ballistic shatter proof polymer.

In still other embodiments the first set of surfaces are planar surfaces.

In yet still other embodiments the first set of surfaces are curved.

In yet other embodiments the input image node assembly further comprises a laser scanner.

In even other embodiments the display is further configured to be removably connected to a headpiece.

In yet even other embodiments the input image node assembly is further configured to be adjustably connected to the headpiece such that the waveguide may be optimally adjusted and wherein the waveguide may be decoupled for replacement or storage.

In other embodiments the input image node assembly is configured to be integrated within an internal protection material of a helmet.

In yet other embodiments the input image node assembly is further configured to be adjustable such that the waveguide may be optimally adjusted.

In still other embodiments the waveguide is configured to be adjustable such that the rake angle may be optimally adjusted.

In yet still other embodiments the headpiece is configured to be inserted into a helmet.

In even other embodiments the input image node assembly is further configured to removably connect to a helmet having at least an outer shell and at least an internal protection material and an electromechanical connection assembly disposed within the helmet either connected to the outer shell or integrated within the internal protection material and where the input image node assembly is electromechanically connected to the helmet.

In even still other embodiments the input image node assembly further comprises HDMI and power connections disposed therein wherein the HDMI and power connections are configured to connect to an equivalent connection in the electromechanical connection assembly disposed within the helmet.

In other embodiments at least one of said input coupler, fold grating and output grating multiplexes at least one of color or angle.

In yet other embodiments the optical display further comprises a beam homogenizer In still other embodiments the display includes at least one optical traversing a gradient index image transfer waveguide.

In yet still other embodiments the optical display further comprises a dichroic filter disposed between the input grating regions of said first and second waveguides.

In even other embodiments the input image node assembly further comprises a spatially-varying numerical aperture component for providing a numerical aperture variation along a direction corresponding to the field of view coordinate diffracted by said input coupler.

In even still other embodiments the spatially-varying numerical aperture component has at least one of diffractive, birefringent, refracting or scattering characteristics.

In other embodiments the field of view coordinate is the horizontal field of view of the display.

In yet other embodiments a spatially varying-numerical aperture is provided by tilting a stop plane such that its normal vector is aligned parallel to the highest display field angle in the plane containing the field of view coordinate diffracted by said input coupler.

In still other embodiments the at least one of said input coupler, said fold grating or said output grating is a rolled k-vector grating.

In yet still other embodiments the thickness of the outer body of the IIN does not exceed 2 mm.

In even other embodiments the input image node assembly further comprises a cooling fan configured to move ambient air from outside the input image node assembly through the internal components of the assembly thereby maintaining an optimum temperature of the input image node assembly.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 10 is a schematic cross section view of a spatially-varying numerical aperture component based on a wedge prism in one embodiment.

FIG. 11 is a schematic cross section view of a spatially-varying numerical aperture component based on a wedge prism with one curved surface in one embodiment.

FIG. 12 is a schematic cross section view of a spatially-varying numerical aperture component based on an array of prisms in one embodiment.

FIG. 13 is a schematic cross section view of a spatially-varying numerical aperture component based on an array of lenses in one embodiment.

FIG. 19A is a three-dimensional view of a first operational state of a wearable display comprising a retractable waveguide in one embodiment.

FIG. 19B is a three-dimensional view of a second operational state of a wearable display comprising a retractable waveguide in one embodiment.

FIG. 19C is a three-dimensional view of a third operational state of a wearable display comprising a retractable waveguide in one embodiment.

FIG. 21A is a three-dimensional view of a waveguide display implemented in a motorcycle helmet in one embodiment.

FIG. 21B is a three-dimensional view of a waveguide display implemented in a motorcycle helmet in one embodiment.

FIG. 11A is a rolled K-vector grating providing stepwise changes in K-vector direction in one embodiment.

FIG. 47A illustrates an alternate view of the HUD placement in a helmet in spacial relation to the wearer's corrective lenses.

FIG. 50B Illustrates an embodiment of the HUD configuration.

DETAILED DESCRIPTION

Figure 1:
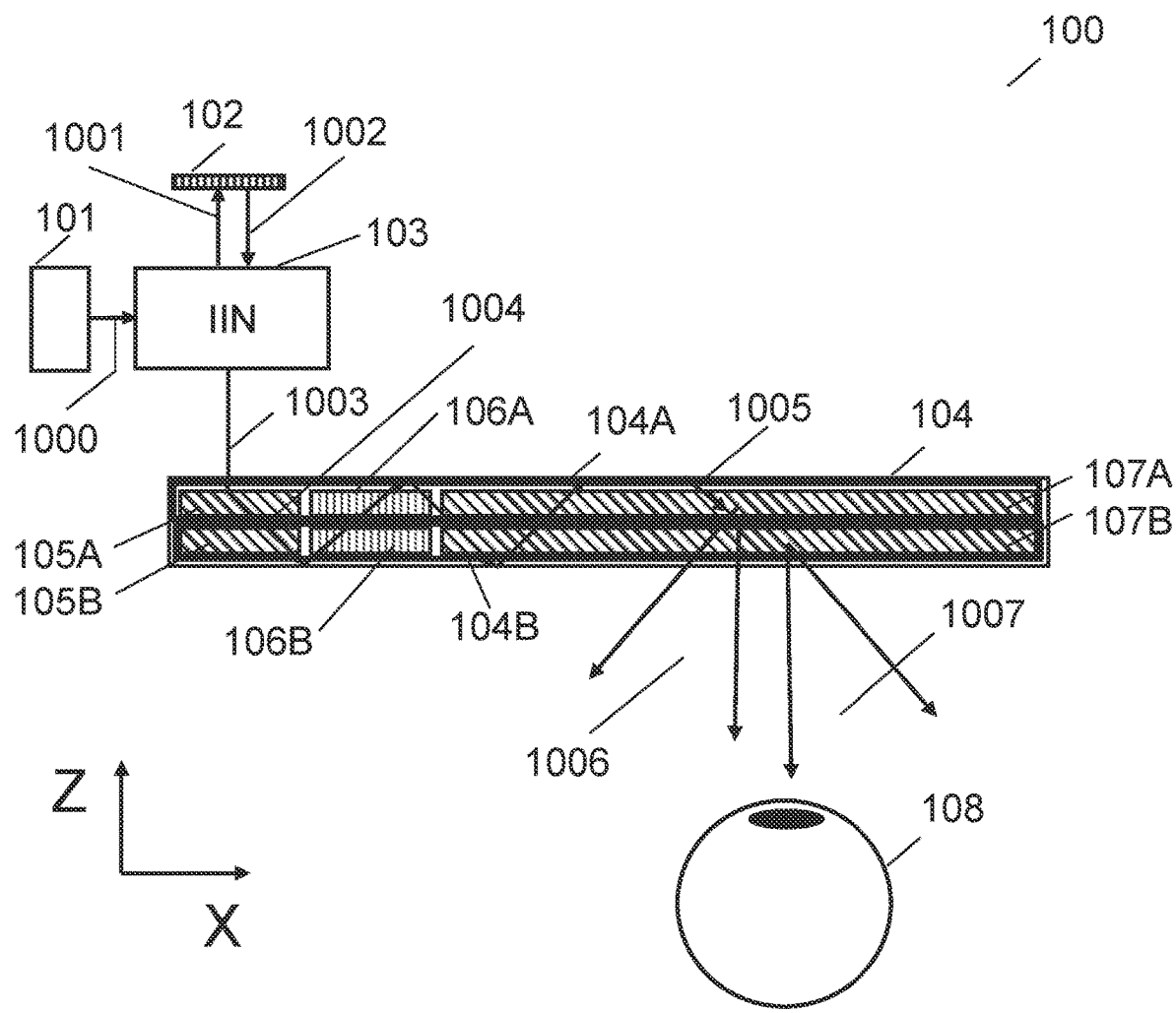
FIG. 1 is a schematic cross section view of a waveguide display in one embodiment.

Referring generally to the Figures, systems and methods relating to near-eye display or head up display systems are provided according to various embodiments. Holographic waveguide technology can be utilized in waveguides for helmet mounted displays or head mounted displays (HMDs) and head up displays (HUDs) for many applications, including military applications and consumer applications (e.g., augmented reality glasses, etc.). Switchable Bragg gratings (SBGs) may be used in waveguides to eliminate extra layers and to reduce the thickness of current display systems, including HMDs, HUDs, and other near eye displays and to increase the field of view by tiling images presented sequentially on a microdisplay. A larger exit pupil may be created by using fold gratings in conjunction with conventional gratings to provide pupil expansion on a single waveguide in both the horizontal and vertical directions. Using the systems and methods disclosed herein, a single optical waveguide substrate may generate a wider field of view than found in current waveguide systems. Diffraction gratings may be used to split and diffract light rays into several beams that travel in different directions, thereby dispersing the light rays.

In various embodiments, the grating used in the invention is a Bragg grating (also referred to as a volume grating). Bragg gratings have high efficiency with little light being diffracted into higher orders. The relative amount of light in the diffracted and zero order can be varied by controlling their refractive index modulation of the grating, a property which is used to make lossy waveguide gratings for extracting light over a large pupil. One class of gratings is known as Switchable Bragg Gratings (SBG). SBGs are fabricated by first placing a thin film of a mixture of photopolymerizable monomers and liquid crystal material between parallel glass plates. One or both glass plates support electrodes, typically transparent indium tin oxide films, for applying an electric field across the film. A volume phase grating is then recorded by illuminating the liquid material (often referred to as the syrup) with two mutually coherent laser beams, which interfere to form a slanted fringe grating structure. During the recording process, the monomers polymerize and the mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the film. When an electric field is applied to the grating via transparent electrodes, the natural orientation of the LC droplets is changed causing the refractive index modulation of the fringes to reduce and the hologram diffraction efficiency to drop to very low levels. Typically, SBG Elements are switched clear in 30 µs. With a longer relaxation time to switch ON. Note that the diffraction efficiency of the device can be adjusted, by means of the applied voltage, over a continuous range. The device exhibits near 100% efficiency with no voltage applied and essentially zero efficiency with a sufficiently high voltage applied. In certain types of HPDLC devices magnetic fields may be used to control the LC orientation. In certain types of HPDLC phase separation of the LC material from the polymer may be accomplished to such a degree that no discernible droplet structure results. A SBG may also be used as a passive grating. In this mode its chief benefit is a uniquely high refractive index modulation.

SBGs may be used to provide transmission or reflection gratings for free space applications. SBGs may be implemented as waveguide devices in which the HPDLC forms either the waveguide core or an evanescently coupled layer in proximity to the waveguide. The parallel glass plates used to form the HPDLC cell provide a total internal reflection (TIR) light guiding structure. Light is coupled out of the SBG when the switchable grating diffracts the light at an angle beyond the TIR condition. Waveguides are currently of interest in a range of display and sensor applications. Although much of the earlier work on HPDLC has been directed at reflection holograms transmission devices are proving to be much more versatile as optical system building blocks. Typically, the HPDLC used in SBGs comprise liquid crystal (LC), monomers, photoinitiator dyes, and coinitiators. The mixture frequently includes a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka et al. Both filings describe monomer and liquid crystal material combinations suitable for fabricating SBG devices. One of the known attributes of transmission SBGs is that the LC molecules tend to align normal to the grating fringe planes. The effect of the LC molecule alignment is that transmission SBGs efficiently diffract P polarized light (i.e., light with the polarization vector in the plane of incidence) but have nearly zero diffraction efficiency for S polarized light (i.e., light with the polarization vector normal to the plane of incidence. Transmission SBGs may not be used at near-grazing incidence as the diffraction efficiency of any grating for P polarization falls to zero when the included angle between the incident and reflected light is small.

Waveguide Displays

In accordance with various embodiments waveguide displays may take on a variety of configurations. Illustrated in FIG. 1 there is provided a dual axis expansion waveguide display configuration 100 comprising a light source 101 a microdisplay panel 102 and an input image node (IIN) 103 optically coupled to a waveguide 104. In such embodiments, the waveguide may comprise two grating layers 104A, 104B. In some embodiments, the waveguide is formed by sandwiched the grating layers between glass or plastic substrates to form a stack within which total internal reflection occurs at the outer substrate and air interfaces. The stack may further comprise additional layers such as beam splitting coatings and environmental protection layers. Each grating layer may contain an input grating 105A, 105B, a fold grating exit pupil expander 106A, 106B and an output grating 107A, 107B where characters A and B refer to waveguide layers 104A, 104B respectively. The input grating, fold grating and the output grating are holographic gratings, such as a switchable or non-switchable SBG. As used herein, the term grating may encompass a grating comprised of a set of gratings in some embodiments. In general, the IIN 103 integrates a microdisplay panel 102, light source 101 and optical components needed to illuminate the display panel, separate the reflected light and collimate it into the required FOV. The IIN 103 projects the image displayed on the microdisplay panel such that each display pixel is converted into a unique angular direction within the substrate waveguide according to some embodiments. In the embodiment of FIG. 1 and in the embodiments to be described below at least one of the input fold and output gratings may be electrically switchable. In many embodiments, all three grating types are passive, that is, non-switching. The collimation optics contained in the IIN 103 may comprise lens and mirrors which is some embodiments may be diffractive lenses and mirrors.

In some embodiments, the IIN may be based on the embodiments and teachings disclosed in U.S. patent application Ser. No. 13/869,866 entitled HOLOGRAPHIC WIDE ANGLE DISPLAY, and U.S. patent application Ser. No. 13/844,456 entitled TRANSPARENT WAVEGUIDE DISPLAY, the disclosures of which are incorporated herein by reference. In some embodiments, the IIN contains beamsplitter for directing light onto the microdisplay and transmitting the reflected light towards the waveguide. In one embodiment, the beamsplitter is a grating recorded in HPDLC and uses the intrinsic polarization selectivity of such gratings to separate the light illuminating the display and the image modulated light reflected off the display. In some embodiments, the beam splitter is a polarizing beam splitter cube. In some embodiment, the IIN incorporates a despeckler. Advantageously, the despeckler may be a holographic waveguide device based on the embodiments and teachings of U.S. Pat. No. 8,565,560 entitled LASER ILLUMINATION DEVICE, the disclosure of which is incorporated herein.

The light source can be a laser or LED and can include one or more lenses for modifying the illumination beam angular characteristics. The image source can be a microdisplay or laser based display. LED will provide better uniformity than laser. If laser illumination is used there is a risk of illumination banding occurring at the waveguide output. In some embodiments laser illumination banding in waveguides can be overcome using the techniques and teachings disclosed in U.S. Provisional patent Application No. 62/071,277 entitled METHOD AND OPTICAL DISPLAY FOR GENERATING INPUT IMAGES FOR HOLOGRAPHIC WAVEGUIDE DISPLAYS, the disclosure of which is incorporated herein. In some embodiments, the light from the light source 101 is polarized. In one or more embodiments, the image source is a liquid crystal display (LCD) micro display or liquid crystal on silicon (LCoS) micro display.

The light path from the source to the waveguide via the IIN is indicated by rays 1000-1003. The input grating of each grating layer couples a portion of the light into a TIR path in the waveguide once such path being represented by the rays 1004-1005. The output waveguides 107A, 107C diffract light out of the waveguide into angular ranges of collimated light 1006,1007 respectively for viewing by the eye 108. The angular ranges, which correspond to the field of view of the display, are defined solely by the IIN optics. In some embodiments, the waveguide gratings may encoded optical power for adjusting the collimation of the output. In some embodiments, the output image is at infinity. In some embodiments, the output image may be formed at distances of several meters from the eye box. Typically, the eye is positioned within the exit pupil or eye box of the display.

In some embodiments, similar to the one shown in FIG. 1 each grating layer addresses half the total field of view. Typically, the fold gratings are clocked (that is, tilted in the waveguide plane) at 45° to ensure adequate angular bandwidth for the folded light. However, some embodiments of the invention may use other clock angles to satisfy spatial constraints on the positioning of the gratings that may arise in the ergonomic design of the display. In some embodiments, at least one of the input and output gratings have rolled k-vectors. The K-vector is a vector aligned normal to the grating planes (or fringes) which determines the optical efficiency for a given range of input and diffracted angles. Rolling the K-vectors allows the angular bandwidth of the grating to be expanded without the need to increase the waveguide thickness.

In some embodiments, the fold grating angular bandwidth can be enhanced by designing the grating prescription provides dual interaction of the guided light with the grating. Exemplary embodiments of dual interaction fold gratings are disclosed in U.S. patent application Ser. No. 14/620,969 entitled WAVEGUIDE GRATING DEVICE, the disclosure of which is incorporated herein.

In some embodiments, at least one of the input, fold or output gratings may combine two or more angular diffraction prescriptions to expand the angular bandwidth. Similarly, in some embodiments at least one of the input, fold or output gratings may combine two or more spectral diffraction prescriptions to expand the spectral bandwidth. For example, a color multiplexed grating may be used to diffract two or more of the primary colors.

Figure 2:
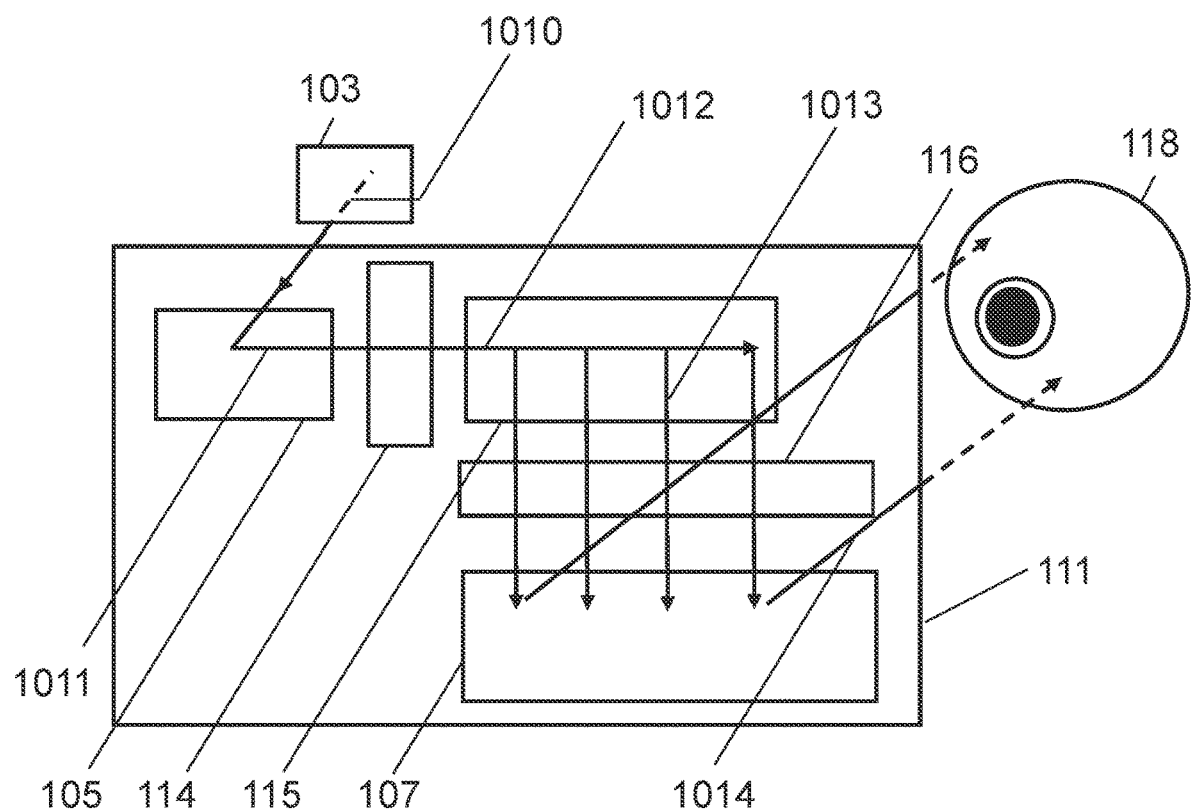
FIG. 2 is a schematic plan view of a waveguide display shown the disposition of the gratings in one grating layer in one embodiment.

FIG. 2 is a plan view of a single grating layer similar to the ones used in FIG. 1. The grating layer 111, which is optically coupled to the IIN 103, comprises input grating 105, a first beamsplitter 114, a fold grating 115, a second beamsplitter 116 and an output grating 107. The beamsplitter are partially transmitting coatings which homogenize the wave guided light by providing multiple reflection paths within the waveguide. Each beamsplitter may comprise more than one coating layer with each coating layer being applied to a transparent substrate. Typical beam paths from the IIN up to the eye 118 are indicated by the rays 1010-1014.

Figure 3:
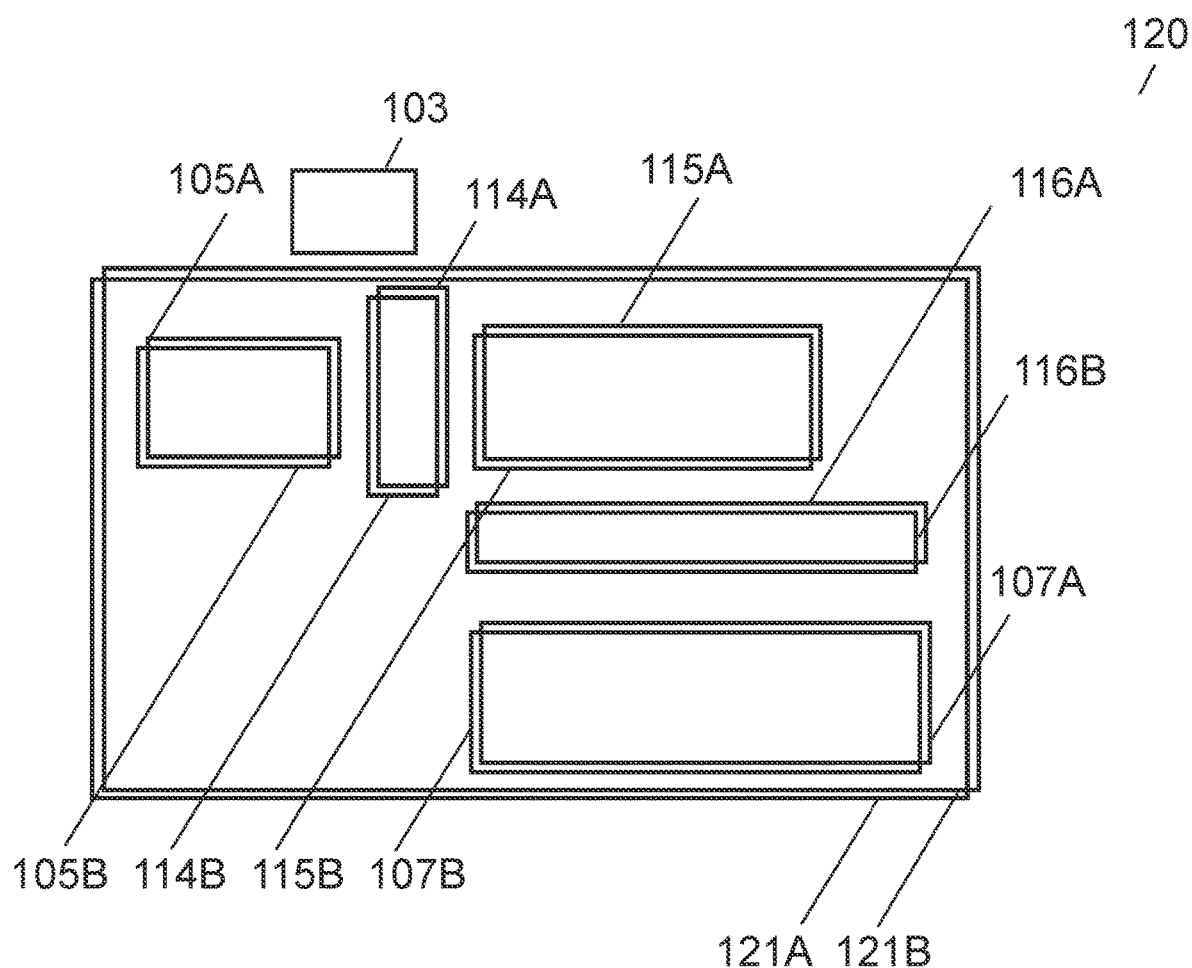
FIG. 3 is a schematic plan view of a waveguide display shown the disposition of the gratings in two grating layers in one embodiment.

By using the fold grating, the waveguide display may use fewer layers than previous systems and methods of displaying information according to some embodiments. In addition, by using fold grating, light can travel by total internal refection within the waveguide in a single rectangular prism defined by the waveguide outer surfaces while achieving dual pupil expansion. In another embodiment, the input grating, the fold grating and the output grating can be created by interfering two waves of light at an angle within the substrate to create a holographic wave front, thereby creating light and dark fringes that are set in the waveguide substrate at a desired angle FIG. 3 illustrates a plan view of a two grating layer configuration similar to the ones used in FIG. 1. The grating layers 121A, 121B which are optically coupled to the IIN 103 comprise input gratings 105A, 105B, first beamsplitters 114A, 114B, fold gratings 115A, 115B, second beamsplitters 116A,116B and output gratings 107A, 107B, where the characters A, B refer to the first and second grating layers and the gratings and beams splitters of the two layers substantially overlap.

In many waveguide configurations, the input, fold, and output gratings are formed in a single layer sandwiched by transparent substrates. FIG. 1 illustrates such stacking in reference to items 104A and 104B. In some embodiments, the waveguide may comprise just one grating layer. In some embodiments, the cell substrates may be fabricated from glass. An exemplary glass substrate is standard Corning Willow glass substrate (index 1.51) which is available in thicknesses down to 50 micron. In other embodiments the cell substrates may be optical plastics.

In some embodiments, the grating layer may be broken up into separate layers. For example, in some embodiments, a first layer includes the fold grating while a second layer includes the output grating. In some embodiments, a third layer can include the input grating. The number of layers may then be laminated together into a single waveguide substrate. In some embodiments, the grating layer is comprised of a number of pieces including the input coupler, the fold grating and the output grating (or portions thereof) that are laminated together to form a single substrate waveguide. The pieces may be separated by optical glue or other transparent material of refractive index matching that of the pieces.

Some embodiments may comprise a grating layer be formed via a cell making process by creating cells of the desired grating thickness and vacuum filling each cell with SBG material for each of the input coupler, the fold grating and the output grating. In one embodiment, the cell is formed by positioning multiple plates of glass with gaps between the plates of glass that define the desired grating thickness for the input coupler, the fold grating and the output grating. In one embodiment, one cell may be made with multiple apertures such that the separate apertures are filled with different pockets of SBG material. Any intervening spaces may then be separated by a separating material (e.g., glue, oil, etc.) to define separate areas.

In other embodiments, the SBG material may be spin-coated onto a substrate and then covered by a second substrate after curing of the material. In some embodiments, the grating in a given layer is recorded in stepwise fashion by scanning or stepping the recording laser beams across the grating area. In many embodiments the gratings may be recorded using mastering and contact copying process currently used in the holographic printing industry.

Figure 4:
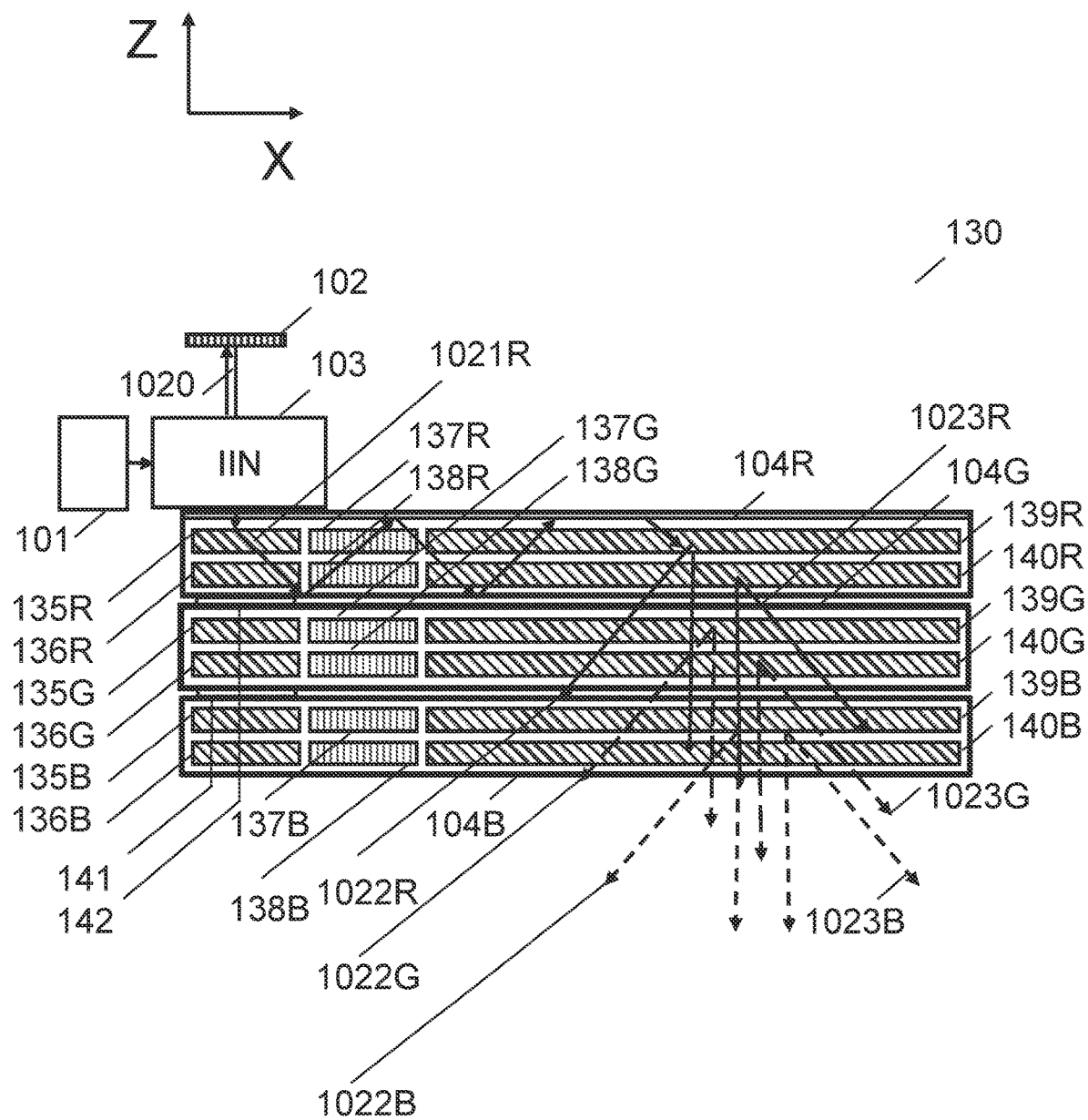
FIG. 4 is a schematic cross section view of a color waveguide display using one waveguide per color and two grating layers in each waveguide in one embodiment.

The embodiment illustrated in FIG. 1 represents a monochrome waveguide display. As an improvement one may utilize a stack of monochrome waveguides to derive a color display as illustrated in FIG. 4. FIG. 4 illustrates a dual axis expansion waveguide display 130 comprising a light source 101 a microdisplay panel 102 and an input image node (IIN) 103 optically coupled to red, green and blue waveguides 104R, 104G, 104B, which each comprise two grating layers. In order that wave guiding can take place in each waveguide the three waveguides are separated by air gaps. In some embodiments, the waveguides are separated by a low index material such as a nanoporous film. The red grating layer labelled by R contains an input grating 135R, 136R, a fold grating exit pupil expander 137R, 138R and an output grating 139R, 140R. The grating elements of the blue and green waveguides are labeled using the same numerals with B and G designating blue and green. Since the light paths through the IIN and waveguides in each of the red green and blue waveguides are similar to those illustrated in FIG. 1 they are nots shown in FIG. 4. In some embodiments, the input, fold and output gratings are all passive, that is non-switching. In some embodiments, at least one of the gratings is switching. In some embodiments, the input gratings in each layer are switchable to avoid color crosstalk between the waveguide layers. In some embodiments color crosstalk is avoided by disposing dichroic filters 141,142 between the input grating regions of the red and blue and the blue and green waveguides.

Figure 5:
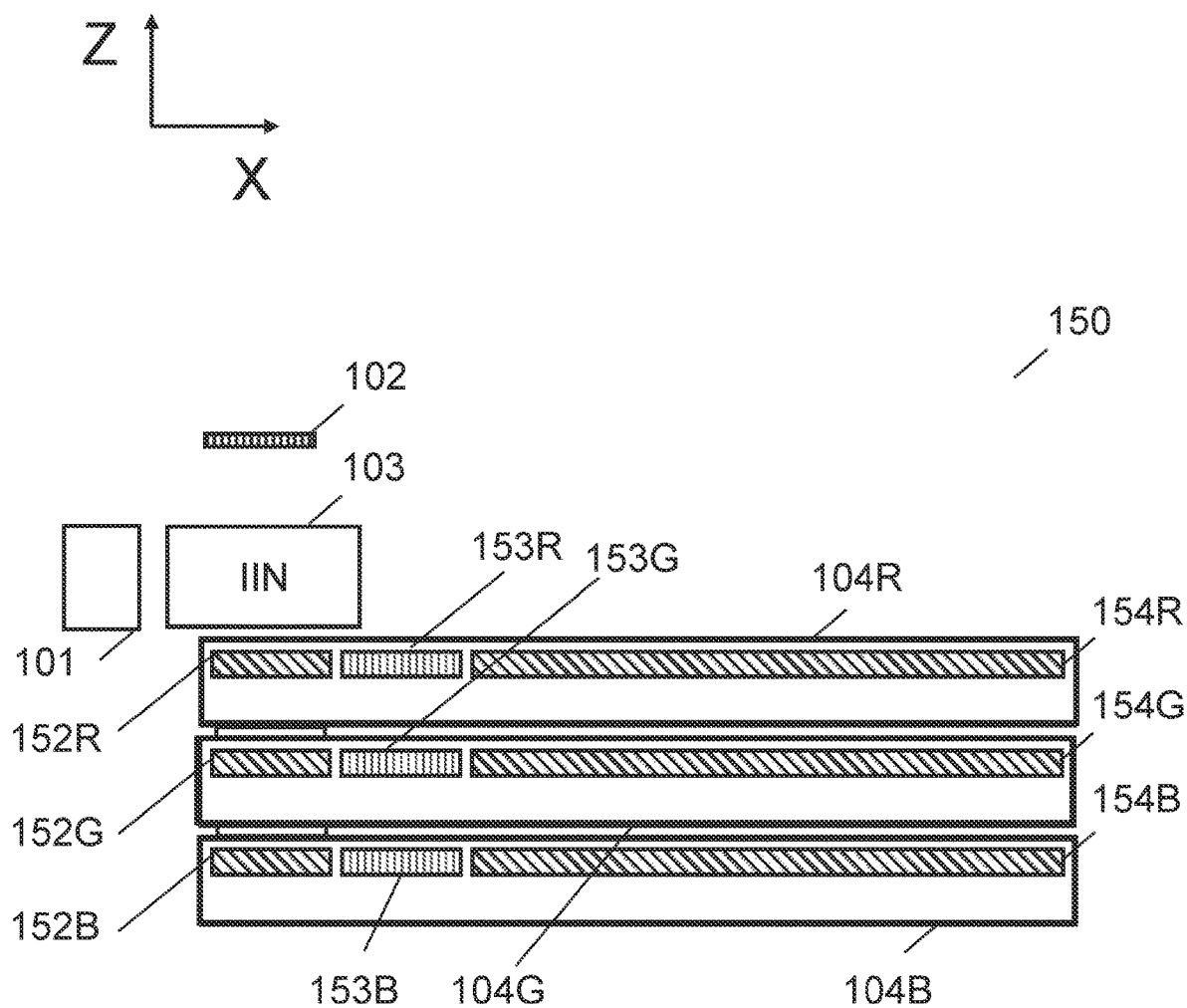
FIG. 5 is a schematic cross section view of a color waveguide display using one waveguide per color and one grating layer in each waveguide in one embodiment.

In some embodiments, a color waveguide may use just one grating layer in each monochromatic waveguide, as illustrated in FIG. 5. The embodiment illustrated in FIG. 5 represents a similar configuration as that shown in FIG. 4 with each of the red, green, and blue waveguides (104R, 104G, and 104B) comprising only a single grating layer. Each grating layer having an input grating (152R, 152G, and 152B), a fold grating (153R, 153G, 153B), and an output grating (154R, 154G, 154B) for each of the respective red, green, and blue layers.

Figure 6:
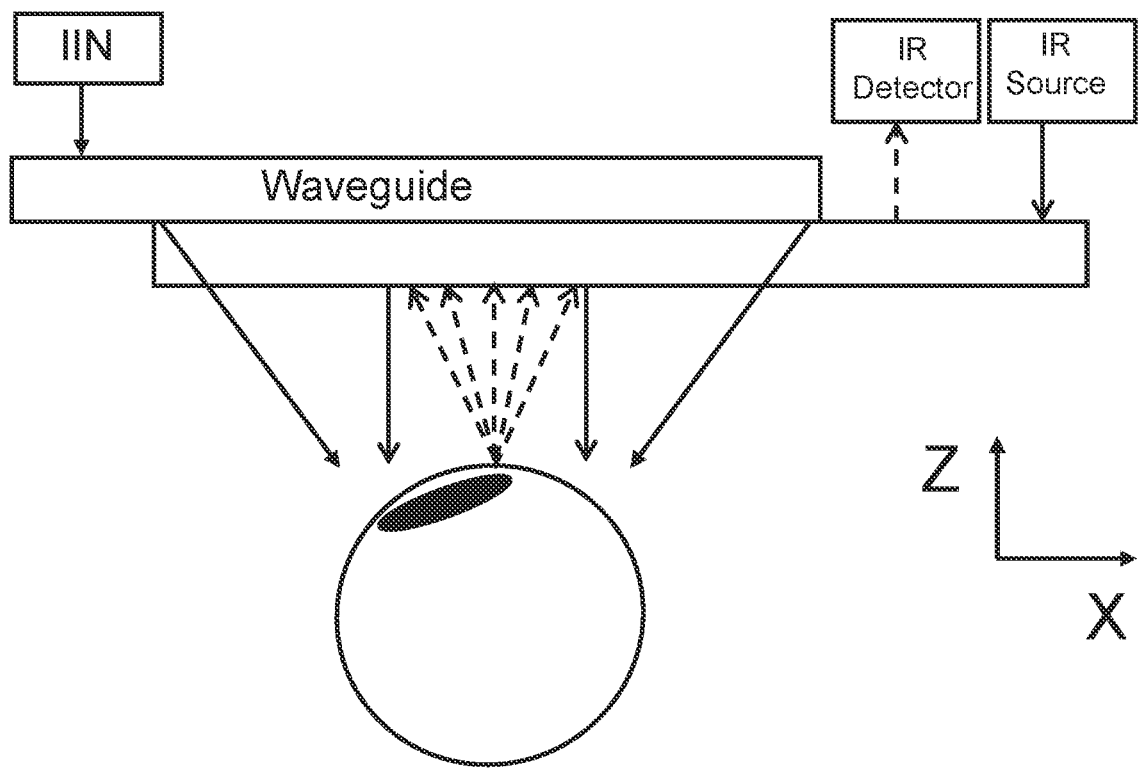
FIG. 6 is a cross section view of an eye tracked near eye display according to the principles of the invention in one embodiment.
Figure 7:
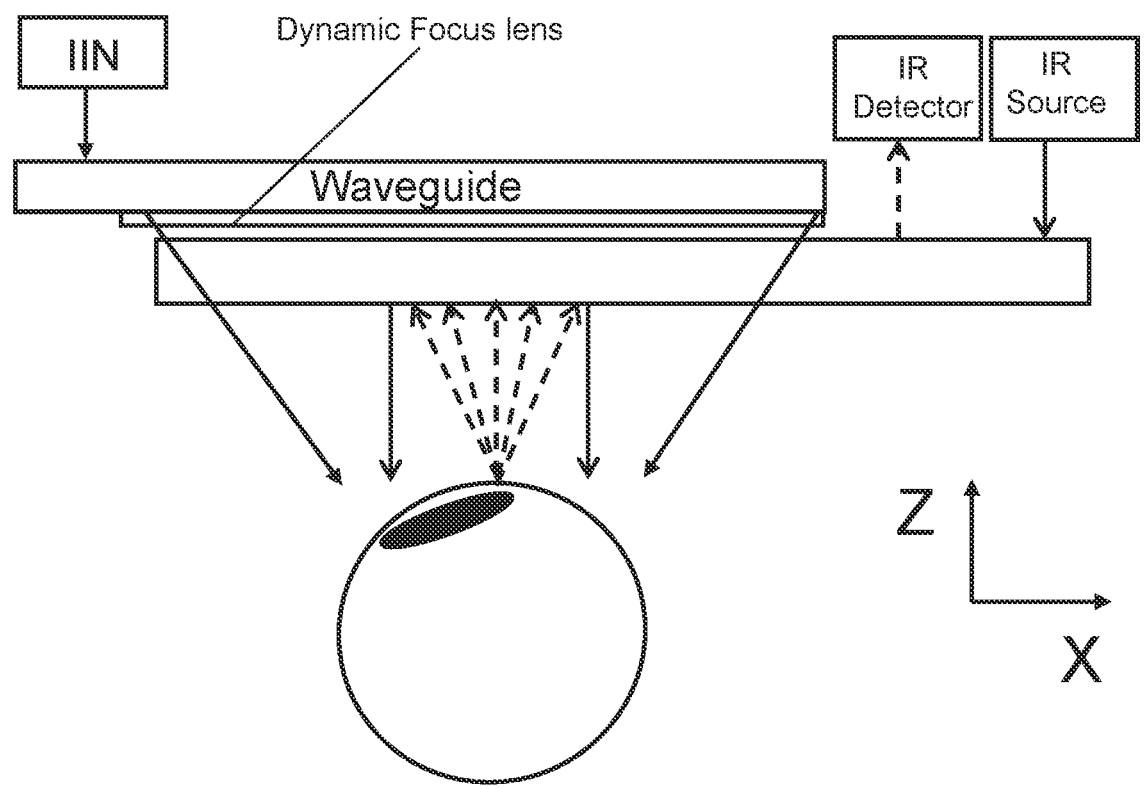
FIG. 7 is a cross section view of an eye tracked near eye display incorporating a dynamic focus lens in one embodiment.
Figure 8:
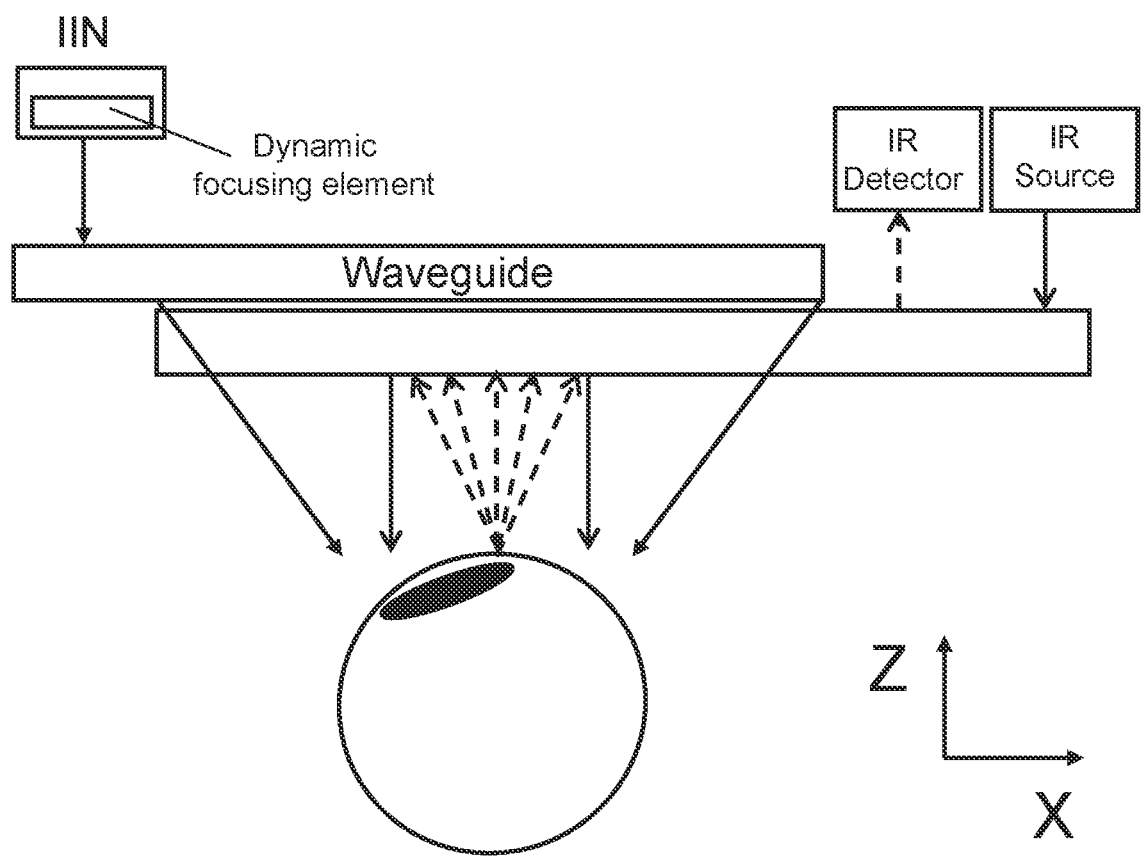
FIG. 8 is a cross section view of an eye tracked near eye display incorporating a dynamic focus lens in one embodiment.

Some embodiments of the waveguide may include an eye tracker. One such embodiment is illustrated in FIGS. 6, 7, and 8. The teachings of the various embodiments of the eye tracker configuration may be further illustrated in PCT/GB2014/000197 entitled HOLOGRAPHIC WAVEGUIDE EYE TRACKER, PCT/GB2015/000274 entitled HOLOGRAPHIC WAVEGUIDE OPTICALTRACKER, PCT Application No.: GB2013/000210 entitled OPTICAL DISPLAY FOR EYE TRACKING, U.S. Provisional Patent Application No. 62/176,572 entitled ELECTRICALLY FOCUS TUNABLE LENS, and U.S. Provisional Patent Application No. 62/125,089 entitled HOLOGRAPHIC WAVEGUIDE LIGHT FIELD DISPLAYS, the disclosures of each of which are incorporated herein by reference. Some embodiments may additionally comprise a dynamic focus lens as illustrated in FIG. 7 the effect of which is to provide a multiplicity of image surfaces.

In various embodiments of the invention the IIN is optically matched to the waveguide. Waveguides raise optical interfacing issues that are not encountered in conventional optical systems in particular matching the input image angular content to the angular capacity of the waveguide and input grating. The optical design challenge is to match the IIN aperture variation as a function of field angle to the rolled K-vector input grating diffraction direction. In various embodiments the waveguide is designed to make the waveguide thickness as small as possible while maximizing the spread of field angles at any given point on the input grating, subject to the limits imposed by the angular bandwidth of the input grating, and the angular carrying capacity of the waveguide.

It should be appreciated that coupling collimated angular image content over the full field of view and without significant non-uniformity of the illumination distribution across the pupil requires a Numerical Aperture (NA) variation ranging from high NA on one side of the microdisplay falling smoothly to a low NA at the other side. NA is defined as being proportional to the sine of the maximum angle of the image ray cone from a point on the microdisplay surface with respect to an axis normal to the microdisplay. Other equivalent measures may be used for the purposes of determining the most optimal IIN to waveguide coupling. Controlling the NA in this way will ensure high optical efficiency and reduced banding and other illumination non-homogeneities in the case of LED-illuminated displays. Laser-illuminated displays will also benefit from the control of NA variation across the microdisplay particular with regard to homogeneity.

Figure 9:
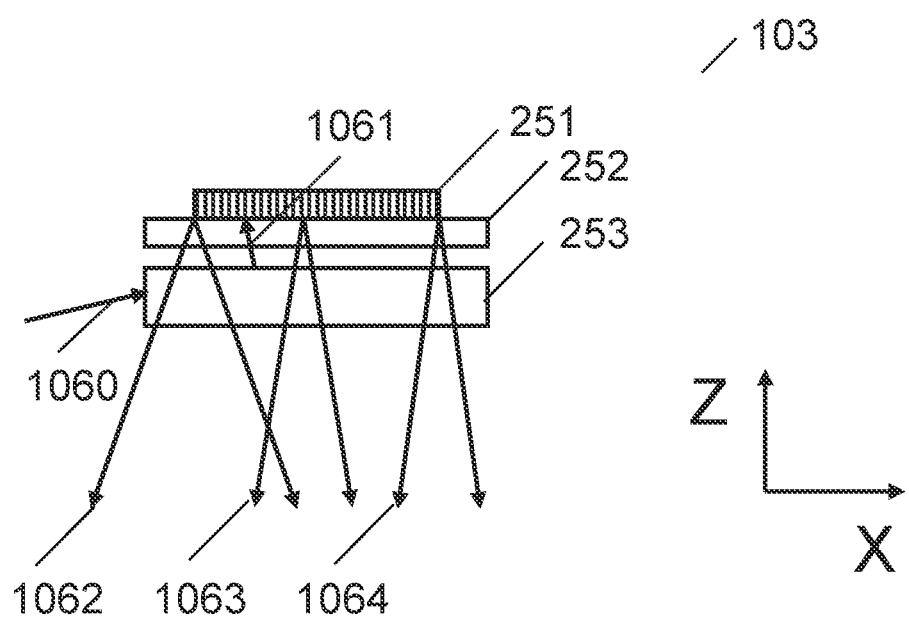
FIG. 9 is a schematic cross section view of a reflective microdisplay input image node containing a spatially-varying numerical aperture component in one embodiment.

In many embodiments, as illustrated, in FIG. 9 the IIN 103 comprises a microdisplay panel 251 a spatially-varying NA component 252 and microdisplay optics 253. The microdisplay optics accepts light 1060 from an illumination source which is not illustrated and deflects the light on to the microdisplay in the direction indicated by the ray 1061. The light reflected from the microdisplay is indicated by the divergent ray pairs 1062-1064 with NA angles varying along the X axis.

Although a particular configuration of the IIN 103 is illustrated in FIG. 9, it should be understood that a variety of configurations may be used to ensure the most efficient image quality is produced. By way of example the spatially-varying NA component may be located adjacent to the output surface. Additionally, the microdisplay may function as a reflective device, as illustrated in FIG. 9, or may function as a transmission or emissive device.

Furthermore, the spatially-varying NA component may take on a variety of configurations having a uniformly varying NA characteristic. Various exemplary embodiments are illustrated in FIGS. 10-13. Some embodiments may include a wedge as illustrated in FIG. 10 while others may be variations of such. FIG. 11 illustrates a spatially-varying NA component in a curved wedge format. FIG. 12 illustrates an exemplary embodiment wherein the NA component comprises an array of a plurality of prismatic elements having differing prism angles. Additionally, some NA components may comprise an array of lenses with various apertures and optical powers, as illustrated in FIG. 13.

Figure 14A:
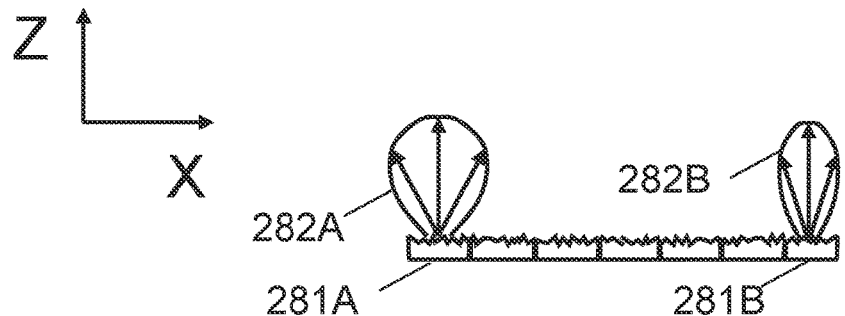
FIG. 14A is a schematic cross section view of a spatially-varying numerical aperture component based on an array of scattering elements in one embodiment.
Figure 14B:
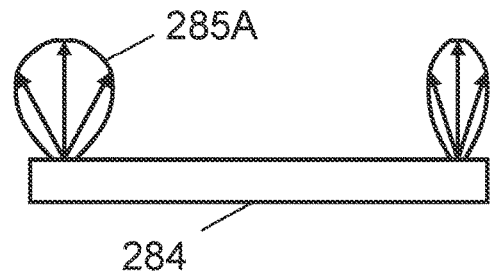
FIG. 14B is a schematic cross section view of a spatially-varying numerical aperture component based on a substrate with a continuously varying scattering function in one embodiment.

In addition to the various profile characteristics illustrated in FIGS. 10-13, spatially-varying NA components may comprise a variety of surface features or internal substrate configurations designed with a variety of scatter elements. FIG. 14A illustrates a spatially-varying NA component having a scatter element integrated with the surface texture. FIG. 14B illustrates a substrate of the spatially-varying NA component having scattering properties as part of the base substrate. Such properties may come from a variety of configurations that may include individual scatter components suspended within the body of the substrate.

Figure 14C:
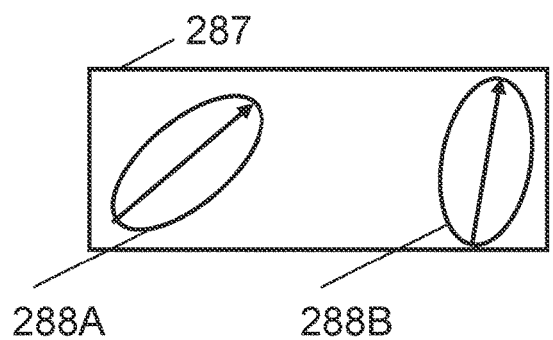
FIG. 14C is a schematic cross section view of a spatially-varying numerical aperture component based on a substrate with a continuously varying birefringence tensor in one embodiment.

In some embodiments, such as the one illustrated in FIG. 14C a spatially-varying NA component 286 comprises a birefringent substrate 287 having a spatially varying birefringence as represented by the uniaxial crystal index functions 288A, 288B. In some embodiments, the substrate provides a continuous variation of birefringence. In some embodiments, the substrates comprise discrete elements each have a unique birefringence. In some embodiments, a spatially-varying NA component is a scattering substrate with birefringent properties. In some embodiments, a spatially-varying NA component is based on any of the embodiments of FIGS. 10-13 implements using a birefringent substrate. In some embodiments, the NA variation across the field is performed using a birefringent layer having comprising a thin substrate coated with a Reactive Mesogen material. Reactive Mesogens are polymerizable liquid crystals comprising liquid crystalline monomers containing, for example, reactive acrylate end groups, which polymerize with one another in the presence of photo-initiators and directional UV light to form a rigid network. The mutual polymerization of the ends of the liquid crystal molecules freezes their orientation into a three-dimensional pattern. Exemplary Reactive Mesogen materials are manufactured by Merck KgaA (Germany).

Figure 14D:
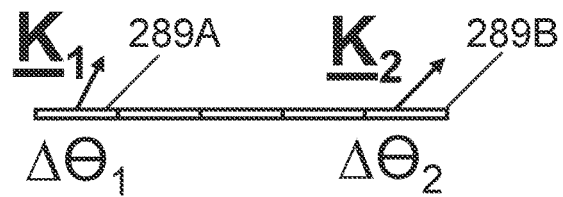
FIG. 14D is a schematic cross section view of a spatially-varying numerical aperture component based on an array of grating elements in one embodiment

In some embodiments, such as the one illustrated in FIG. 14D a spatially-varying NA component 286 comprises an array of diffractive elements each characterized by a unique K-vector and diffraction efficiency angular bandwidth. For example element 289A at one end of the component has k-vector $\underline{K}_1$ and bandwidth $\Delta\theta_1$ configured to provide a high NA while element 289B at the other end has k-vector $\underline{K}_2$ and bandwidth $\Delta\theta_2$ configured to provide a low NA. In some embodiments, the grating characteristics vary continuously across the substrate. In some embodiments, the gratings are Bragg holograms recorded in HPDLC materials. In some embodiments, the gratings are surface relief gratings. In some embodiments, the gratings are computer generated diffractive structures such as computer generated holograms (CGHs).

Figure 15:
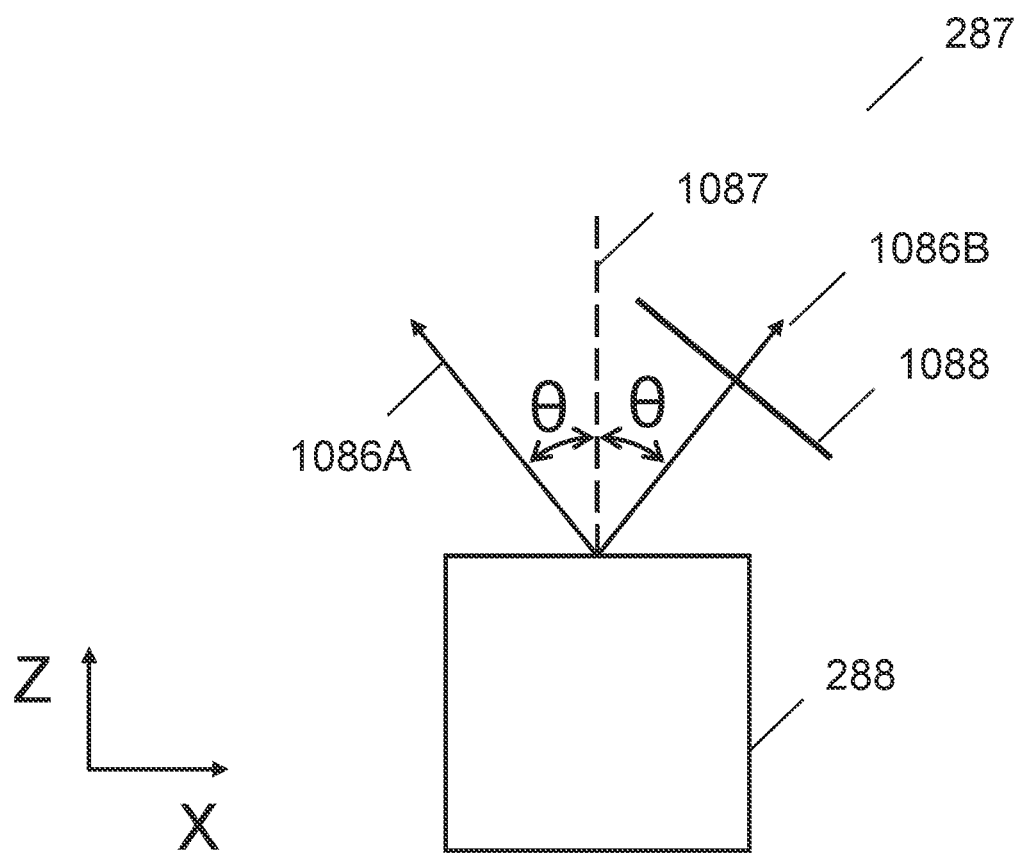
FIG. 15 is a schematic cross section view of an optical arrangement for providing varying numerical aperture across a pupil using a tilted pupil plane in one embodiment.

In some embodiments, the IIN design addresses the NA variation problem, at least in part, by tilting the stop plane such that its normal vector is aligned parallel to the highest horizontal field angle, (rather than parallel to the optical axis). As illustrated in FIG. 15 the IIN 287 is configured to provide an output field of view of half angle θ defined by the limiting rays 1086A, 1086B disposed symmetrical about the optical axis 1087. The stop plane 1088 is normal to the limiting ray 1086B. It is assumed that the waveguide input grating, which is not illustrated, couples the horizontal field of view into the waveguide (not shown).

Although the present application does not assume any particular configuration of the microdisplay optics 253, further embodiments may be further represented in U.S. patent application Ser. No. 13/869,866 entitled HOLOGRAPHIC WIDE ANGLE DISPLAY, and U.S. patent application Ser. No. 13/844,456 entitled TRANSPARENT WAVEGUIDE DISPLAY, the disclosures of which are incorporated herein. In some embodiments, the microdisplay optics contains at least one of a refractive component and curved reflecting surfaces or a diffractive optical element for controlling the numerical aperture of the illumination light. In some embodiments, the microdisplay optics contains spectral filters for controlling the wavelength characteristics of the illumination light. In some embodiments, the microdisplay optics contains apertures, masks, filter, and coatings for controlling stray light. In some embodiments, the microdisplay optics incorporate birdbath optics.

Figure 16A:
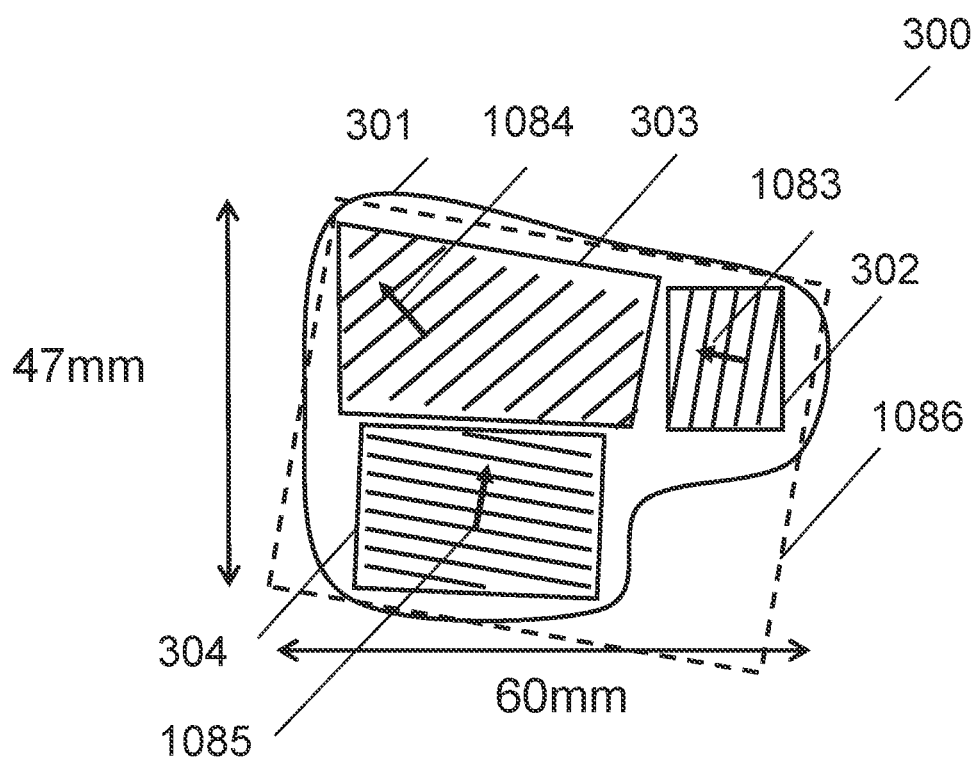
FIG. 16A is a front view of a waveguide component showing the input, fold and output gratings in one embodiment.
Figure 16B:
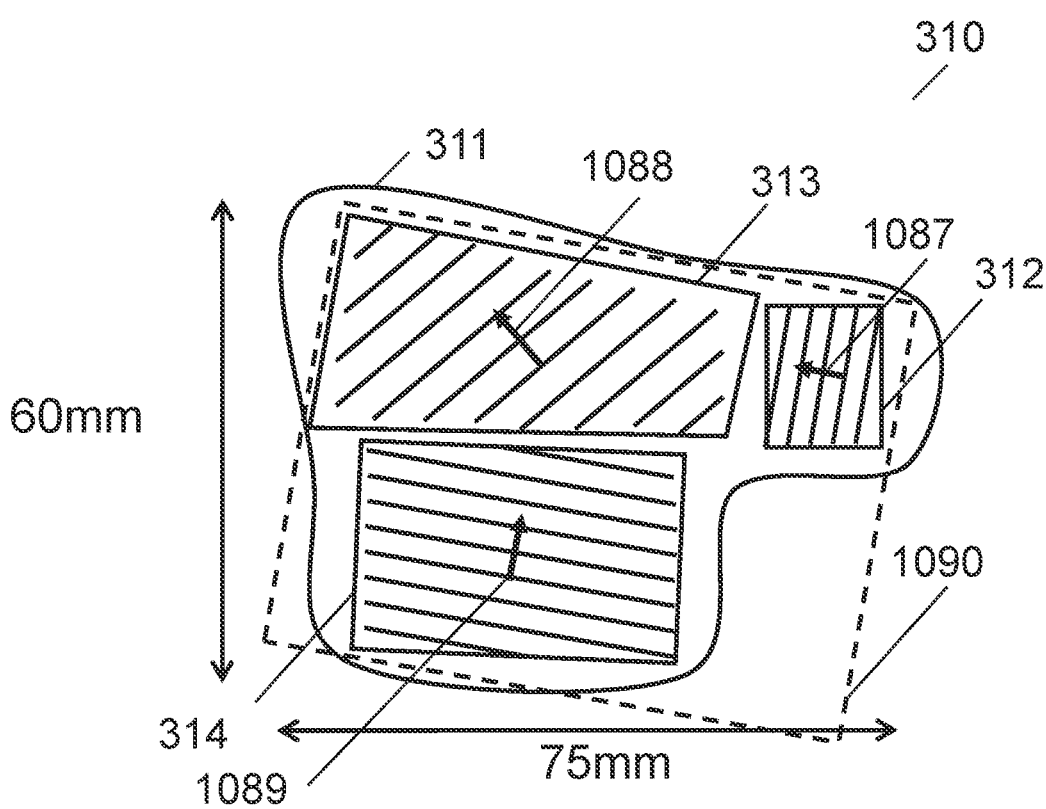
FIG. 16B is a front view of a waveguide component showing the input, fold and output gratings in one embodiment.

FIG. 16 shows schematic front views of two waveguide grating layouts that may be provided by the invention. In the embodiment of FIG. 16A the waveguide 300 comprises a shaped waveguide comprising in a single layer indicted by 1086 an input grating 302, a fold grating 303 and an output grating 304. The K-vectors of the three gratings (that is the normal vector to the fringes shown inside each grating) are indicated by 1083-1084. Note that in each case the K-vector is projected in the plane of the drawings. In the embodiment of FIG. 16B the waveguide 310 comprises a shaped waveguide comprising in a single layer indicted by 1090 an input grating 313, a fold grating 314 and an output grating 315. The K-vectors of the three gratings (that is the normal vector to the fringes shown inside each grating) are indicated by 1087-1089. In each case the K-vector is projected in the plane of the drawings.

Figure 17:
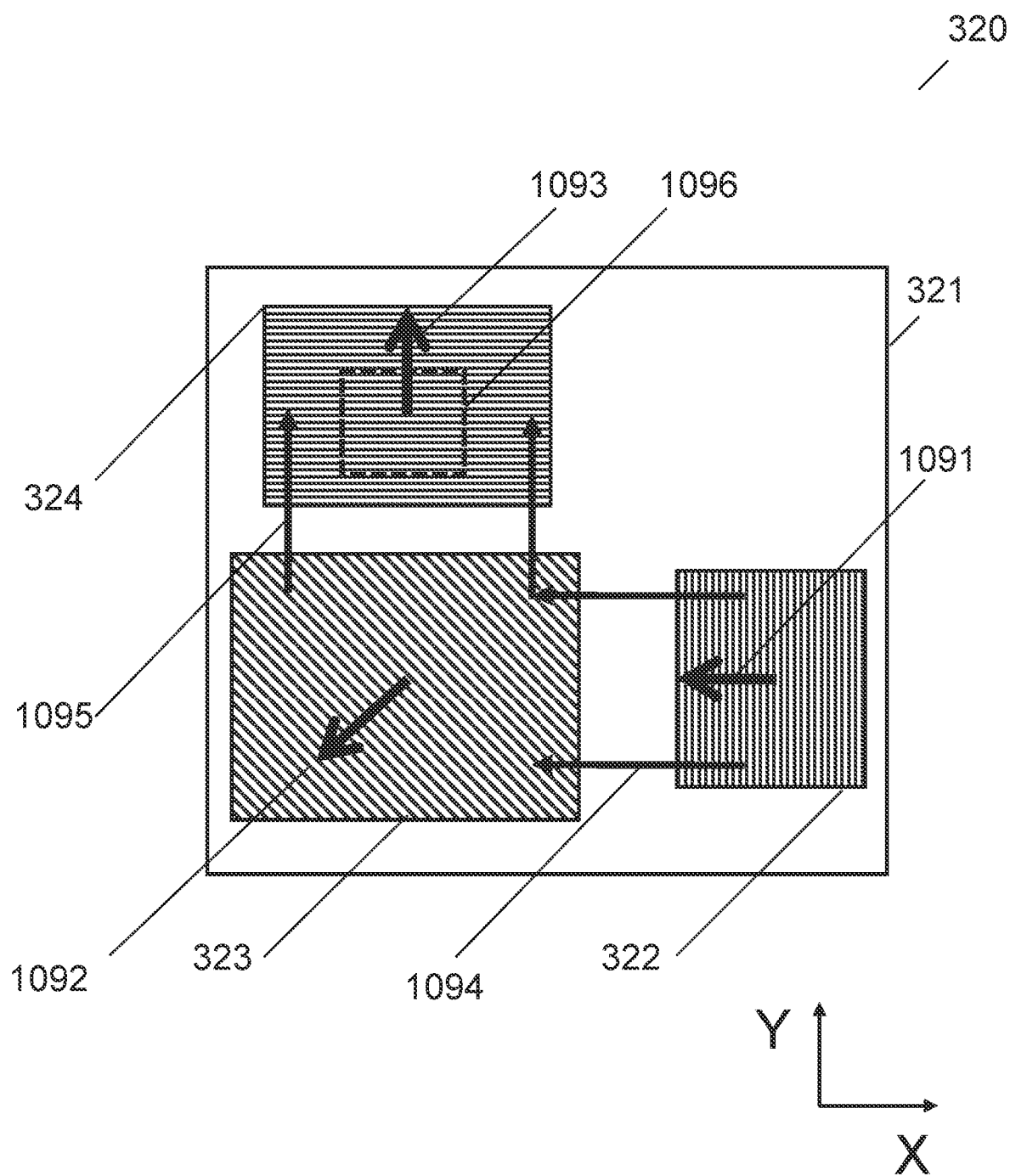
FIG. 17 is a front view of a waveguide component showing the input, fold and output gratings in one embodiment.
Figure 18A:
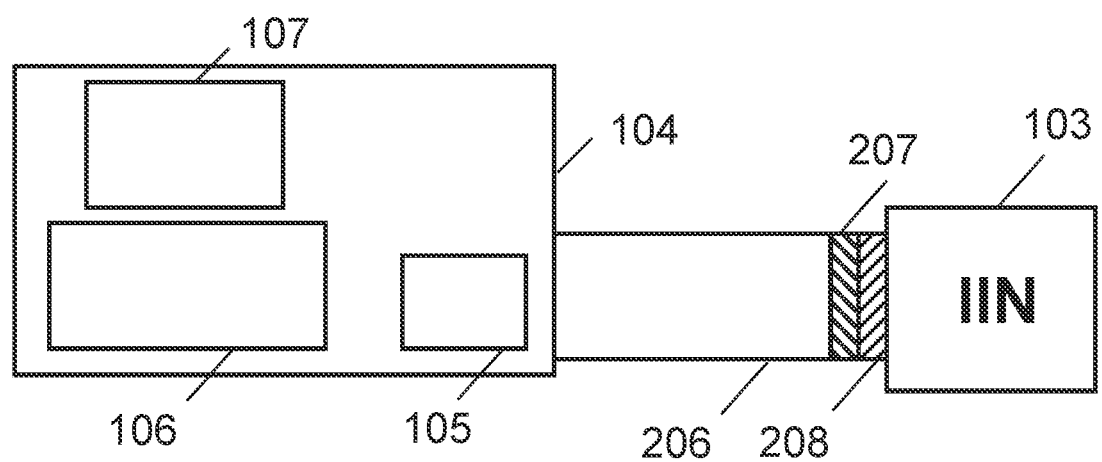
FIG. 18A is a schematic plan view of a first operational state display comprising a waveguide that can be decoupled from the IIN in one embodiment.
Figure 18B:
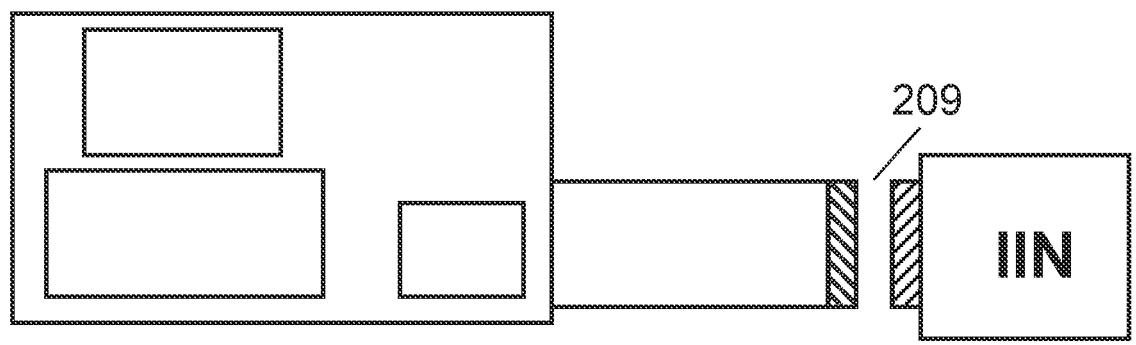
FIG. 18B is a schematic plan view of a second operational state where the waveguide is decoupled from the IIN.
Figure 20A:
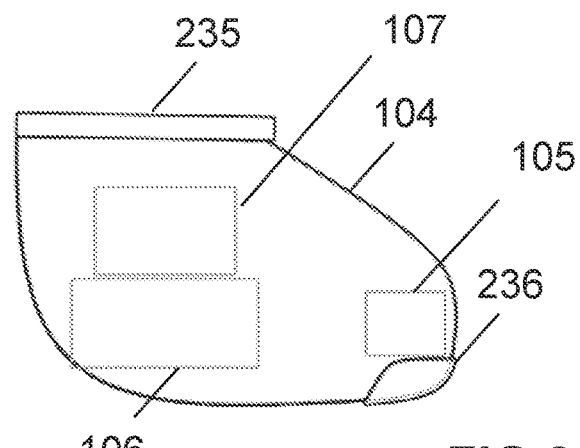
FIG. 20A is a front view of a waveguide display eyepiece in one embodiment.
Figure 20B:
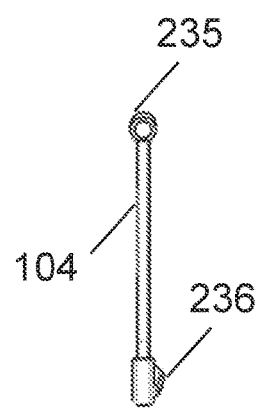
FIG. 20B is a plan view of a waveguide display eyepiece in one embodiment.
Figure 20C:
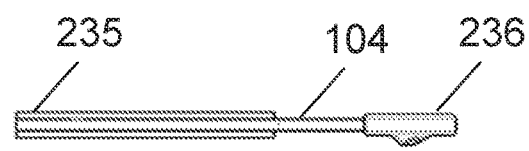
FIG. 20C is a side view of a waveguide display eyepiece in one embodiment.
Figure 20D:
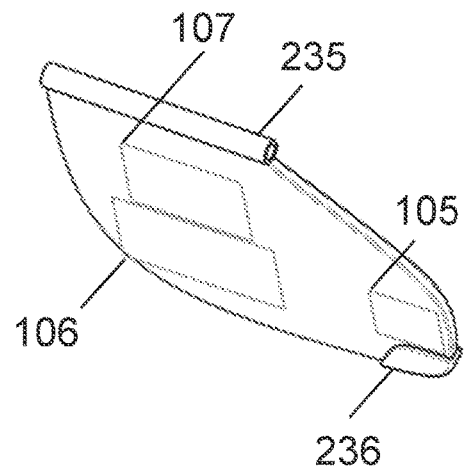
FIG. 20D is a three-dimensional view of a waveguide display eyepiece in one embodiment.

FIG. 17 shows a further general waveguide grating layout that may be provided by the invention. The waveguide 320 comprises a rectangular waveguide comprising in a single layer an input grating 322, a fold grating 323 and an output grating 324. The K-vectors of the three gratings (that is the normal vector to the fringes shown inside each grating) are indicated by 1091-1093. In each case the K-vector is projected in the plane of the drawings. The fold grating in this case has Bragg fringes aligned at 45 degrees in the plane of the grating Embodiments of Wearable HUDs Turning now to FIGS. 18A and 18B. In many embodiments, the waveguide display is coupled to the IIN 103 by an opto-mechanical interface thereby allowing the waveguide to be easily retracted from the IIN assembly. The basic principle is illustrated in FIG. 18A which shows a dual axis expansion waveguide display 200 comprising the waveguide 201 containing the input grating 105, fold grating 106 and output grating 107 and the IIN 103. The optical display further comprises an optical link 206 connected to the waveguide, a first optical interface 207 terminating the optical link and a second optical interface 208 forming the exit optical port of the IIN. The first and second optical interfaces can be decoupled as indicated by the gap 209 illustrated in FIG. 18B. In some embodiments the optical link may be a waveguide itself optically designed to work with the main waveguide display 104. In some embodiments, the optical link is curved. In some embodiments, the optical link is a GRIN image relay device. In many embodiments, the optical connection is established using a mechanical mechanism. In some embodiments, the optical connection is established using a magnetic mechanism. The advantage of decoupling the waveguide from the IIN in helmet mounted display applications is that the near eye portion of the display be removed when not in used. In some embodiments where the waveguide comprises passive gratings the near eye optics can be disposable As discussed above, in some embodiments such as the one illustrated in FIGS. 18A-19C the waveguide display is coupled to the IIN by an opto-mechanical interface that allows the waveguide to be easily retracted from the IIN assembly. FIG. 19A shows a removable near eye display 290 comprising a near eye waveguide component 291 and an IIN 103. The waveguide component includes an opto-mechanical interface 292 configured to optically match the IIN and removably connect to the opto-mechanical interface of the IIN 294. The waveguide component 291 can have at least two configurations with respect to the IIN. As illustrated by FIG. 19A the waveguide component 291 is in a removed or retracted configuration. The waveguide is shown retracted from the IIN assembly. FIG. 19B shows a second 3D view of the HMD 296 with the waveguide component retracted. FIG. 19C illustrates a connected position of the waveguide component 291 wherein the component is opto-mechanically connected to the IIN 103.

FIG. 20A-21B illustrate an exemplary embodiment of a waveguide display that may be integrated into a helmet. FIGS. 20A-20D illustrate front, plan, side, and three-dimensional views of one eyepiece of a dual axis expansion display that may be used in a helmet mount display. One such embodiment may be in a motorcycle helmet. The display comprises the waveguide 104, input grating 105, fold grating 106, output grating 107; which were previously described in more detail. Additionally, the waveguide display of FIGS. 20A-20D may include a hinge mechanism 235 for attaching the display to the helmet and the waveguide coupling mechanism 236 configured to opto-mechanically couple to the IIN assembly.

FIG. 21A and FIG. 21B show a frontal view and a side view of a HUD eyepiece integrated in a helmet. Although a particular helmet configuration is shown it should be understood that any acceptable configuration may be implemented.

Figure 22:
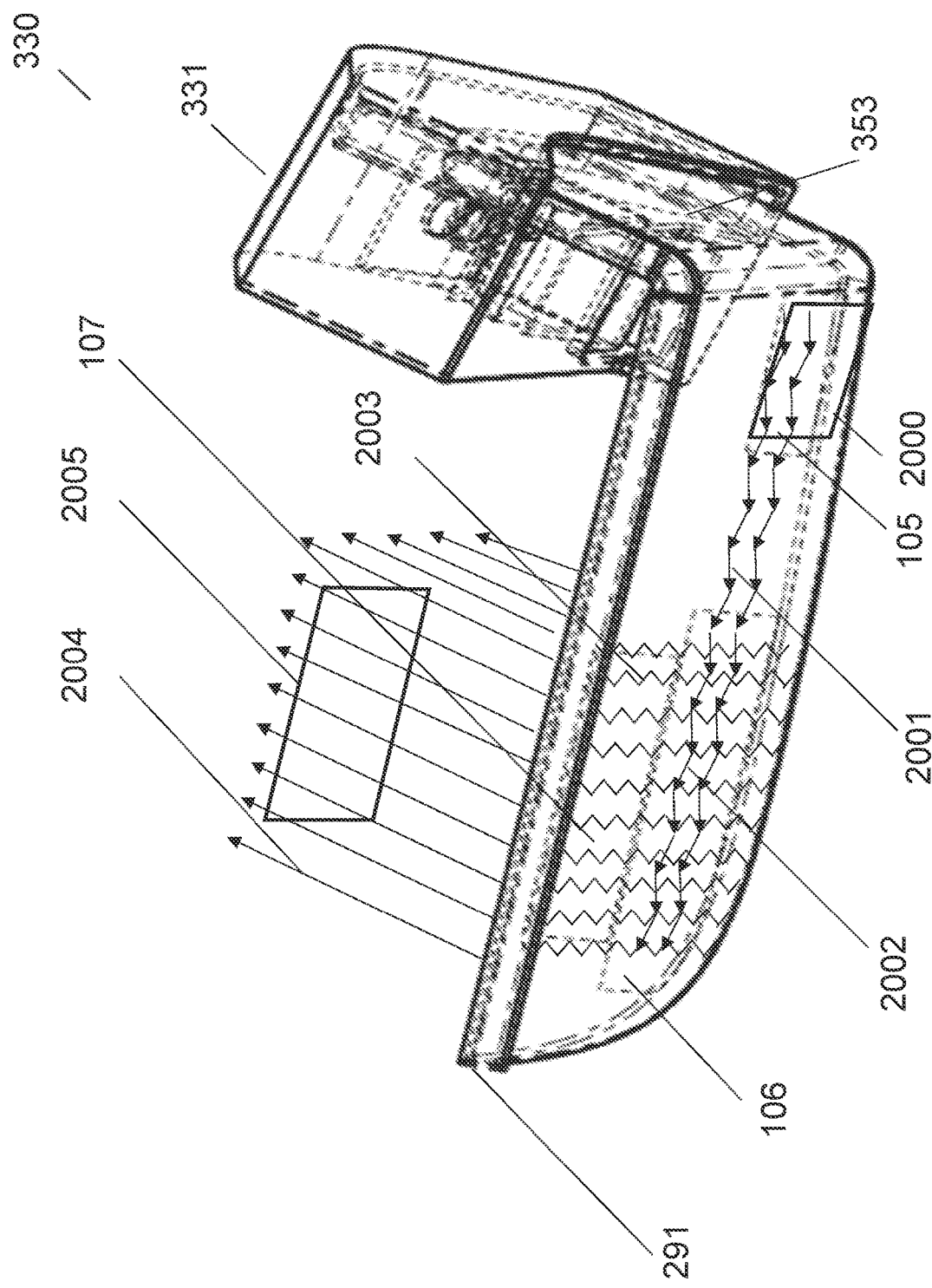
FIG. 22 is a three-dimensional view of a near eye display showing a ray trace from the IIN and waveguide component up to the eye box in one embodiment.

Turning now to FIG. 22, an exemplary embodiment of a HUD 330 waveguide display is thus illustrated. FIG. 22 illustrates a waveguide display in the form of a near eye display. The near eye display comprises an IIN assembly 331 and a waveguide component 291 opto-mechanically coupled to the IIN assembly 331. The waveguide component further comprises an input grating 105 a fold grating 106 and an output grating 107. Although not shown here the waveguide component is further configured with an opto-mechanical interface 353 for coupling the waveguide to the INN assembly 331. The waveguide path from entrance pupil 2000 through the input grating, fold grating and output grating and up to the eye box 2005 is represented by the rays 2001-2004.

Figure 23B:
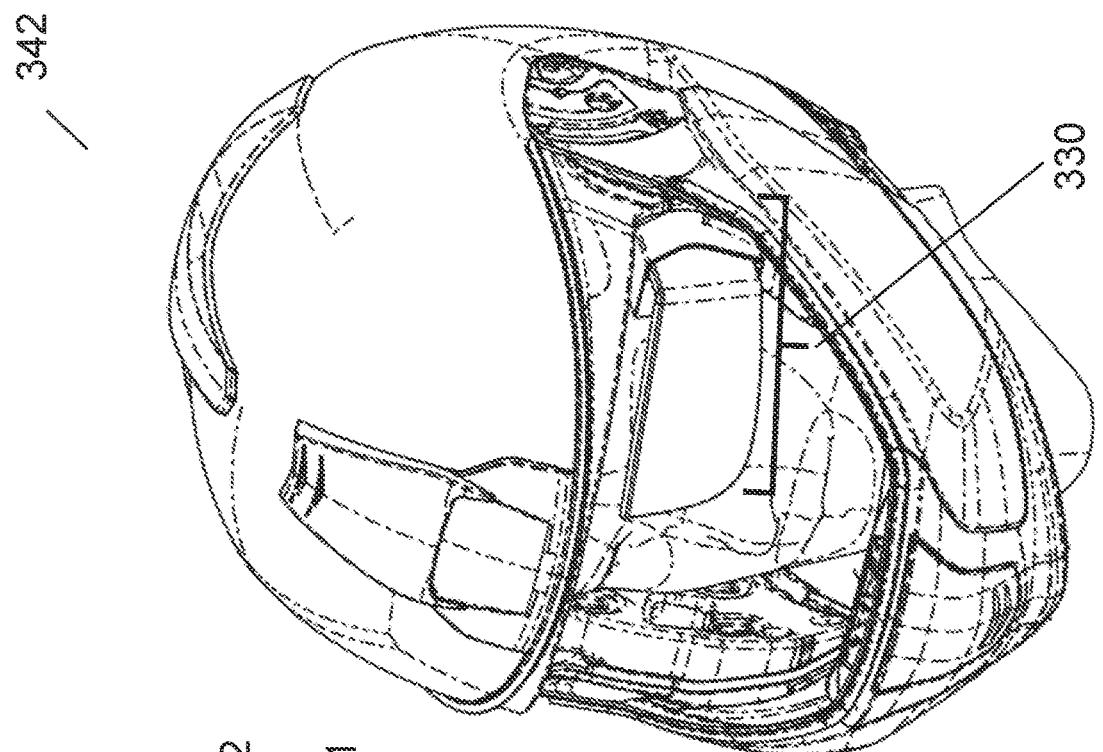
FIG. 23B is a three-dimensional view of a second operational state of a motorcycle display in one embodiment.
Figure 23A:
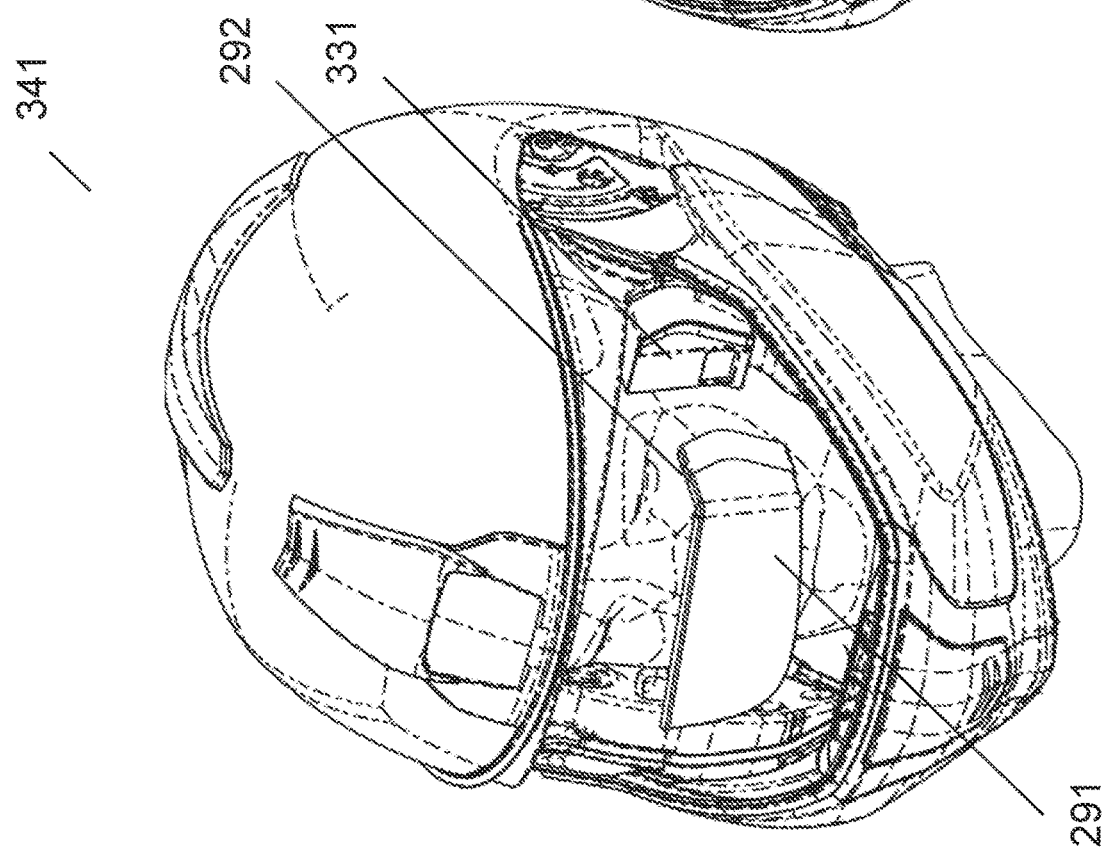
FIG. 23A is a three-dimensional view of a first operational state of a motorcycle display in one embodiment.

FIGS. 23A and 23B provide illustrations of various operational positions according to the invention whereby the HUD 330, as illustrated in FIGS. 22 and 19A-19C, is provided as a HMD integrated in a helmet. In such an embodiment the IIN assembly 331 may form part of the helmet or may be added aftermarket. Similar to FIGS. 19A and 19B, FIG. 23A illustrates a HUD display 330 in a first operational state 341 in which the waveguide component 291 is fully retracted from the IIN assembly 331. Similarly, FIG. 23B illustrates the display in a second operational state 342 with the waveguide component 291 coupled to the IIN assembly.

Figures 24, 25:
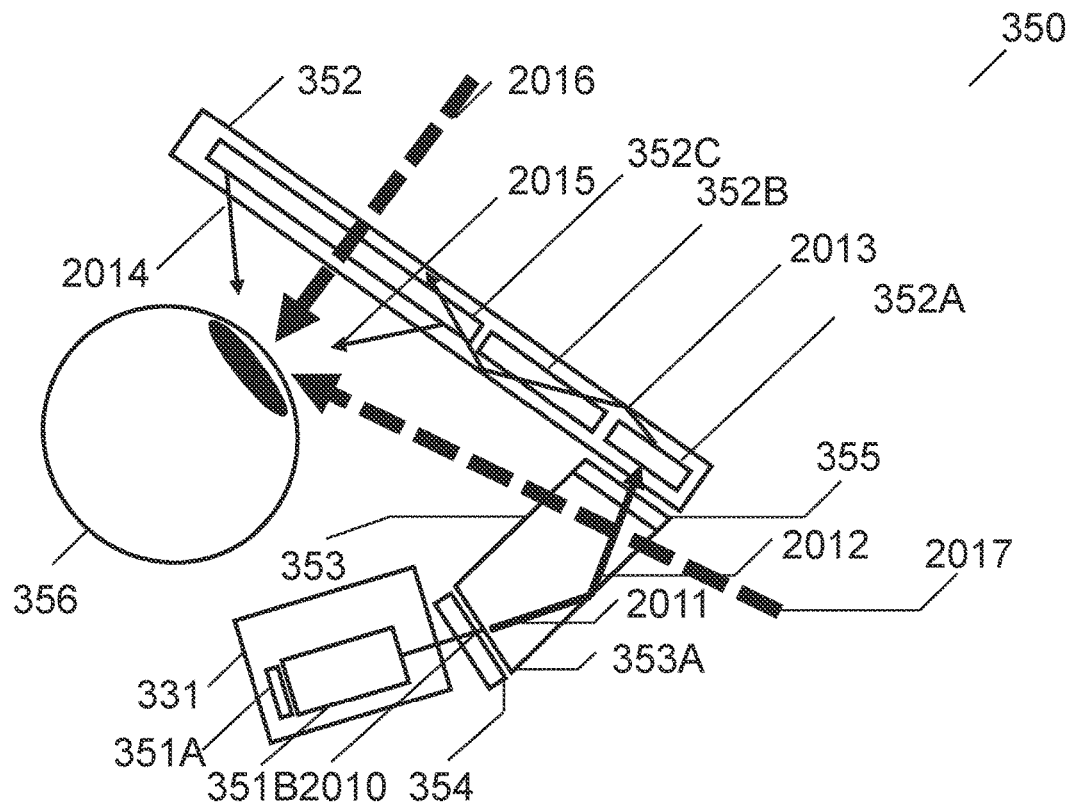
FIG. 24 is a schematic plan view of a transparent wearable display including prismatic relay optics for providing enhance peripheral external field of view in one embodiment.
FIG. 25 is a table providing a specification for a motorcycle helmet HUD in one exemplary embodiment.

In many embodiments, such as the one illustrated in FIG. 24, a display according to the principles of the invention comprises an IIN assembly 331 a waveguide eyepiece 352 (which is part of the overall waveguide component previously described) and prismatic relay optics 353. The IIN contains at least the microdisplay panel 351A illuminated by a light source which is not shown and projection optics 2010 which typically comprises refractive optics. The IIN assembly 331 is coupled to the prismatic relay optics by a coupler assembly 354 which provides mechanical support and an optical connection to admit light from the IIN assembly 331 into the prismatic relay optics 353. The prismatic relay optics comprises a reflective surface 353A which may be a TIR surface or may alternatively support a reflective coating. Light from the prismatic relay optics 353 is coupled into the waveguide eyepiece 352 via the optical interface layer 355 which in some embodiments provides polarization selectivity. In some embodiments, the optical interface layer 355 provides one of spectral or angular selectivity. In some embodiments, the optical interface layer 355 is a diffractive optical element. In some embodiments, at least one of the transmitting or reflecting surfaces of the prismatic relay optics has optical power. In some embodiments, at least one of the transmitting or reflecting surfaces of the prismatic relay optics supports at least one coating for controlling at least one of polarization, reflection or transmission as a function of wavelength or angle. The image light from the IIN is expanded in the prism to produce sufficient beam width aperture to enable a high efficiency "Roll-K Vector" input aperture—thus preserving efficiency and brightness.

In some embodiments, the waveguide eyepiece 352 comprises input, fold and output gratings disposed in separate red, green and blue diffracting layers or multiplexed into fewer layers as discussed above. For simplicity, the gratings in FIG. 24 are represented by the input grating 352A, fold grating 352B and output grating 352C. The light path from the projector through the prismatic relay optics and the waveguide is represented by the rays 2010-2013. The output image light viewed by the eye 356 is represented by the rays 2014 and 2015. The rays 2016 and 2017 illustrate the transparent of the waveguide to external light forward of the eyepiece and the transparency of the prismatic relay optics to external light in the periphery of the display wearer's field of view.

In some embodiments, based on the above described display architectures, may also implement a photodetector for detection of ambient light levels for the purpose of matching the display image luminance to the external scene luminance. Although, not shown in in the figures, such photodetectors may be integrated into the helmet structure or electromechanically connected to the HUD display.

Figure 27:
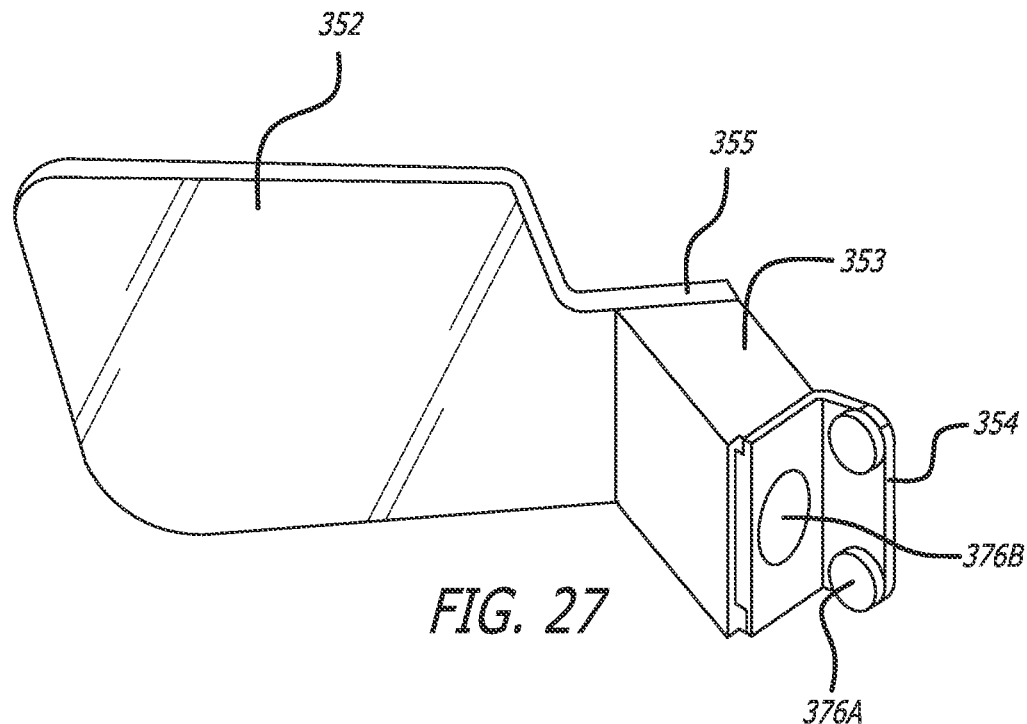
FIG. 27 is a detail of a motorcycle helmet HUD in one exemplary embodiment.

Additionally, although it is largely represented in the figures in one configuration it should be noted that the prismatic relay optics may take on any suitable configuration. As illustrated in FIGS. 24 and 27, the prismatic relay optics comprise an elongated prism form whereas for example FIGS. 40A-40F illustrate a prismatic relay optics as being largely flat. In some embodiments the prismatic relay optics may be integrated within or right next to the IIN assembly.

One exemplary embodiment of the invention for use in a helmet HUD is illustrated FIGS. 27-39 which illustrate details of the waveguide eyepiece, IIN, and associated prismatic relay optics linking the IIN and waveguide eyepiece. Design specifications in accordance with many embodiments of the invention are illustrated by the table in FIG. 25. Such specifications include the Eye box size, focal distance and image resolution, and are presented for exemplary purposes only.

Figure 26A:
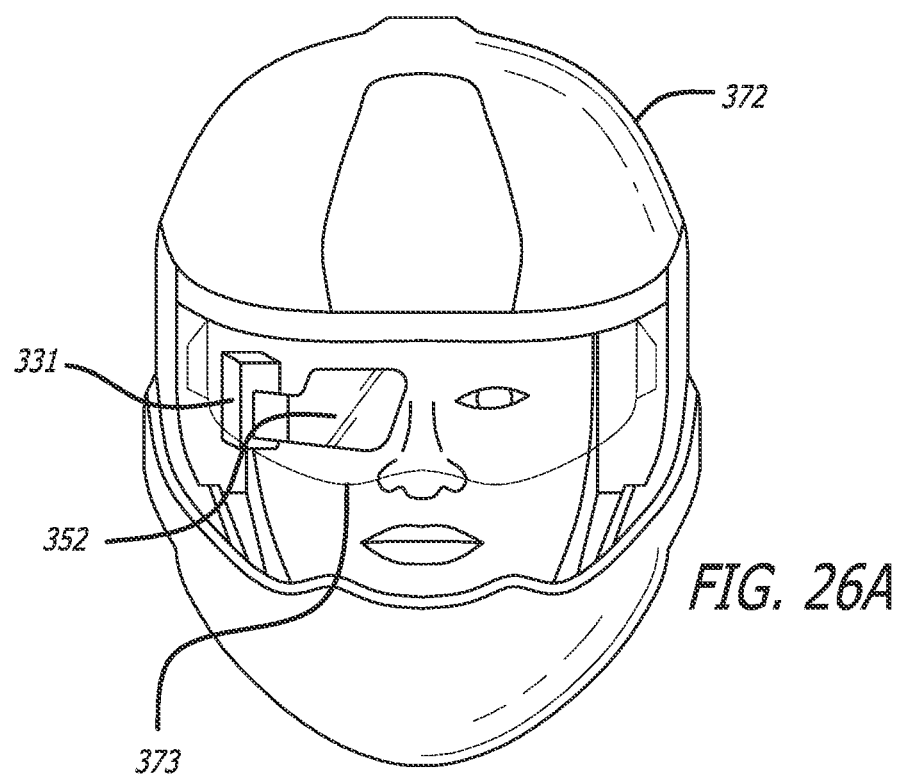
FIG. 26A is a schematic front elevation view of a motorcycle helmet HUD in one exemplary embodiment.
Figure 26B:
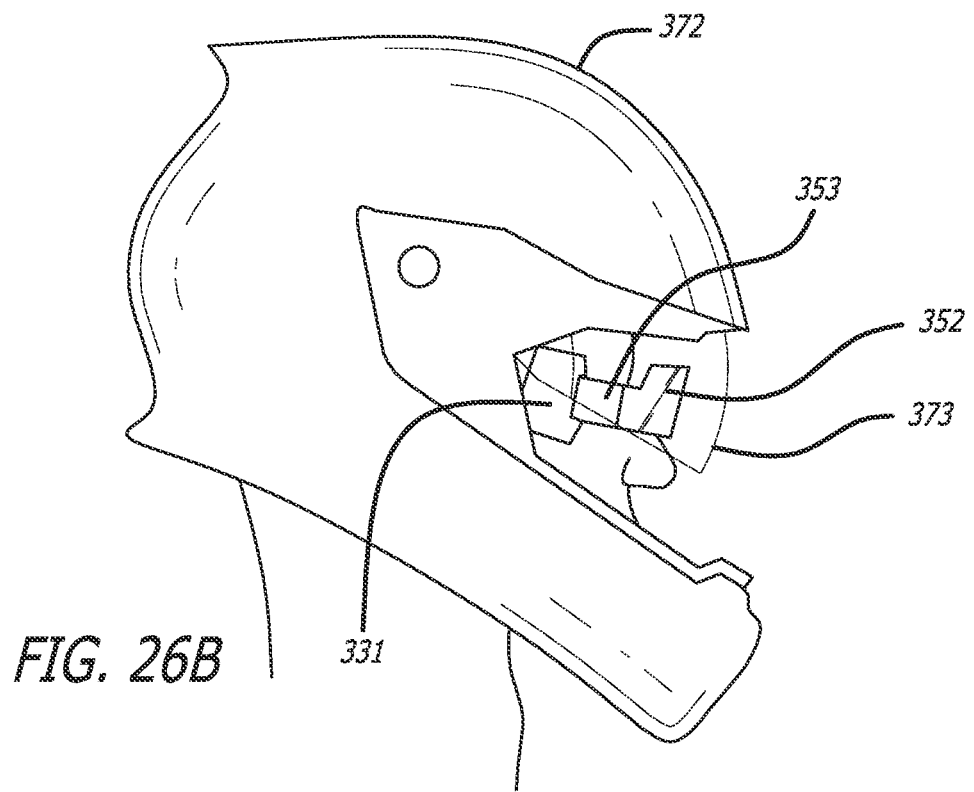
FIG. 26B is a schematic side elevation view of a motorcycle helmet HUD in one exemplary embodiment.

FIG. 26A and FIG. 26B provide a schematic front and side elevation views a helmet HUD. As described in other figures, the display comprises a waveguide eye piece 352, prismatic relay couple 353 and the IIN assembly 331. Additionally, FIGS. 26A and 26B illustrate one embodiment of the HUD integrated with a helmet where the HUD's spatial relation with respect to the Helmet visor 373 is shown. In accordance with many embodiments of the invention, where the HUD is integrated with a helmet as illustrated in FIGS. 26A and 26B, the waveguide eyepiece 352 may be tilted (rake angle) to the horizontal plane to avoid the visor. In various embodiments the rake angle may be at least 20 degrees, in accordance with many embodiments, the rake angle is at least 25 degrees, which enables eye-relief at least 25 mm while providing generous visor clearance. In many embodiments the design allows the eyepieces to translate between the left and right sides of helmet.

In accordance with other embodiments FIG. 27 illustrates a detail of the headpiece HUD comprising the waveguide eyepiece 352, the prismatic relay optics 353, and a frame or coupler 354, which may serve as the opto-mechanical coupling between the waveguide component and the IIN. In accordance with some embodiments the frame or coupler 354 may comprise a mechanical attachment point that may be selected from a group consisting of a magnet, hinge, or USB connection. In many embodiments the prismatic relay optics are visually transparent to allow ambient light and ensure increased field of vision of the user. In accordance with many embodiments the prism assembly also comprises a corner coupler molding and beam splitter window 355 and a prism window 353B.

In accordance with many embodiments of the invention the opto-mechanical coupler 354 that couples the prismatic relay optics 353 to the IIN 331 as illustrated in FIGS. 26-30 represents a component of the HUD display. The coupler 354 may comprise a plurality of alignment characteristics such as magnets, pins, or other physical characteristics to ensure the proper optical alignment of the IIN, the prismatic relay optics, and the waveguide. Under the principles previously discussed the alignment of the image produces by the IIN with the waveguide may be used to ensure a quality image via the output grating. In many embodiments, the angle at which the image is projected from the IIN through the prismatic relay optics and subsequently to the waveguide display is maintained at an input angle configured for the particular optical characteristics desired such that total internal reflection is thus maintained. Therefore, the opto-mechanical coupler 354, in accordance with many embodiments, may be fabricated to accurately align the optical output of the IIN with the input grating of the waveguide at an input angle thus ensuring total internal reflection is maintained. Such alignment in accordance with some embodiments is thus illustrated in FIG. 27 by way of the mechanical design of the coupler with an optical window 376B and mechanical magnetic connection points 376A. Additional alignment methods are thus illustrated for example in FIGS. 40A-40F where the prismatic relay optics comprises a relatively flat component.

Figure 28:
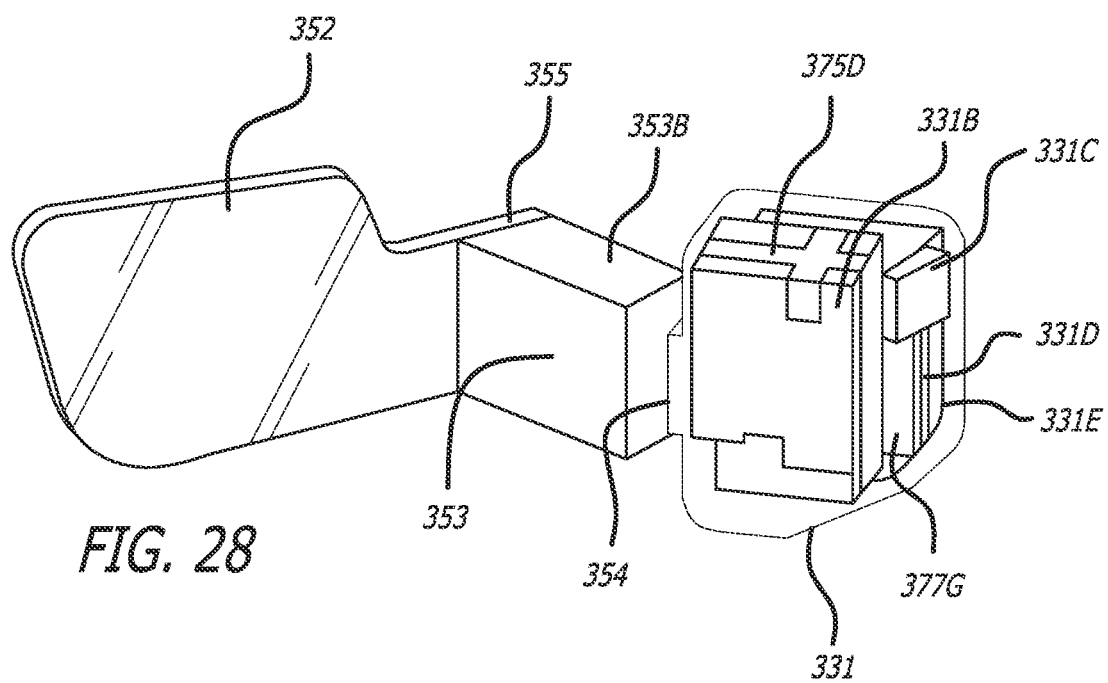
FIG. 28 is a detail of a motorcycle helmet HUD in one exemplary embodiment.

FIG. 28 illustrates an opto-mechanical coupling between the IIN and the waveguide component. In accordance with many embodiments, the IIN assembly 331 may also comprise a HDMI, DigiLens switch, power on/off switch and a photodiode PCB as generally indicated by 331B through 331E. As shown in FIG. 28 the IIN also comprises a microdisplay connector 377.

Figure 29:
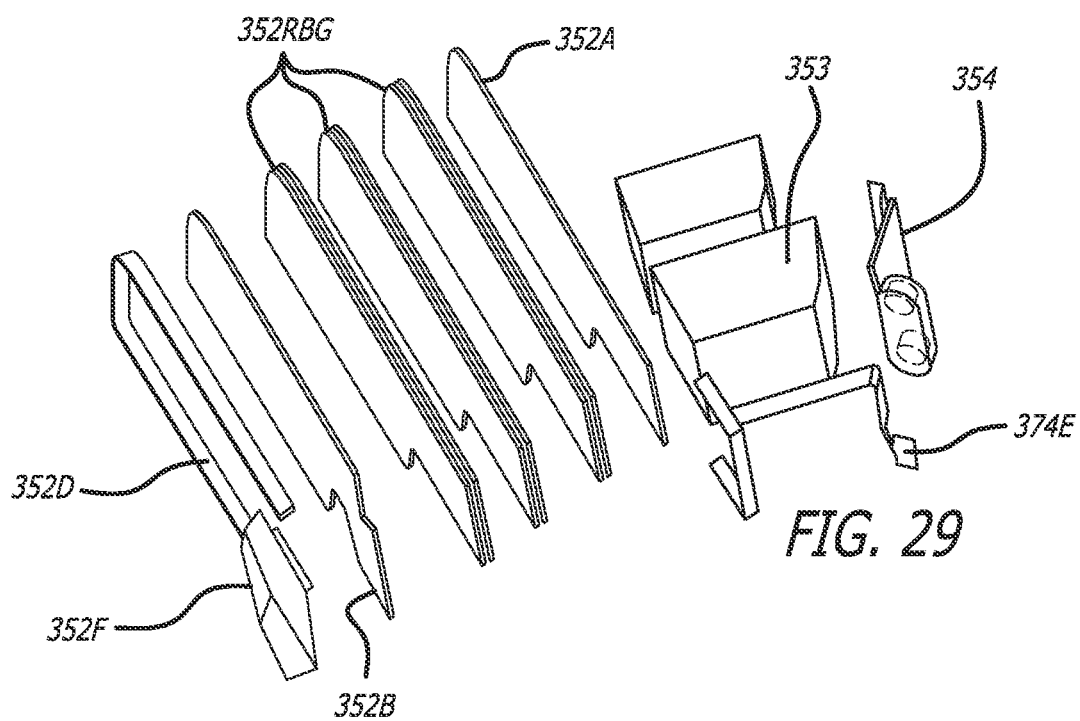
FIG. 29 is a detail of a motorcycle helmet HUD in one exemplary embodiment.

In accordance with many embodiments of the invention, FIG. 29 shows an exploded view detail of the HUD display without the IIN. The figure shows the waveguide eye piece 352, prismatic relay optics and coupler 353 and 354 respectively. The prism relay optics 353 provides a path linking the IIN to the waveguide eyepiece and due to its transparency also provides an enhanced peripheral field of view. The waveguide eyepiece, shown in exploded view, further comprises red, green and blue layers 352R, 352G, 352B encased between two layers of optical film 352A, 352B. Such film may consist of a polymer type material such that it provides wipe-clean, ballistic anti-shatter protection. Additionally, the optically sound waveguide eyepiece 352 may be encased by a clear surround molding 3352D. In accordance with many embodiments and to connect the power inputs of the IIN with that of the waveguide eyepiece components, a flex cable 374E may be used.

Figure 30:
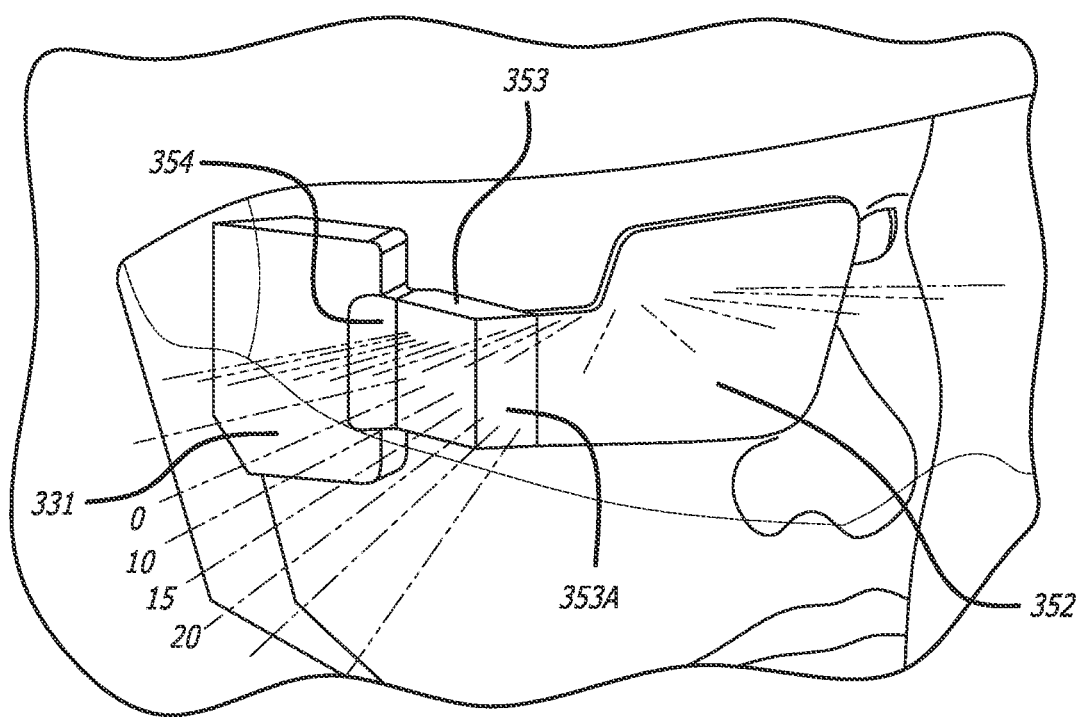
FIG. 30 is a three-quarter view of a motorcycle helmet HUD in one exemplary embodiment.
Figure 31:
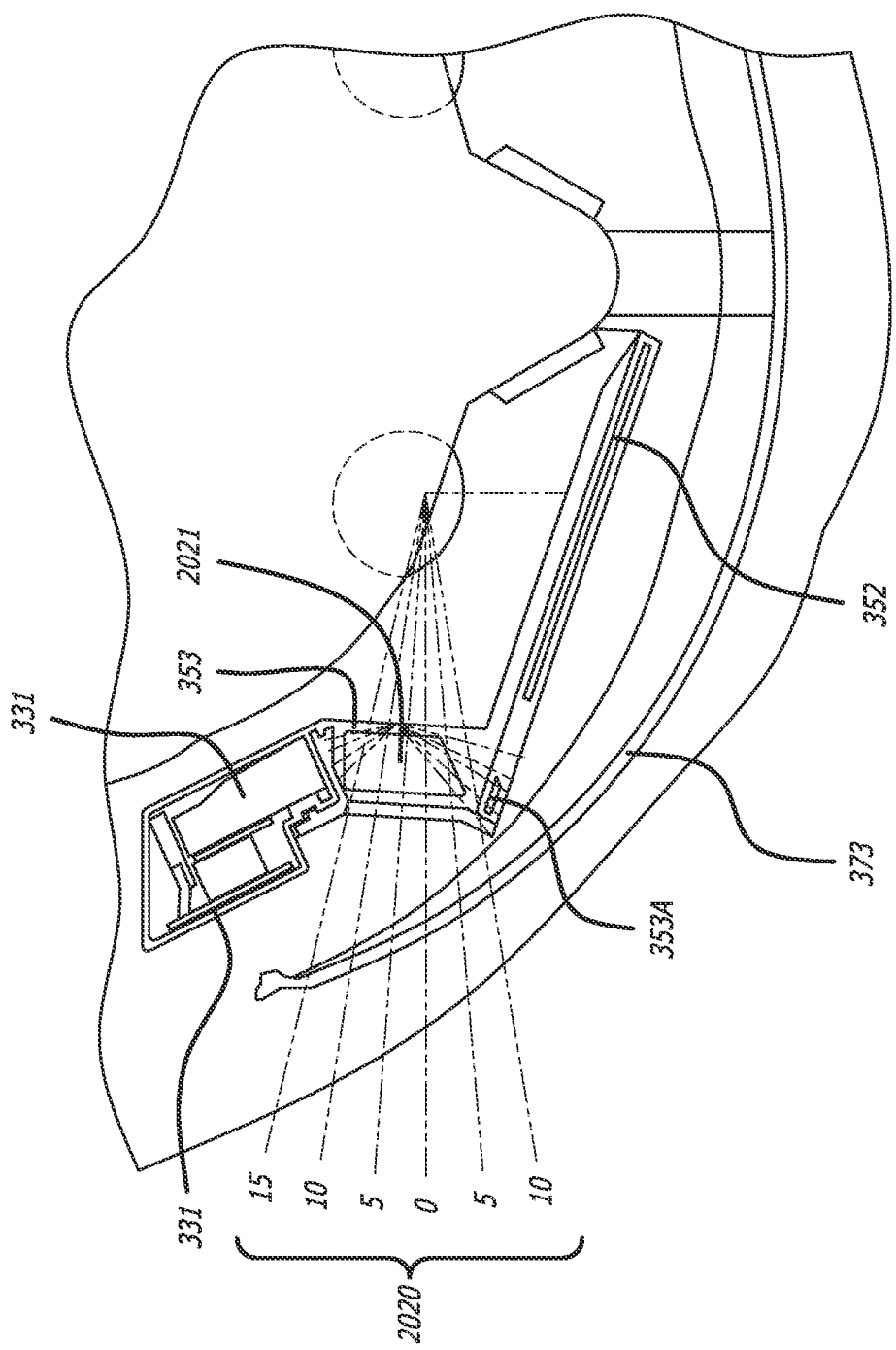
FIG. 31 is a plan view of a motorcycle helmet HUD in one exemplary embodiment.
Figure 32:
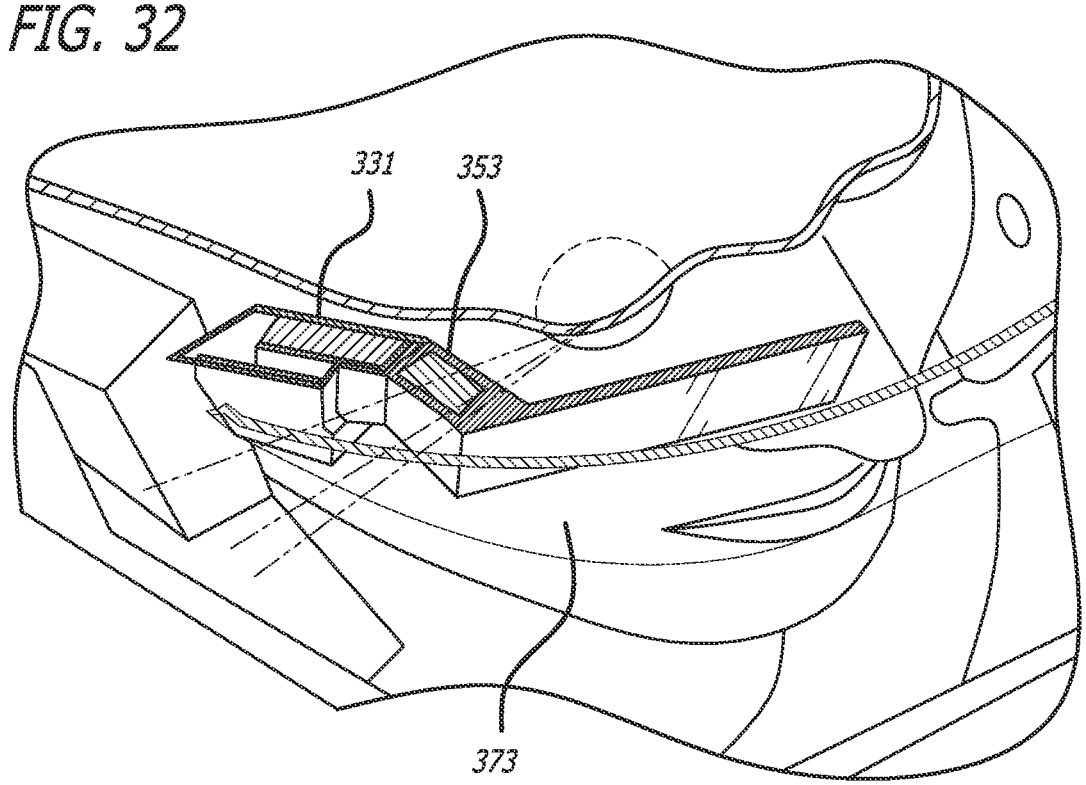
FIG. 32 is a three-quarter view of a motorcycle helmet HUD in one exemplary embodiment.

Turning now to FIG. 30 and in accordance with many embodiments an illustrative view of the HUD in a helmet is represented. FIG. 30 illustrates the HUD with the waveguide eyepiece 352 opto-mechanically connected to the prismatic relay optics 353 which opto-mechanically connect to the IIN 331 via an opto-mechanical coupling. Additionally, FIG. 30 illustrates the optimal field of view both horizontally and vertically with respect to the HUD when attached to a helmet, as illustrated via the blue and red degree lines. Maintaining adequate Field of View (FOV) angles is another element in the design of the prismatic relay optics. FIG. 31 further illustrates a preferred embodiment of the prismatic relay optics wherein the peripheral FOV is at least 25 degrees.

Figure 33:
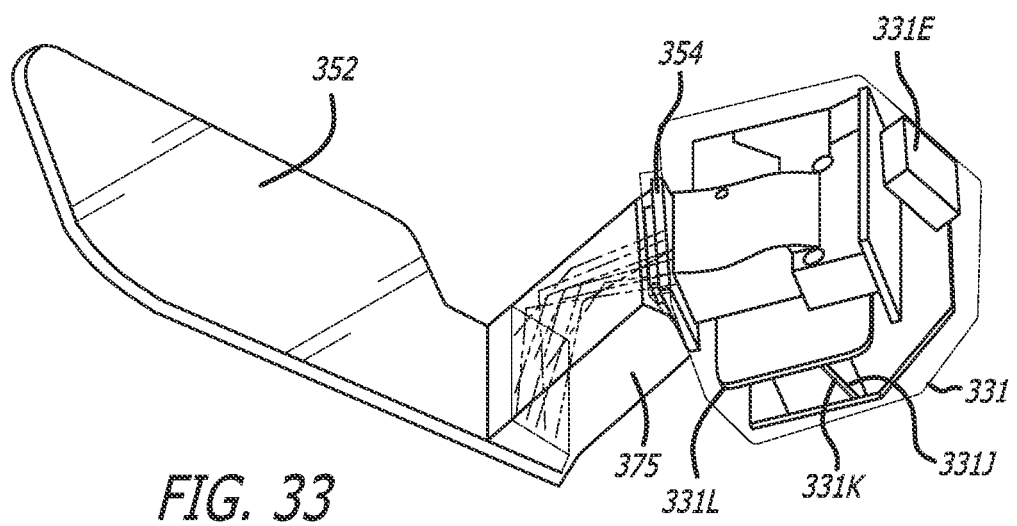
FIG. 33 is a detail of a motorcycle helmet HUD in one exemplary embodiment.

In accordance with many embodiments of the invention the IIN may comprise various optics and communications components. As illustrated in FIG. 33, many embodiments of the IIN may include a power switch 331L, various communication cables 331J, a cooling fan 331E, and other PCB components 331K that are electrically connected to the picoprojector and other optical components of the IIN. As described previously the IIN operates to generate an image and project the image through the prismatic relay optics at the preferred angle such that the image is ultimately displayed via the output gratings of the waveguide eyepiece.

Figure 34:
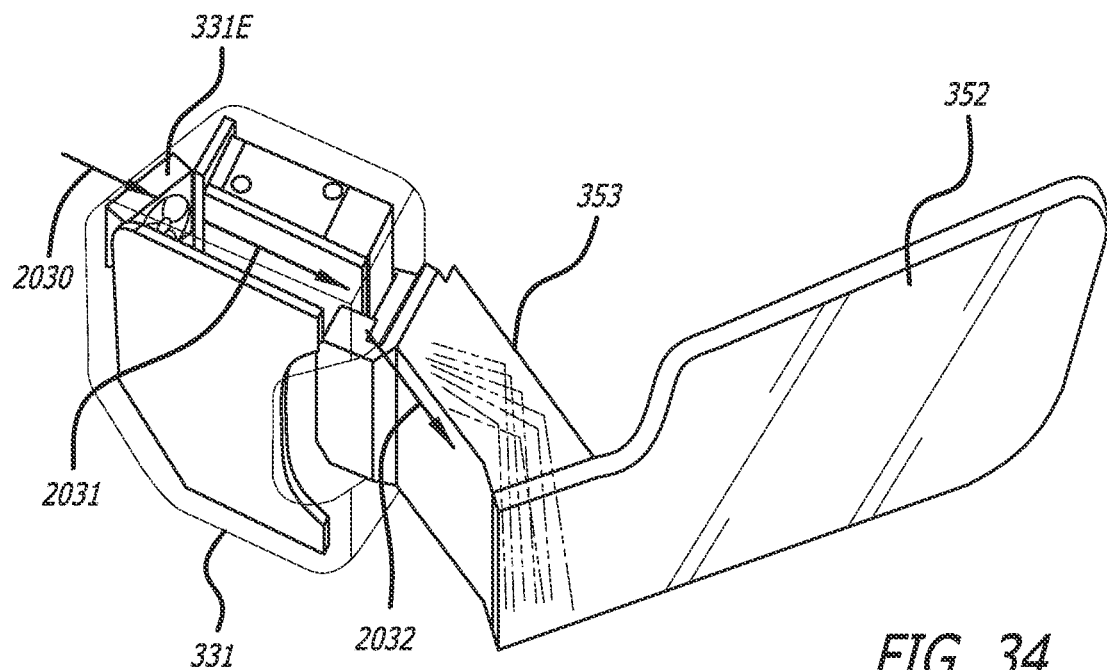
FIG. 34 is a detail of a motorcycle helmet HUD in one exemplary embodiment.
Figure 35:
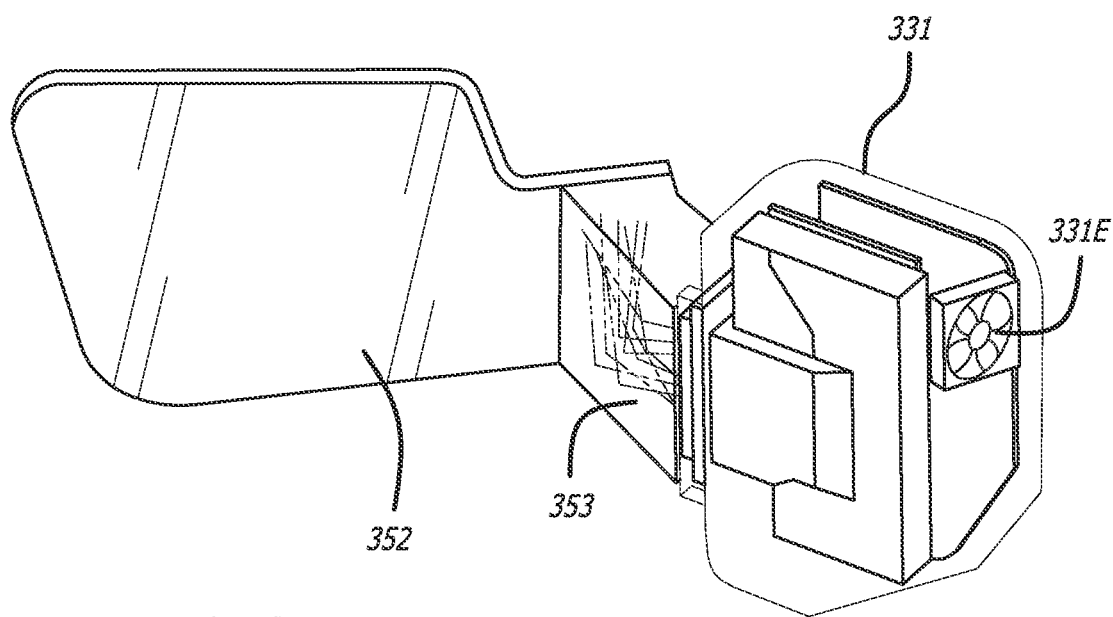
FIG. 35 is a detail of a motorcycle helmet HUD in one exemplary embodiment.

Maintaining ideal temperatures of the electrical optical components may be implemented to ensure the waveguide eyepiece function. Therefore, in accordance with many embodiments a cooling fan 331E is illustrated in FIGS. 33-35. An exemplary fan for use with the invention is the model UF3A3-700 manufactured by Sunonwealth Electric Machine Industry (China). The fan which has a volume of 10×10×3 mm provides an air flow of 3.43 liter/minute. The noise level is 21.0 dB(A)/30 cm. Using a cooling fan of this specification it is possible to meet current 40-degree thermal requirement specifications for motorcycle helmets.

Additionally, as illustrated in FIGS. 31-35 and 38-39, in many embodiments the components of the IIN assembly are collocated within a housing that facilitates the opto-mechanical coupling between the waveguide component and the IIN. In accordance with many embodiments the housing has a minimum wall thickness (e.g., less than 2 mm) to enhance the conduction heat away from the internal components. In many embodiments the IIN assembly may be integrated with the helmet itself or may be subsequently attached thereto.

Figure 36:
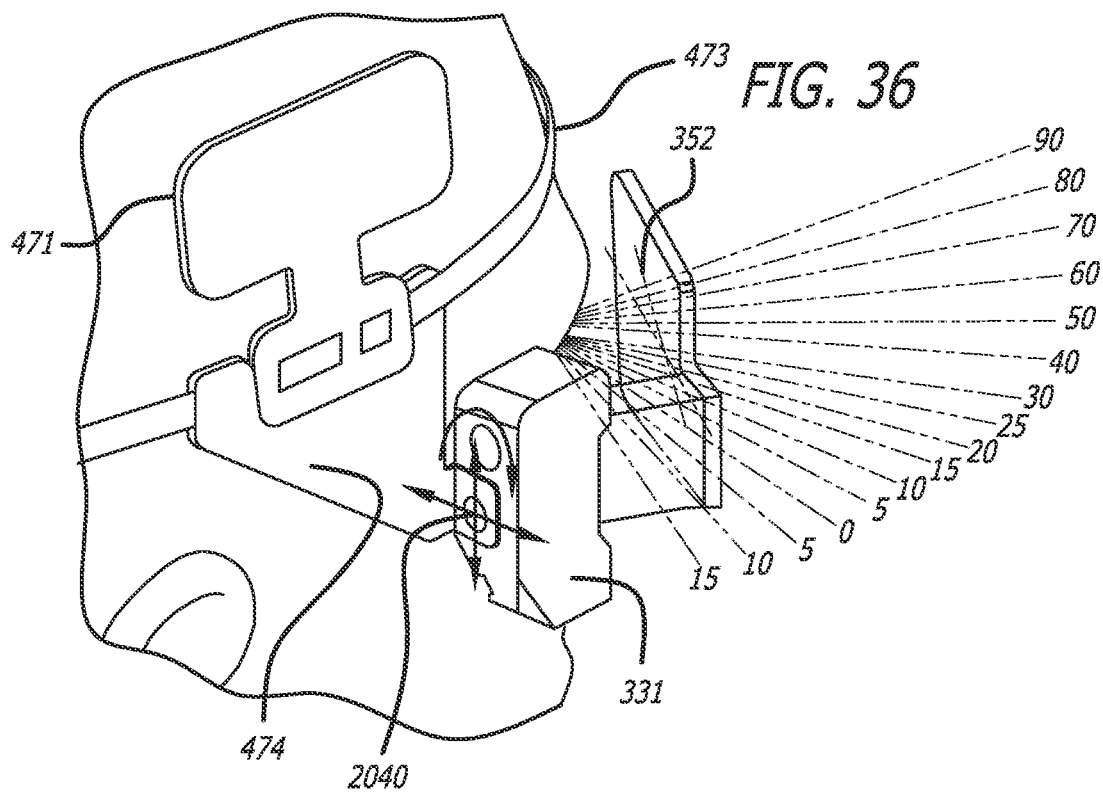
FIG. 36 is a detail of a motorcycle helmet HUD in one exemplary embodiment.
Figure 37:
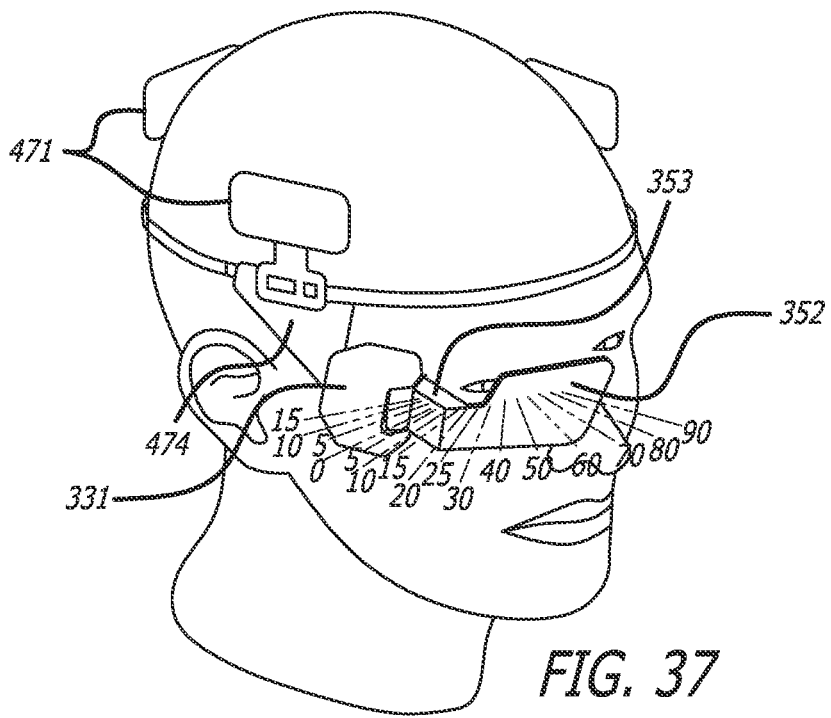
FIG. 37 is a detail of a motorcycle helmet HUD in one exemplary embodiment.
Figure 38:
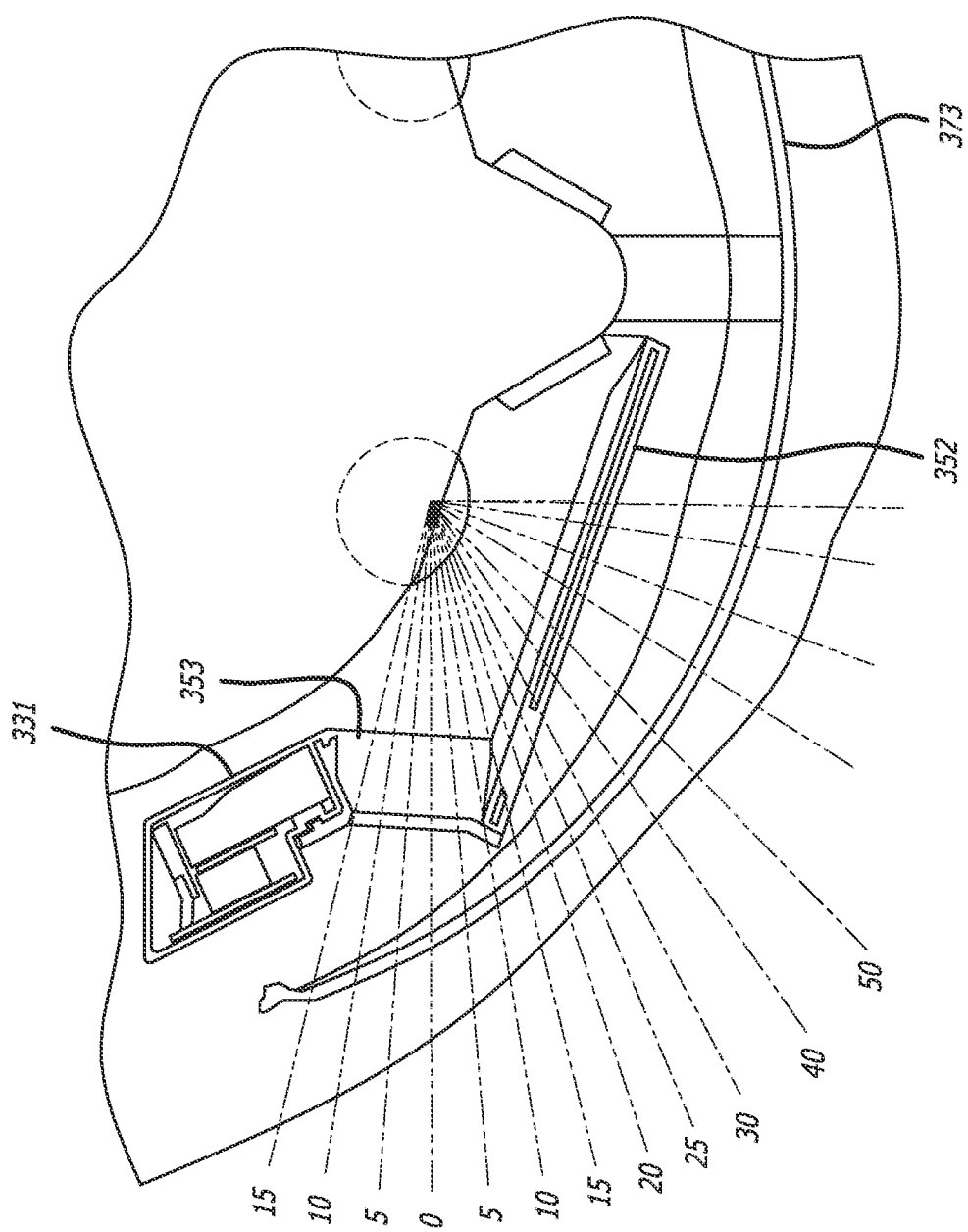
FIG. 38 is a plan view of a motorcycle helmet HUD in one exemplary embodiment.

In accordance with many embodiments, a method of attaching the HUD unit to a helmet is presented. Turning to FIGS. 36 and 37 a method of attaching the HUD is illustrated. FIG. 36 illustrates the use of a supporting headband 473 that surrounds the users head and has a plurality of securing fixtures 471 attached thereto. The securing fixtures are configured to interconnect the supporting headband to the inside of a helmet. The securing fixtures may consist of a variety of devices including temporary hook and loop fasteners or more permanent type fasteners. The supporting headband is additionally configured to receive the HUD by way of an interconnection bracket. The interconnection bracket 474 may be configured to be adjustable along the length of the supporting headband 473 such that the position of the HUD can be adjusted to the most comfortable position of the user. Additionally, in accordance with many embodiments the interconnection bracket may be configured to allow multiple axis of adjustment 2040 of the HUD such that when the IIN connects thereto it would thereby allow the user to adjust the position of the HUD to maintain the greatest FOV. FIGS. 36 and 37 illustrate the desired FOV through the various adjustments positions of the HUD. Although a particular configuration is illustrated in FIGS. 36 and 37 it should be understood that any suitable configuration may be adopted. In accordance with many embodiments FIG. 38 illustrates a manner of configuration of the HUD integrated with a helmet such that the desired user FOV is maintained.

Figure 39:
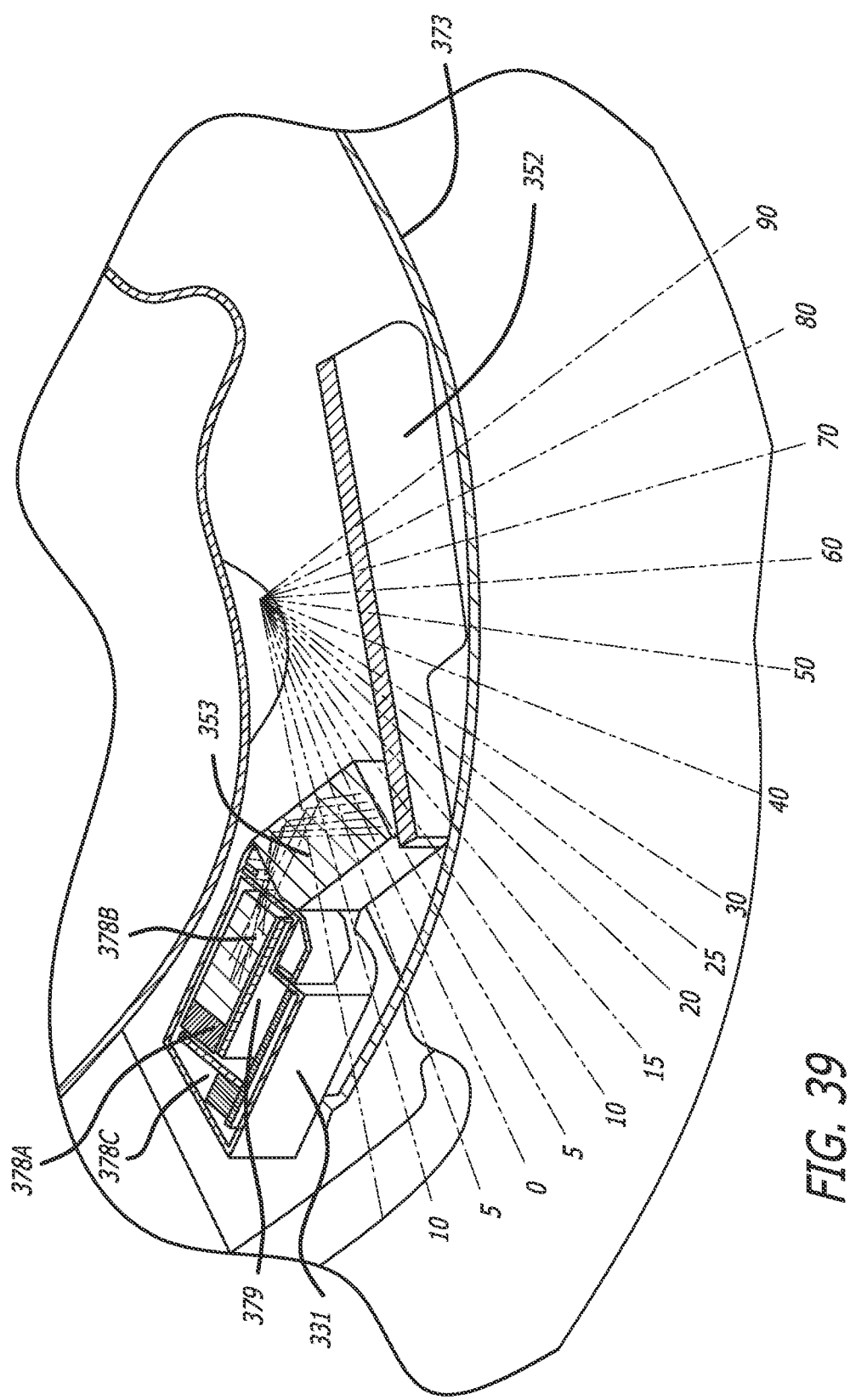
FIG. 39 is an overhead view of a motorcycle helmet HUD in one exemplary embodiment.
Figure 40A:
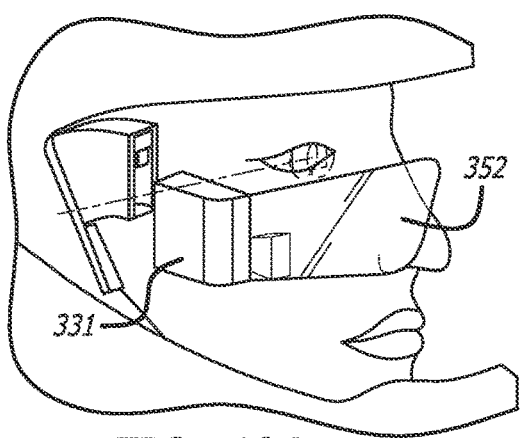
FIG. 40A illustrates a detail of the mechanism for attaching the waveguide eyepiece to the IIN in one embodiment.
Figure 40B:
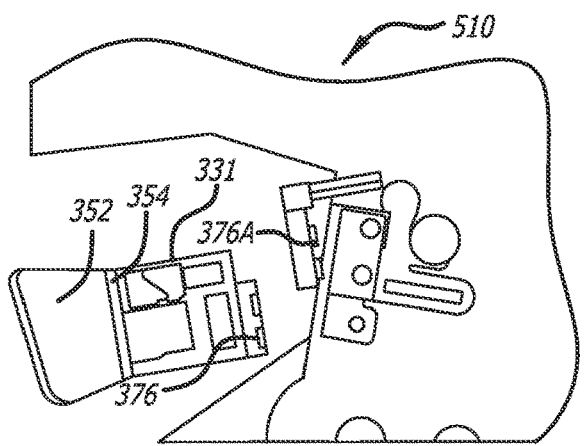
FIG. 40B illustrates a detail of the mechanism for attaching the waveguide eyepiece to the IIN in one embodiment.
Figure 40C:
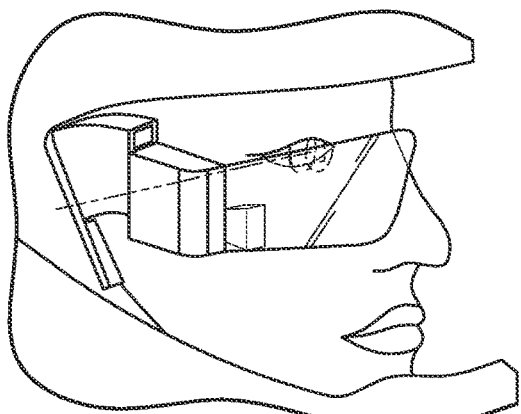
FIG. 40C illustrates a detail of the mechanism for attaching the waveguide eyepiece to the IIN in one embodiment.
Figure 40D:
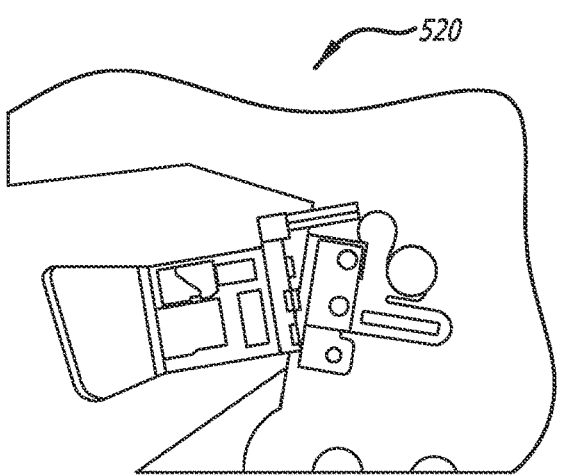
FIG. 40D illustrates a detail of the mechanism for attaching the waveguide eyepiece to the IIN in one embodiment.
Figure 40E:
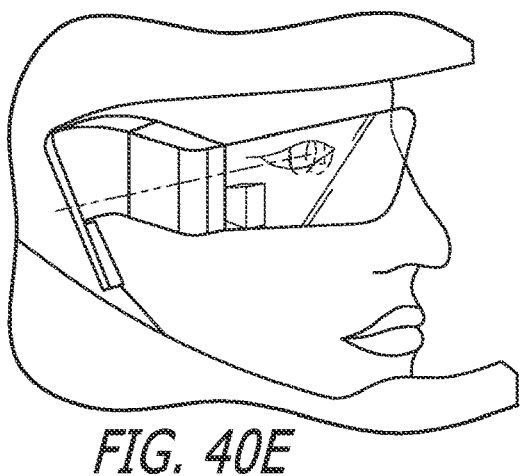
FIG. 40E illustrates a detail of the mechanism for attaching the waveguide eyepiece to the IIN in one embodiment.
Figure 40F:
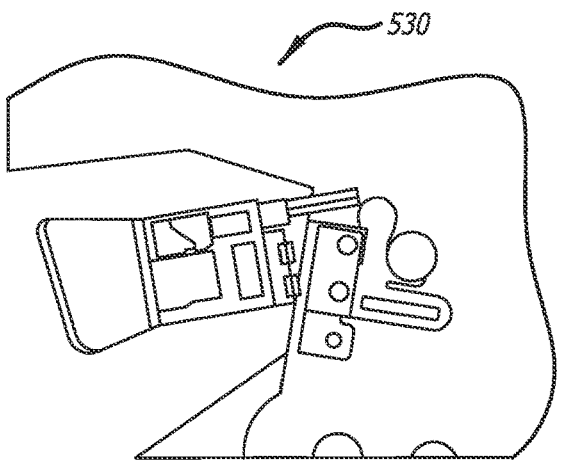
FIG. 40F illustrates a detail of the mechanism for attaching the waveguide eyepiece to the IIN in one embodiment.

In accordance with many embodiments the IIN comprises a picoprojector group 378 as illustrated in FIG. 39 (other views are also illustrated in FIGS. 31-35). The picoprojector group may further comprise a first projection lens group 378A, a second lens group 378B for collimating the light reflected from the microdisplay 378C. Although not shown in the figures the picoprojector may further comprise an LED illuminator and LED illumination optics. In addition to the optical components, the IIN may further comprise an LED Heatsink 379 that may coordinate with the aforementioned fan to maintain the optimal thermal specifications. The IIN also comprises a microdisplay video controller PCB 377E. In some embodiments the IIN may contain separate rechargeable power cells for powering the various internal components. Ray paths through the projector are indicated by 2030 and in the prismatic relay element by 2031, thereby illustrating the projected optimal path of the image.

In accordance with many embodiments of the invention the HUD may be configured to be removable from a helmet configuration such that when not in use it may be properly stored and if applicable charged for future use. FIGS. 40A-40F illustrate an exemplary embodiment of the invention in which the IIN is configured to be removable from an electromechanical attachment point collocated in/on the helmet. In some embodiments the IIN may attach to the helmet via a magnetic connection. In other embodiments the connection may involve a variety of attachment configurations including a hinge or a USB type connection. Additionally, the IIN assembly may be configured with a communication port such that it may be in communication with other components of a helmet including Bluetooth connectivity and/or GPS. In other embodiments, although not illustrated in FIGS. 40A-40F, the attachment/detachment point may be between the waveguide component and the IIN. In such embodiments the waveguide component may be fully removed and properly stored when not in use.

Figure 41A:
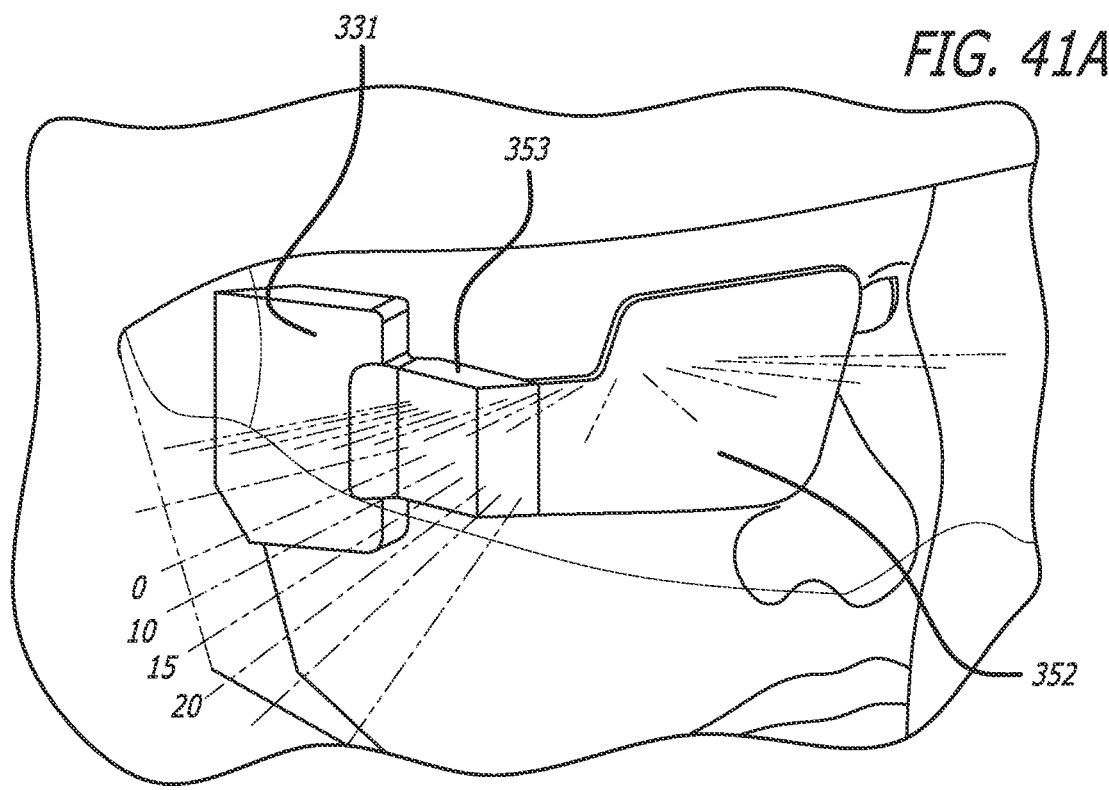
FIG. 41A illustrates a detail of the basic helmet integration of one embodiment
Figure 41B:
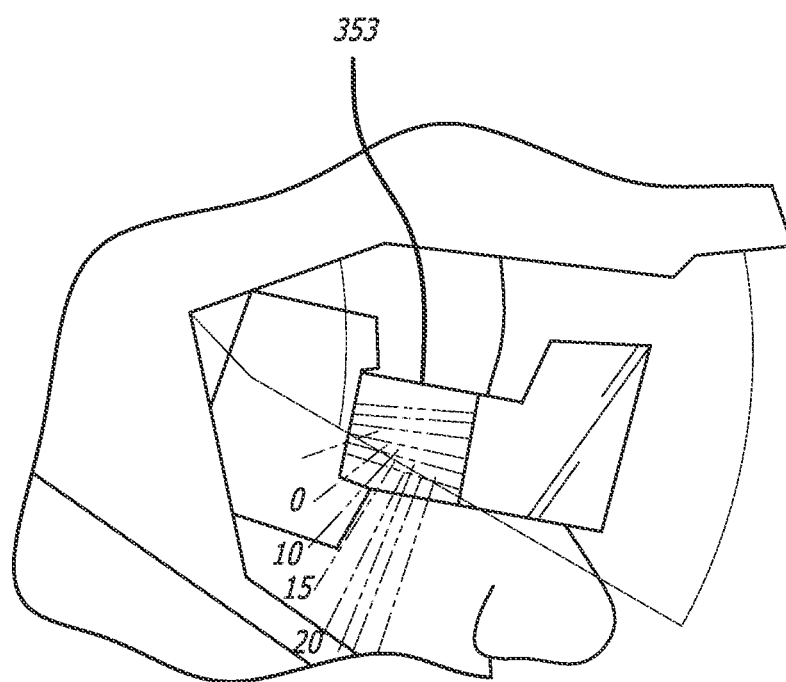
FIG. 41B illustrates the optical path of the image produced from the IIN.

In accordance with many embodiments the prismatic relay optics 353 as illustrated in FIGS. 41A-41B, projects the beam from the pico projector located within the IIN 331. The beam will expand in the prism to allow for sufficient aperture to enable a high efficiency "Roll-K Vector" input aperture, thus preserving the efficiency and brightness of the projected image. The brightness of the image is also maintained through the various controllers in the IIN. For example, as illustrated in FIG. 50B, light and temperature sensors, 640 and 650 respectively, may be located within the IIN to accommodate for changes in ambient temperature and light.

Figure 42A:
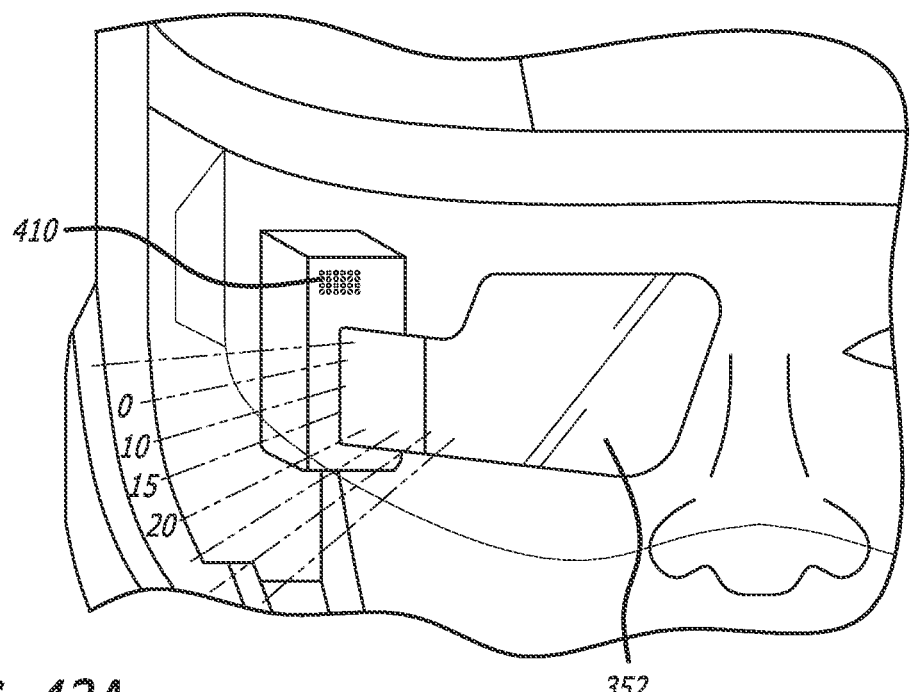
FIG. 42A illustrates one embodiment of the IIN.
Figure 42B:
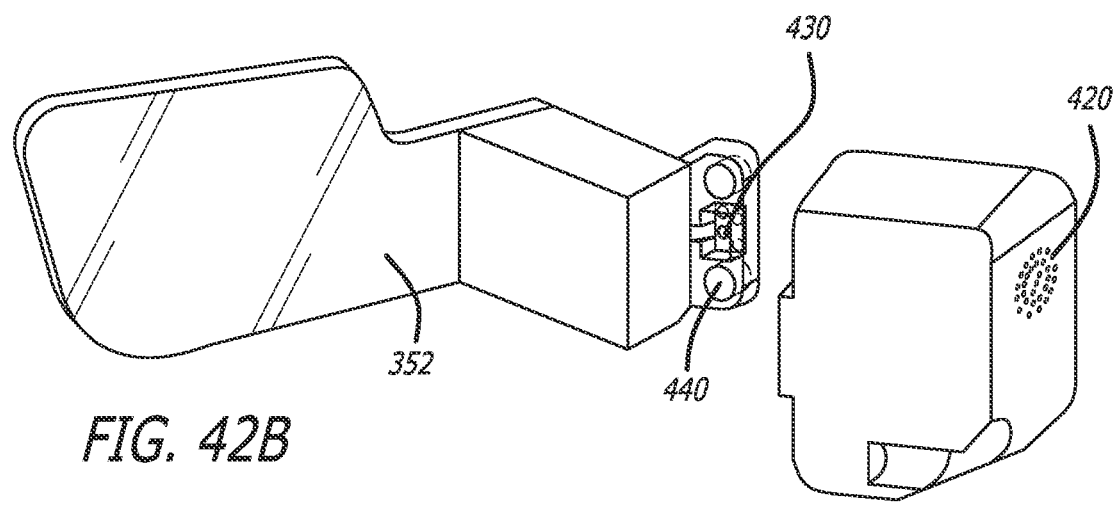
FIG. 42B Illustrates an embodiment of the opto-mechanical connection between the IIN and the prismatic relay.
Figure 43A:
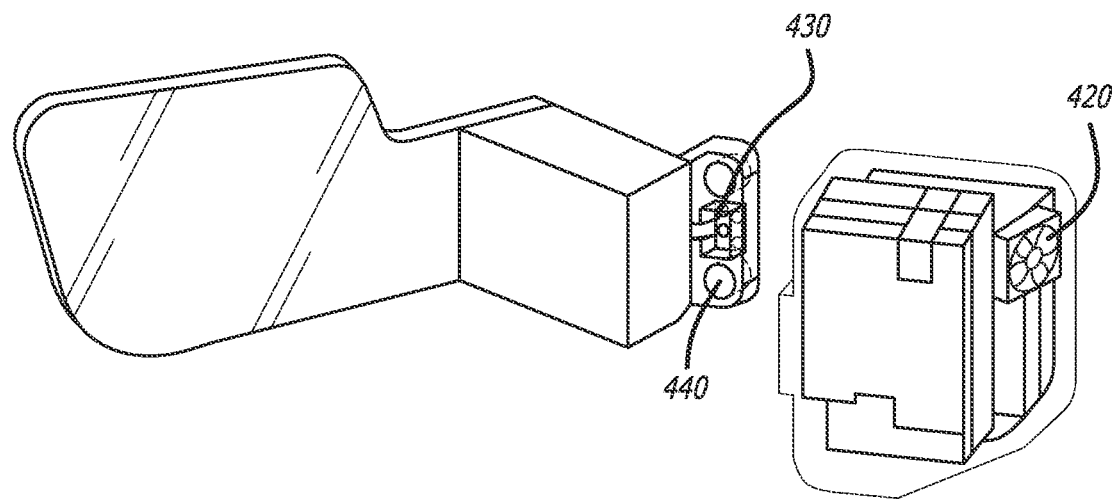
FIG. 43A illustrates another view of the opto-mechanical connection between the IIN and prismatic relay.
Figure 49A:
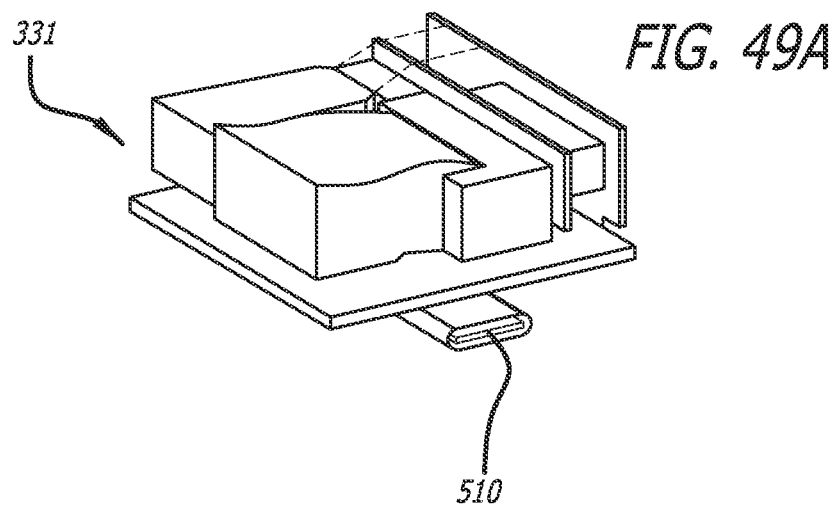
FIG. 49A illustrated one embodiment of the internal configuration of the IIN.
Figure 49B:
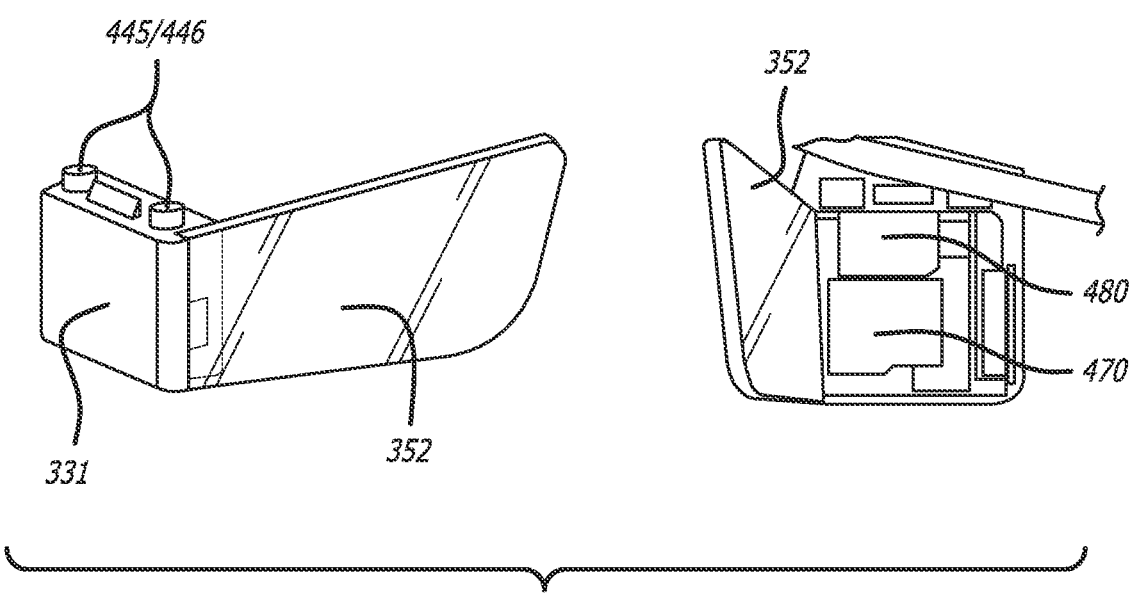
FIG. 49B illustrates an alternate view of the HUD and various components.

According to many embodiments the IIN 331, as mentioned previously also includes mechanisms such as fans and LED heatsinks that help to regulate the temperature to ensure the most efficient image production. FIG. 42A illustrates an ambient air intake 410 situated within the housing of the IIN. Additionally, FIG. 42B illustrates a conditioned air outtake 420 situated within the IIN housing. Furthermore, the IIN may include internal passive heat dissipation components 480 as illustrated in FIG. 49B. Such passive components may include fins or LED heatsinks as mentioned previously. Additionally, to ensure the most efficient image production the IIN and the opto-mechanical connection may include alignment magnets 440 and precision electrical connections 430. The electrical connections may, according to some embodiments, create the power connections between the various red, green, blue, or mono-color grating layers within the waveguide. Such connection may be configured to maintain an image quality from the IIN to the output grating. In accordance with many embodiments FIG. 43A illustrates the magnetic and electrical connections between the IIN and the prismatic relay.

Figure 43B:
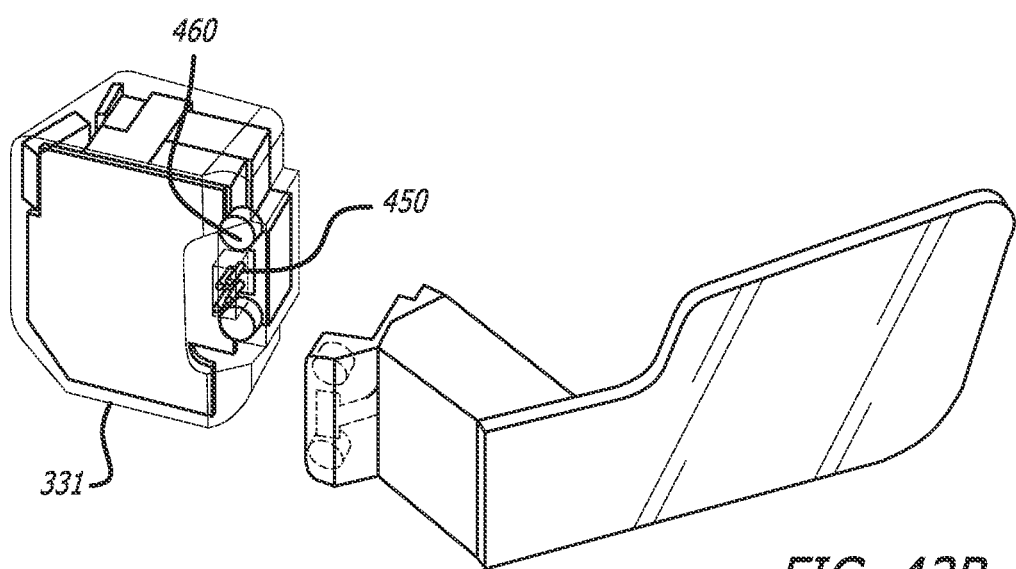
FIG. 43B illustrates another view of the opto-mechanical connection between the IIN and prismatic relay.

FIG. 43B further illustrates the magnetic and electrical connections located within the IIN in accordance with some embodiments of the invention. Such connection may be one of several that exist on the IIN. The connection, in accordance with many embodiments of the invention may be configured to avoid a ghosting effect on the final image. Ghosting is spurious colors in the image due to inaccuracies in the individual waveguide light path (as created via the opto-mechanical connections) including glass flatness and can be affected by poor connections. Although specific embodiments of interconnection are shown, it will be understood that the electrical and alignment connections may take on any suitable form that produces a precise alignment.

Figure 44A:
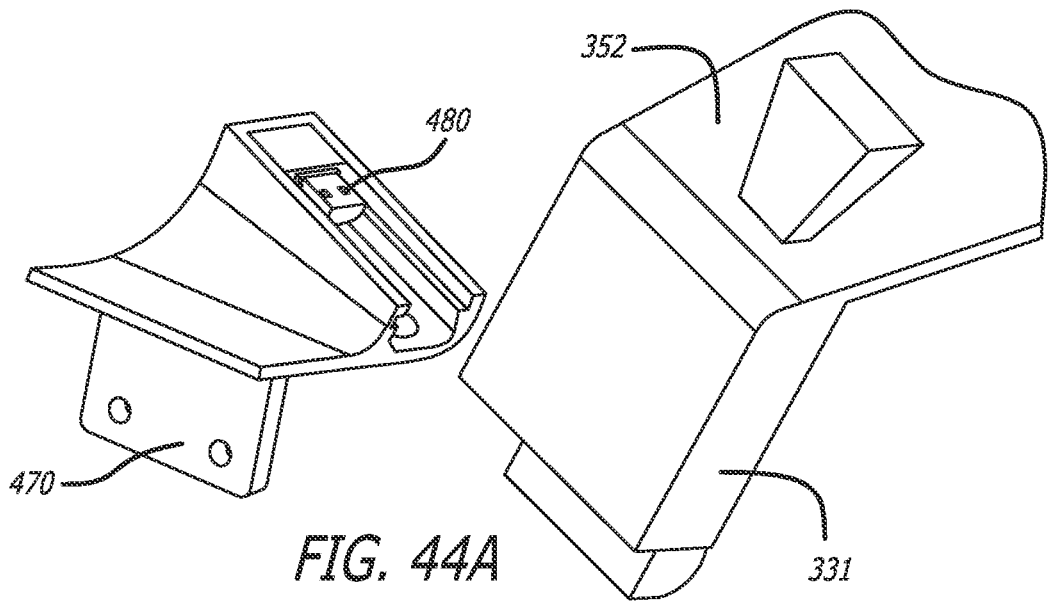
FIG. 44A illustrates one embodiment of the HUD connection to a helmet
Figure 44B:
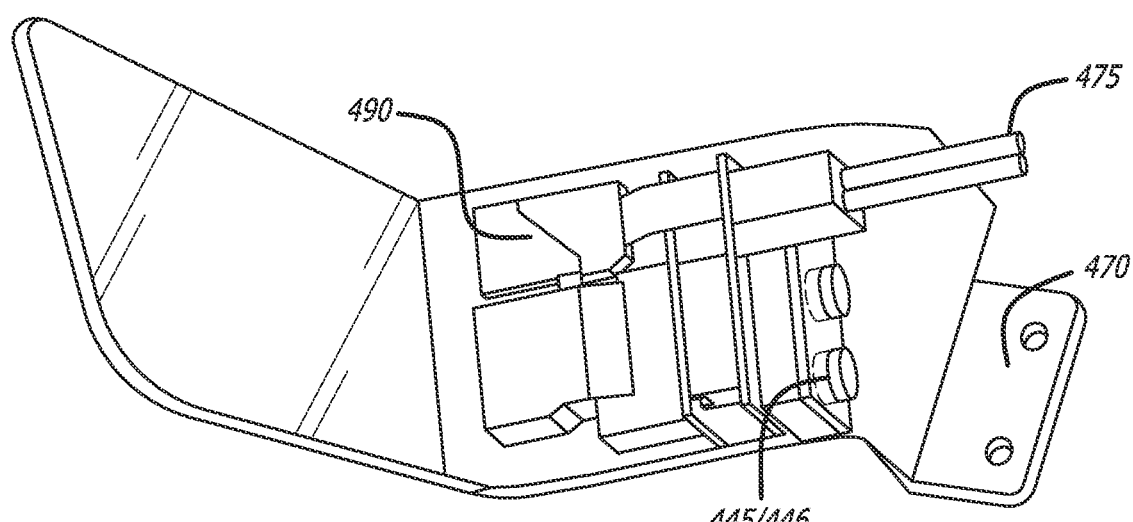
FIG. 44B illustrates an alternate view of the HUD connection to a helmet as well as one embodiment of the internal components of the IIN.
Figure 45:
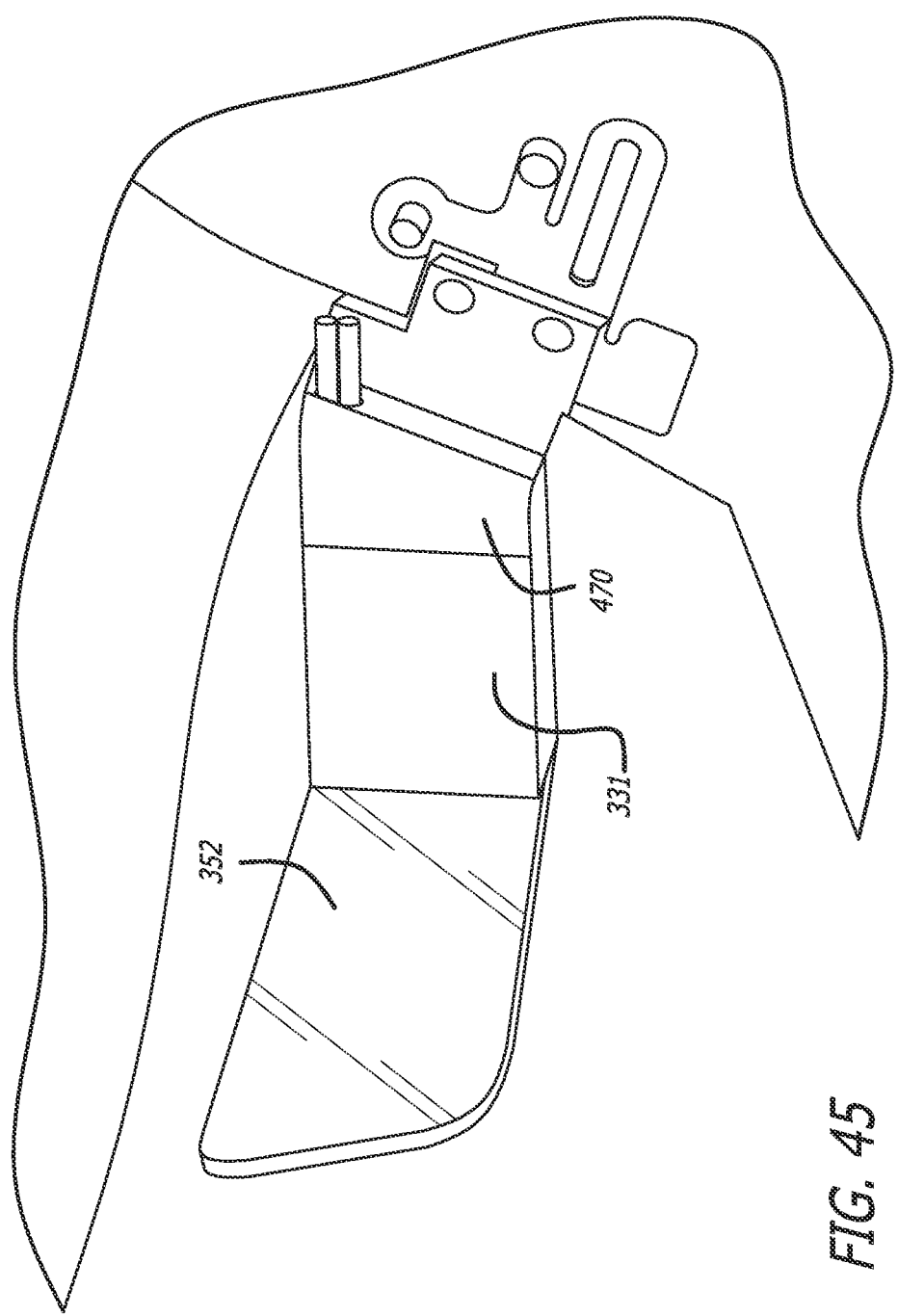
FIG. 45 illustrates a method of attachment in accordance with some embodiments.

In accordance with many embodiments the HUD may be configured to mount on a helmet or other headpiece. As illustrated in FIGS. 44A-44B, one embodiment is shown where the power and other communication connections 480 are housed within a bracket 470. The bracket may have an alignment feature that correlates to a feature on the IIN such that the IIN securely aligns and connects to the helmet. Such connection may take on any number of forms and may include a magnetic connection 445/446 on either side of the connection. As further illustrated in FIG. 45 the alignment bracket 470 may be adjustable such that it can be configured to attach to any number of suitable head pieces or helmets.

Figure 46:
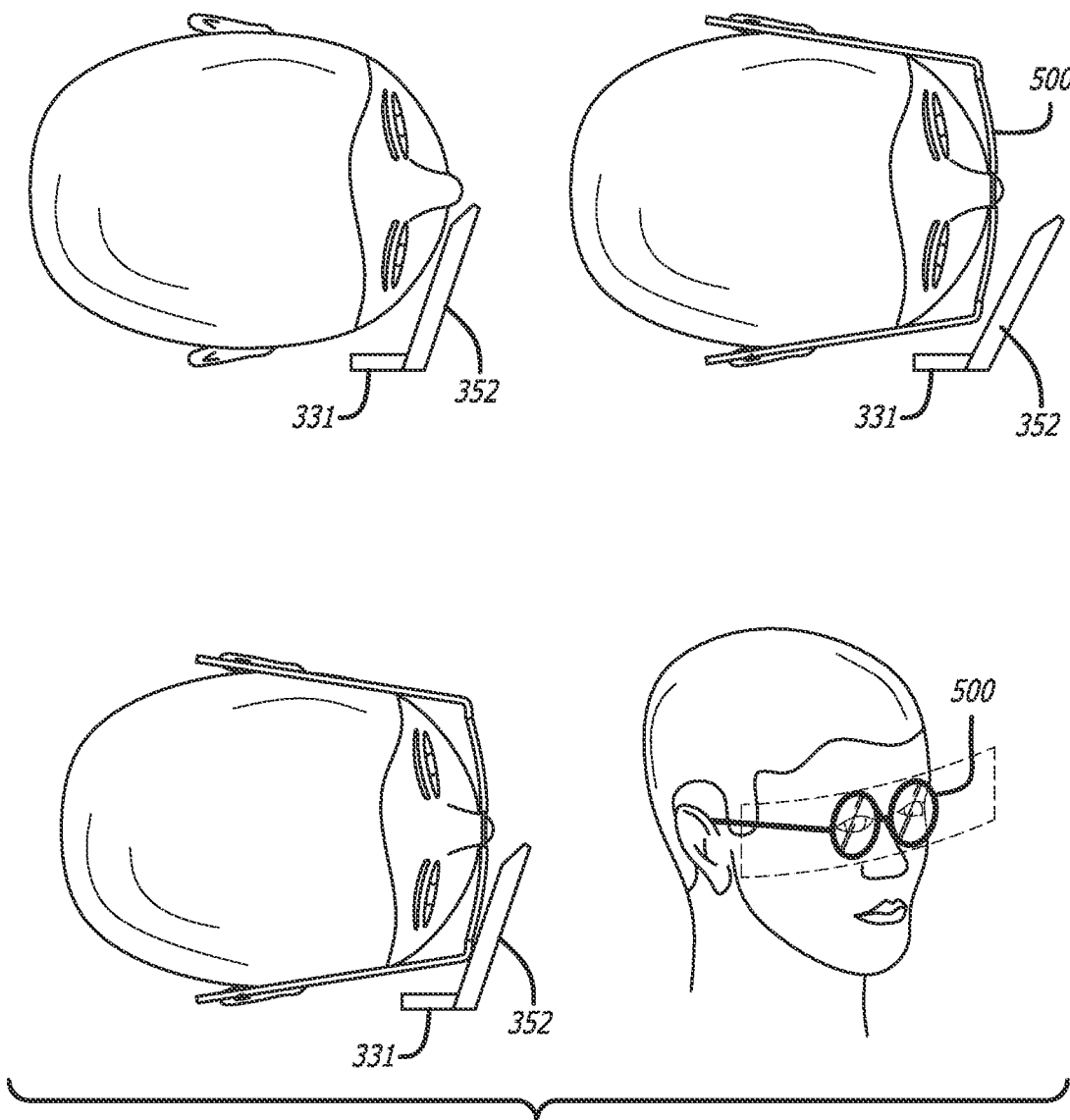
FIG. 46 illustrates top and orthogonal views of the positioning of the waveguide with respect to corrective lenses.
Figure 47B:
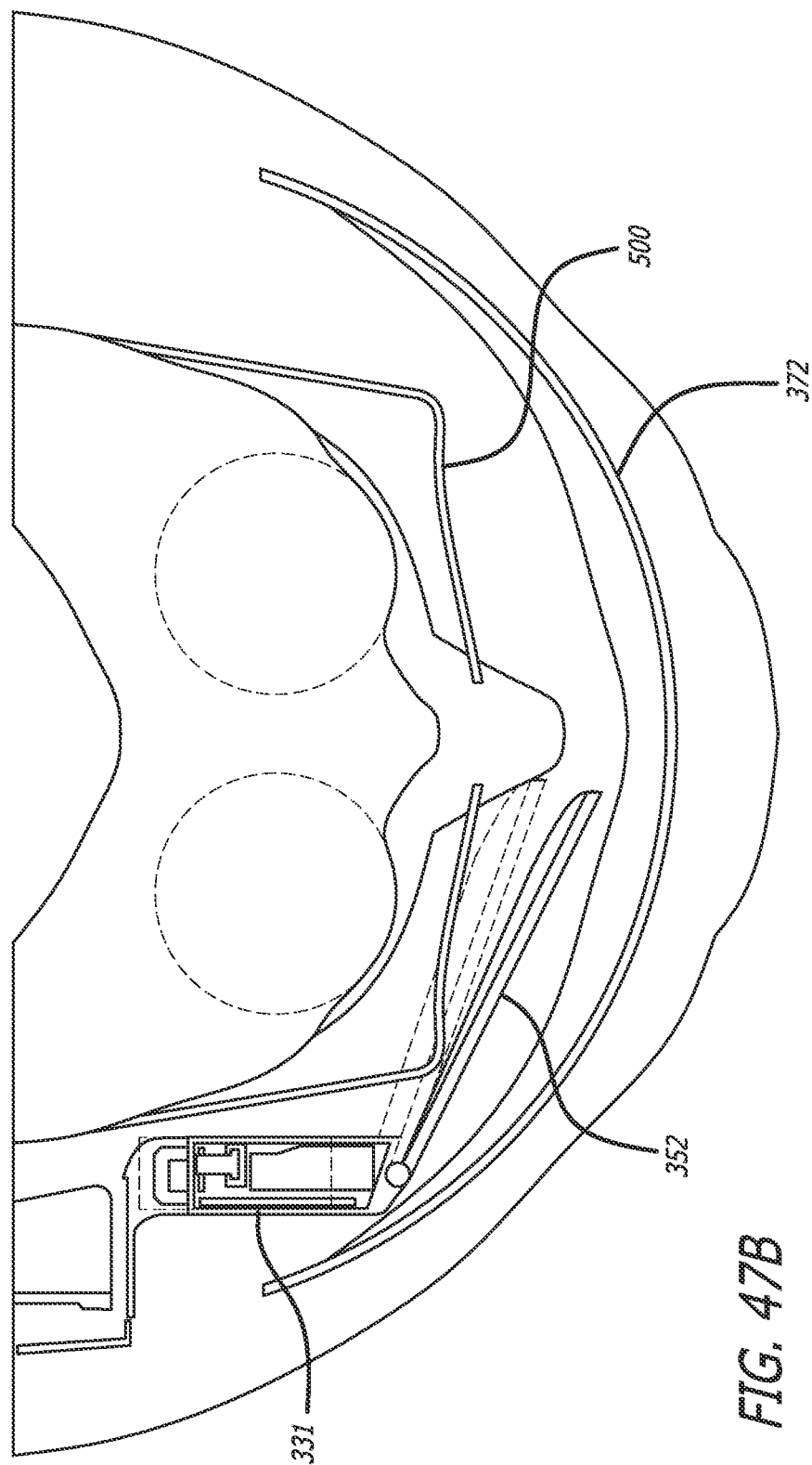
FIG. 47B illustrates an alternate view of the HUD placement in a helmet in spacial relation to the wearer's corrective lenses.

In accordance with many embodiments, as previously discussed, the HUD may be configured to be adjustable within the helmet or head piece. FIGS. 46-47B as well as FIGS. 36-38 illustrate embodiments of adjustable HUDs. In many embodiments the wearer may be wearing corrective lenses and thus would need to adjust the HUD accordingly so as not to interfere with the lenses and further provide the highest quality of image. As illustrated in FIG. 36 the attachment points may be fully adjustable. As illustrated in FIGS. 46-47B, the rake angle may be adjusted such that the HUD does not interfere with the corrective lenses as applicable. Additionally, as can be seen in FIGS. 47A-47B the waveguide 352 and the IIN 331 can be adjusted to not interfere with corrective lenses 500 or the internal face shield 372 of the helmet. In some embodiments the IIN can be adjusted horizontally (e.g., up to 10 mm) as needed. Additionally, in some embodiments the rake angle can be adjusted (e.g., to be within 25-28 degrees).

Figure 48:
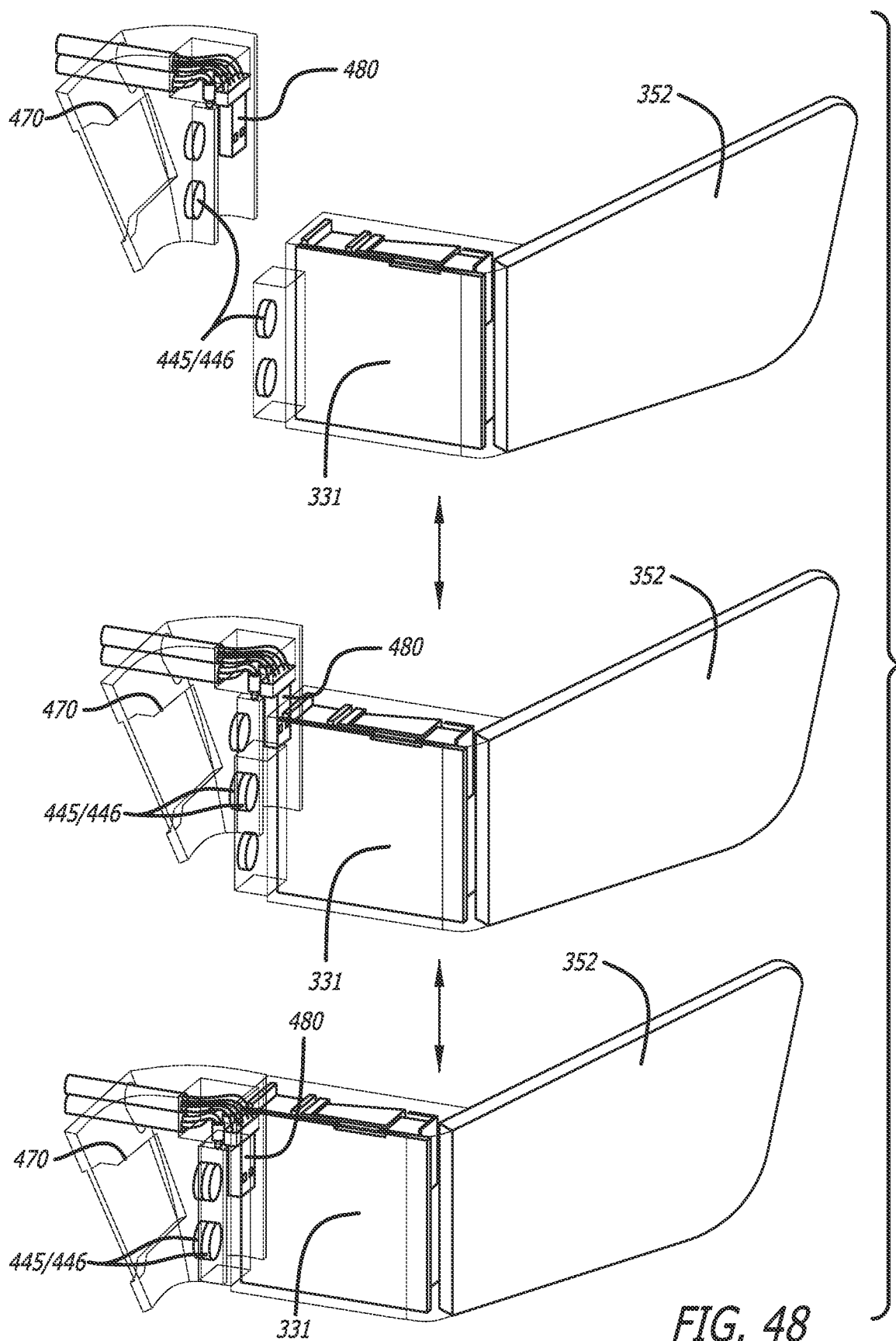
FIG. 48 illustrates the mechanism by which the HUD connects to a bracket in accordance with some embodiments.

FIG. 48 in accordance with some embodiments of the invention illustrates the movement of the HUD with respect to the installation bracket of the desired headpiece. It should be understood that the bracket may take on any suitable form depending on the headpiece. According to many embodiments the bracket 470 and the IIN 331 may contain power cables and other communication connections such as HDMI or USB. For example, in some embodiments the IIN may contain a USB-C or other connection built within the PCB and other controllers, as shown in FIGS. 49A and 49B.

Figure 50A:
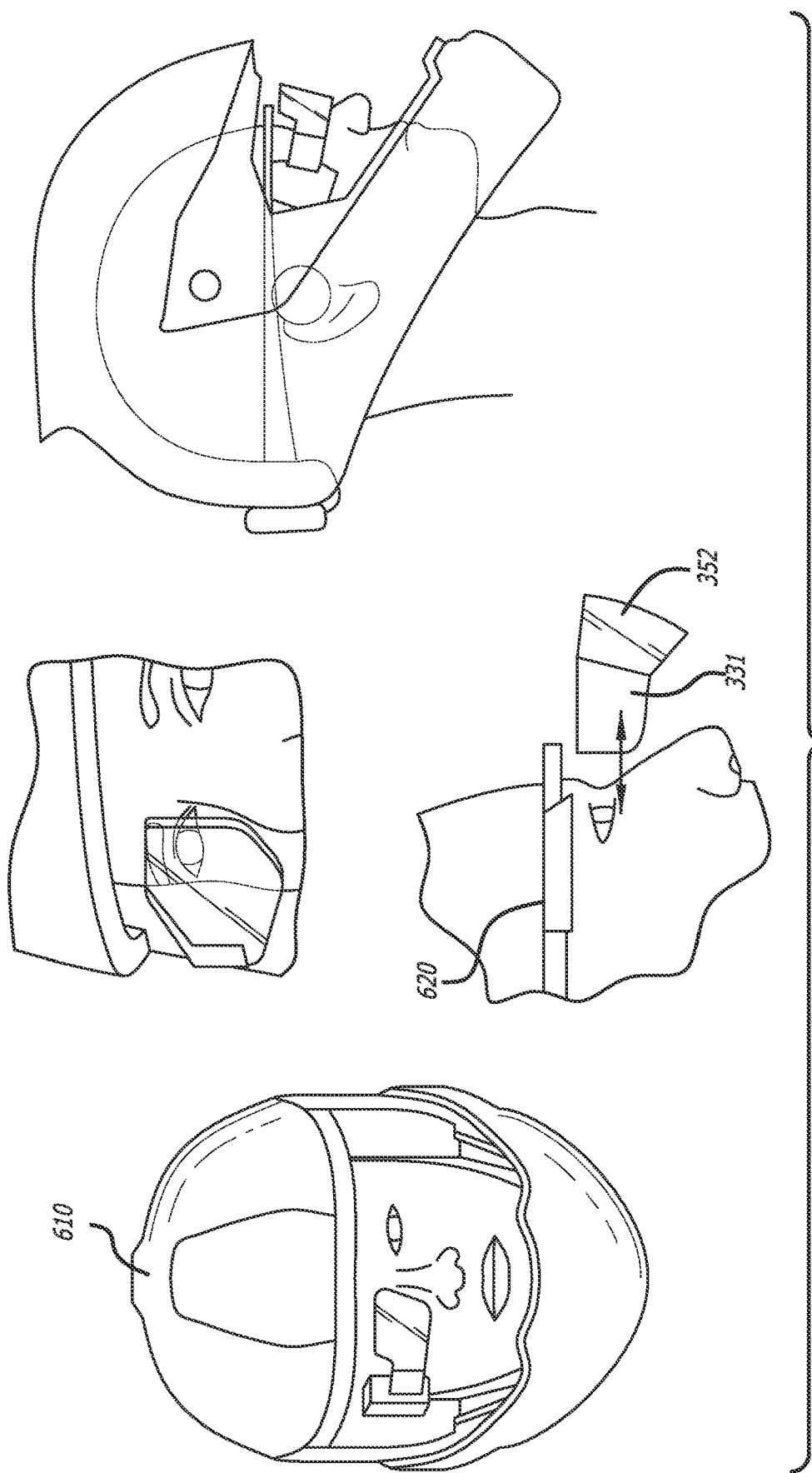
FIG. 50A illustrates an embodiment of the HUD integrated with a helmet.

In accordance with some embodiments the HUD may be configured to attach to a head piece that may be retrofitted to a helmet or other device. As illustrated in FIGS. 50A and 50B, the HUD may connect to a headband that could be used while running or may be used as a retrofit to any helmet.

Figure 51:
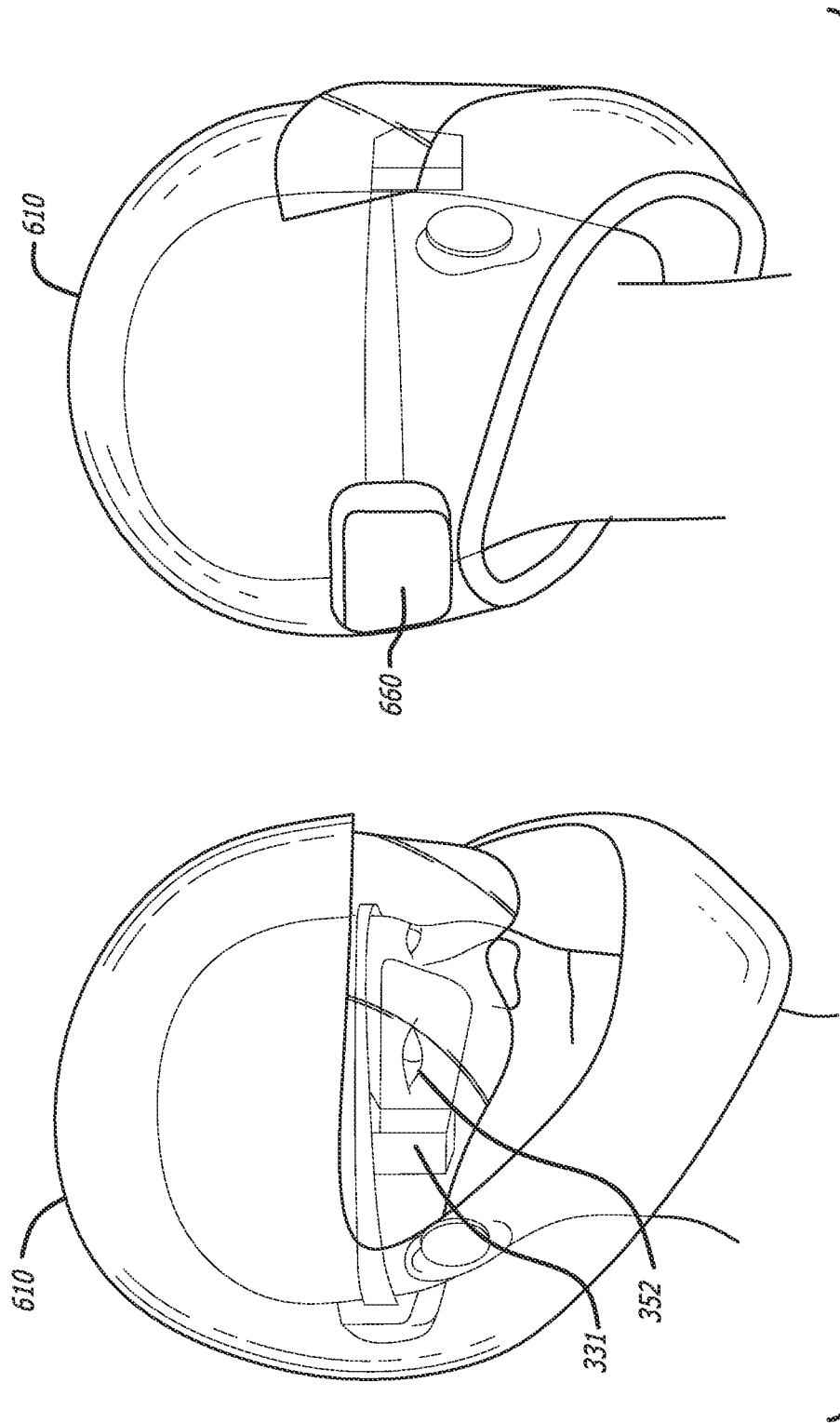
FIG. 51 illustrates various components of the HUD/Helmet configuration.

Because the IIN requires power to control the projectors and produce the image on the waveguide, many embodiments may include a separate power supply. As illustrated in FIG. 51, a separate power supply 600 unit may be located at the rear of the helmet or head piece. The power supply may contain electrical connections between the IIN and the power supply. Such connections may also be integrated within the headband or may be separate and routed through the internal portion of a helmet 610. Additionally, the power supply 600, being mobile, may be configured with a charging port such that it may be recharged as needed.

Figure 52:
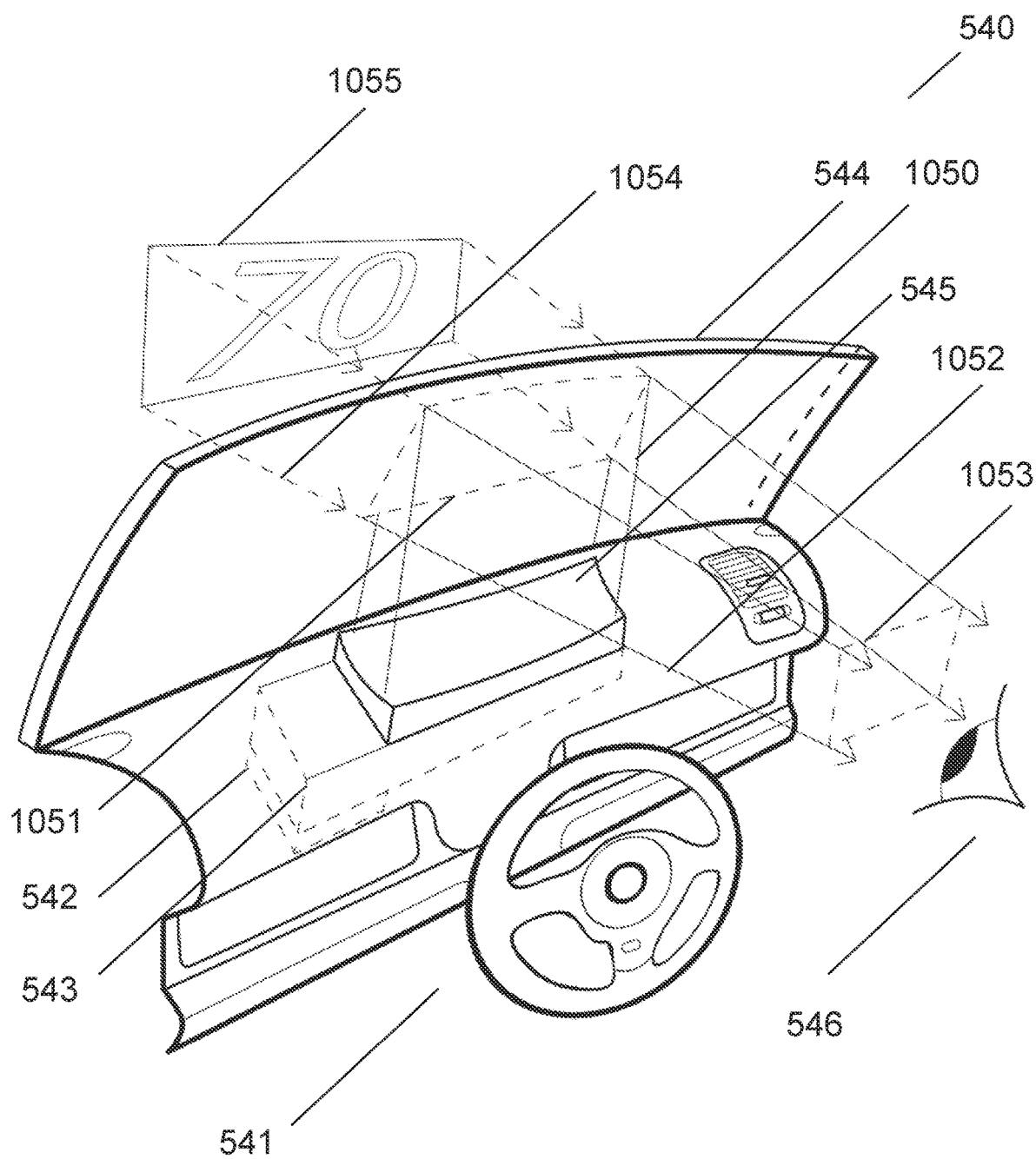
FIG. 52 is a schematic view of a waveguide display with a correction element for compensating for windscreen curvature distortion in one embodiment.

In some embodiments, a waveguide display according to the principles of the invention may provide a HUD for use in road vehicles in which image light is reflected off the windscreen into the driver's eye box. FIG. 52 is a schematic view of a waveguide display embodiment 540 for car HUD application with a correction element for compensating for windscreen curvature distortion in one embodiment. The optical display for configuration within a car interior 541 comprises the IIN 542, a waveguide 543 for projecting image light onto a windscreen 544 and a correction element 545 which has a prescription designed to balance the wavefront distortion of light reflected off the windscreen. In some embodiments, the correction element is a refractive element. In some embodiments, the correction element is a diffractive element. In some embodiments, the correction element is a plastic optical element. In some embodiments, the waveguide contains at least one birefringence compensation layers designed to balance the birefringence of a plastic correction element place in the path between the waveguide and the eye box. The light path from the waveguide to the eye via the reflection off the windscreen is illustrated by the rays 1050, 1052. The intersection of the image light with the windscreen and the eye box is indicated by 1051,1053. The virtual ray path 1054 up to the virtual image 1055 is also shown.

In some embodiments, a dual expansion waveguide display according to the principles of the invention may be integrated within a window, for example, a windscreen-integrated HUD for road vehicle applications. In some embodiments, a window-integrated display may be based on the embodiments and teachings disclosed in U.S. Provisional Patent Application No. 62/125,064 entitled OPTICAL WAVEGUIDE DISPLAYS FOR INTEGRATION Ind. WINDOWS and United States Provisional Patent Application No.: 62/125,066 entitled OPTICAL WAVEGUIDE DISPLAYS FOR INTEGRATION Ind. WINDOWS, the disclosures of which are incorporated herein by reference. In some embodiments, a dual expansion waveguide display may include gradient index (GRIN) wave-guiding components for relaying image content between the IIN and the waveguide. Exemplary embodiments are disclosed in U.S. Provisional Patent Application No. 62/123,282 entitled NEAR EYE DISPLAY USING GRADIENT INDEX OPTICS and U.S. Provisional Patent Application No. 62/124,550 entitled WAVEGUIDE DISPLAY USING GRADIENT INDEX OPTICS, the disclosures of which are incorporated herein by reference. In some embodiments, a dual expansion waveguide display may incorporate a light pipe for providing beam expansion in one direction based on the embodiments disclosed in U.S. Provisional patent Application No. 62/177,494 entitled WAVEGUIDE DEVICE INCORPORATING A LIGHT PIPE. In some embodiments, the input image source in the IIN may be a laser scanner as disclosed in U.S. Pat. No. 9,075,184 entitled COMPACT EDGE ILLUMINATED DIFFRACTIVE DISPLAY, the disclosures of which are incorporated herein by reference. The embodiments of the invention may be used in wide range of displays including HMDs for AR and VR, helmet mounted displays, projection displays, heads up displays (HUDs), Heads Down Displays, (HDDs), autostereoscopic displays and other 3D displays.

Some of the embodiments and teachings of this disclosure may be applied in waveguide sensors such as, for example, eye trackers, fingerprint scanners and LIDAR systems.

It should be emphasized that the drawings are exemplary in nature and even though particular embodiments are illustrated the design may take on any suitable configuration. Optical devices based on any of the above-described embodiments may be implemented using plastic substrates using the materials and processes disclosed in PCT Application No.: PCT/GB2012/000680, entitled IMPROVEMENTS TO HOLOGRAPHIC POLYMER DISPERSED LIQUID CRYSTAL MATERIALS AND DEVICES, the disclosure of which is incorporated herein by reference. In some embodiments, the dual expansion waveguide display may be curved.

The construction and arrangement of the systems and methods as shown in the various exemplary embodiments are illustrative only. Although only a few embodiments have been described in detail in this disclosure, many modifications are possible (for example, variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. An optical display comprising:
   an input image node (IIN) providing light of a first wavelength over an angular range;
   a first waveguide comprising at least one input grating configured to couple light from said IIN into a total internal reflection (TIR) path in said first waveguide and at least one grating for providing beam expansion in at least one direction and extracting light from said first waveguide;
   a transparent substrate operative to reflect at least a portion of said light extracted from said first waveguide into an eyebox; and
   a wavefront distortion compensation element disposed along the optical path from the first waveguide to said transparent substrate for compensating wavefront distortion introduced by reflection at said transparent substrate, wherein said IIN, said first waveguide and said transparent substrate are configured to form an image viewable through said transparent substrate from said eyebox.

2. The optical display of claim 1, wherein said at least one input grating for providing beam expansion and extracting light from said first waveguide comprises at least one fold grating configured to provide pupil expansion in a first direction and at least one output grating configured to provide pupil expansion in a second direction different than said first direction and to cause said light to exit said first waveguide.

3. The optical display of claim 1, wherein at least one of said gratings is switchable between a diffracting state and a non-diffracting state.

4. The optical display of claim 1, wherein said wavefront distortion compensation element is a diffractive optical element.

5. The optical display of claim 1, wherein said wavefront distortion compensation element is a refractive optical element.

6. The optical display of claim 1, wherein said wavefront distortion compensation element is a plastic optical element.

7. The optical display of claim 6, wherein said first waveguide further comprises at least one birefringence compensation layer for compensating a birefringence characteristic of said plastic optical element.

8. The optical display of claim 1, wherein said transparent substrate is a car windscreen.

9. The optical display of claim 1, further comprising a second waveguide, wherein:
   said at least one input grating of said first waveguide is configured to couple first wavelength light; and
   said second waveguide comprises at least one input grating configured to couple second wavelength light from said IIN into a TIR path in said second waveguide and at least one input grating for providing beam expansion in at least one direction and extracting light from said second waveguide.

10. The optical display of claim 9, further comprising a dichroic filter disposed between said at least one input grating of said first and second waveguides.

11. The optical display of claim 1, wherein said first waveguide is curved.

12. The optical display of claim 1, wherein said transparent substrate is curved.

13. The optical display of claim 1, wherein said IIN comprises a spatial light modulator and a projection lens for projecting image modulated first wavelength light over an angular range.

14. The optical display of claim 1, wherein said IIN comprises a laser scanner for projecting image modulated first wavelength light over an angular range.

15. The optical display of claim 1, wherein said at least one input grating multiplexes at least one of color or angle.

16. The optical display of claim 1 wherein said at least one input grating is a rolled k-vector grating.

17. The optical display of claim 1, wherein said at least one input grating comprises a grating selected from the group consisting of: a Bragg grating, a switchable Bragg grating, a grating recorded in a liquid crystal and polymer-based material, and a surface relief grating.

18. The optical display of claim 1, further comprising at least one of: an eye tracker, a dynamic focus lens disposed within said IIN, a dynamic focus lens disposed in proximity to one of the total internal refection surfaces of the first waveguide, a beam homogenizer, or at least one gradient index image transfer waveguide portion.

19. The optical display of claim 1, wherein said IIN further comprises a spatially varying numerical aperture component for providing a numerical aperture variation along at least one direction.

20. The optical display of claim 19, wherein said spatially varying numerical aperture component has at least one of diffractive, birefringent, refracting or scattering characteristics.

* * * * *